(12) United States Patent
Jhang et al.

(10) Patent No.: US 12,072,470 B2
(45) Date of Patent: Aug. 27, 2024

(54) OPTICAL IMAGING LENS INCLUDING SEVEN LENSES OF +−+−++− REFRACTIVE POWERS

(71) Applicant: Genius Electronic Optical (Xiamen) Co., Ltd., Xiamen (CN)

(72) Inventors: Jia-Sin Jhang, Taichung (TW); Maozong Lin, Xiamen (CN)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 753 days.

(21) Appl. No.: 17/161,018

(22) Filed: Jan. 28, 2021

(65) Prior Publication Data
US 2022/0163770 A1    May 26, 2022

(30) Foreign Application Priority Data
Nov. 26, 2020    (CN) .......................... 202011353723.1

(51) Int. Cl.
*G02B 13/00*    (2006.01)
*G02B 9/64*    (2006.01)

(52) U.S. Cl.
CPC ........... *G02B 13/0045* (2013.01); *G02B 9/64* (2013.01)

(58) Field of Classification Search
CPC ............................ G02B 13/0045; G02B 9/64
See application file for complete search history.

(56) References Cited

U.S. PATENT DOCUMENTS

| | | | |
|---|---|---|---|
| 2020/0393654 A1 | 12/2020 | Shin et al. | |
| 2021/0048623 A1* | 2/2021 | Dai | G02B 9/64 |
| 2022/0365317 A1* | 11/2022 | Chen | G02B 9/64 |

FOREIGN PATENT DOCUMENTS

CN    211506000 U    9/2020

OTHER PUBLICATIONS

Chinese Office Action, dated Jan. 12, 2022, and Search Report dated Jan. 6, 2022, in a counterpart Chinese patent application, No. CN 202011353723.1.

* cited by examiner

*Primary Examiner* — Wen Huang
(74) *Attorney, Agent, or Firm* — Chen Yoshimura LLP

(57) ABSTRACT

The present invention provides an optical imaging lens. The optical imaging lens comprises seven lens elements positioned in an order from an object side to an image side. Through controlling the convex or concave shape of the surfaces of the lens elements, the optical imaging lens may be provided with shortened system length, decreased Fno, increased field of view and image height.

20 Claims, 24 Drawing Sheets

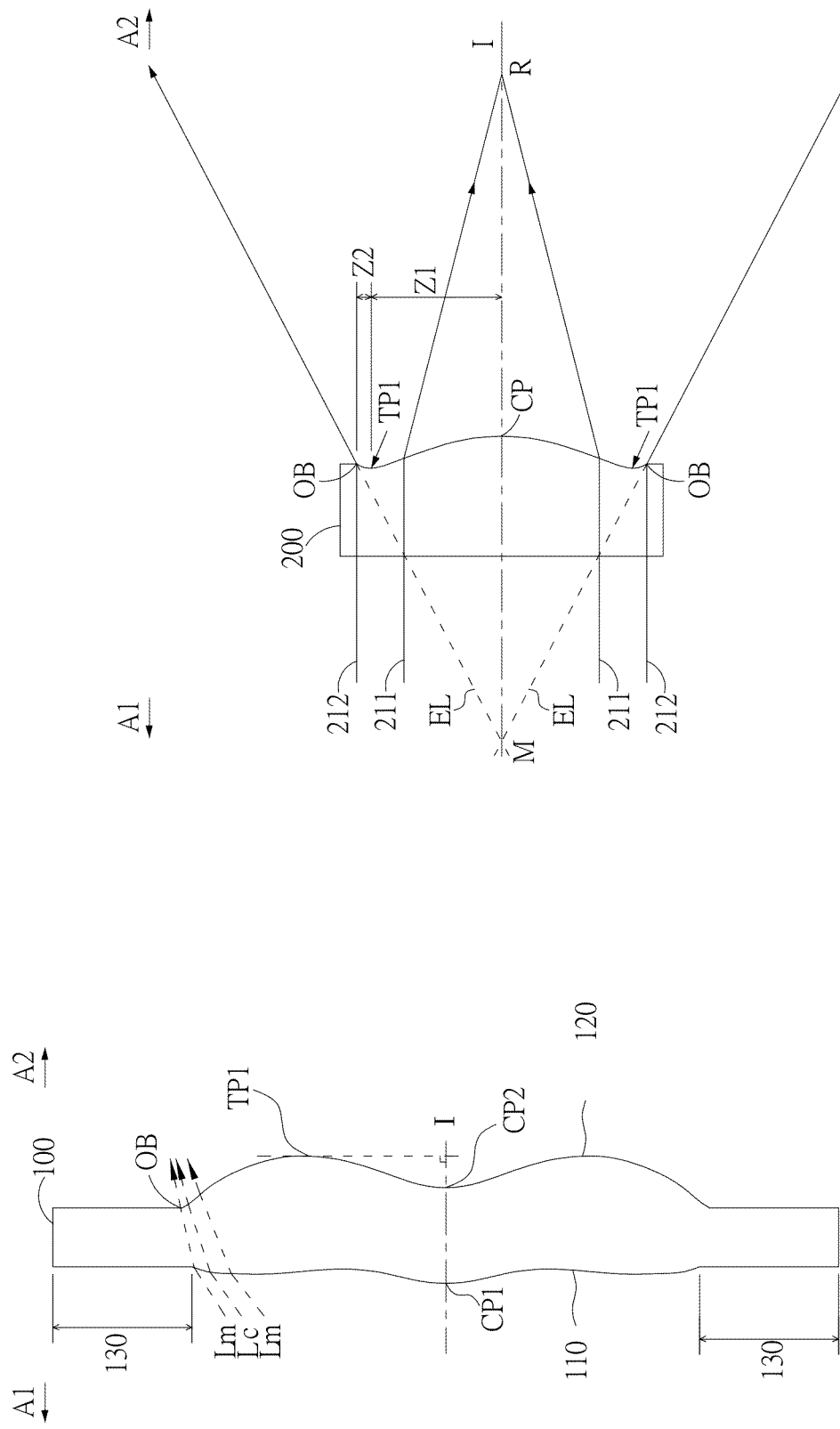

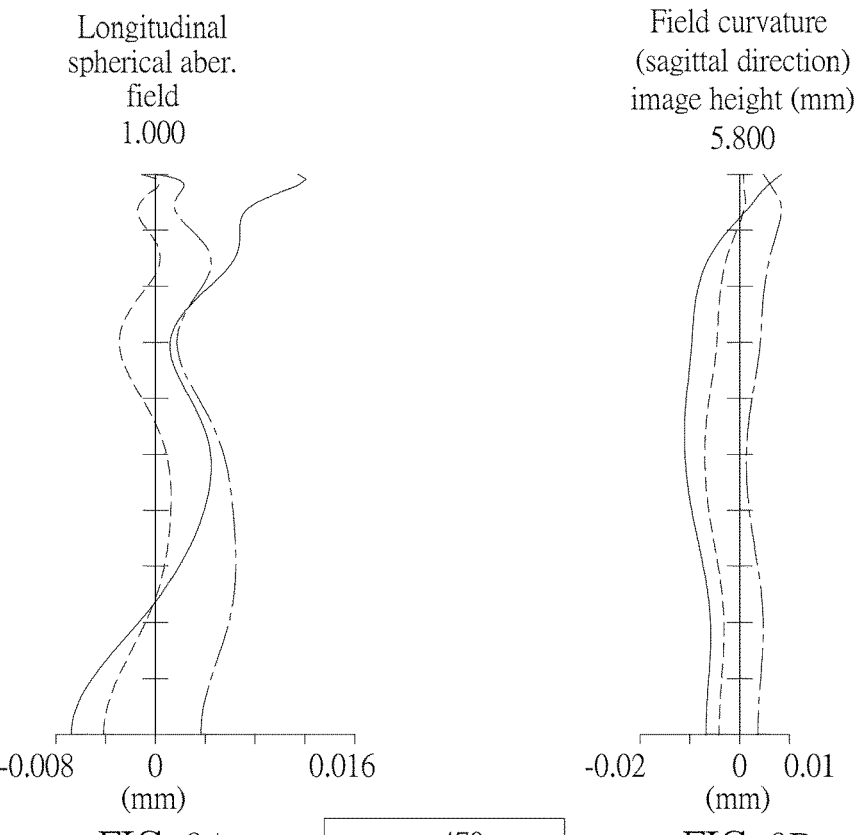
FIG. 9A
FIG. 9B
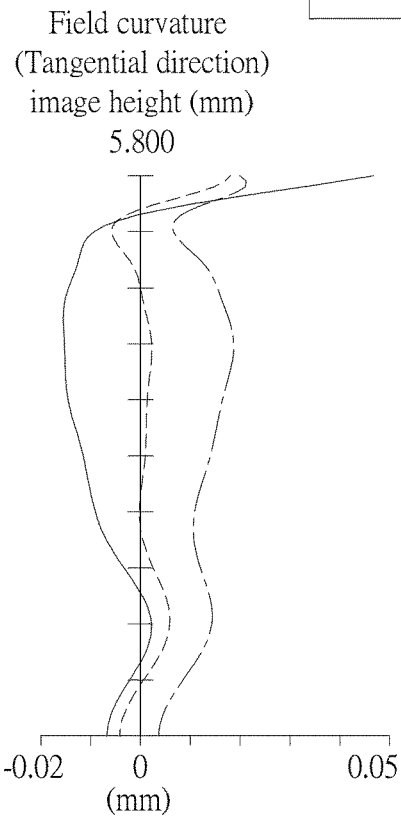
FIG. 9C
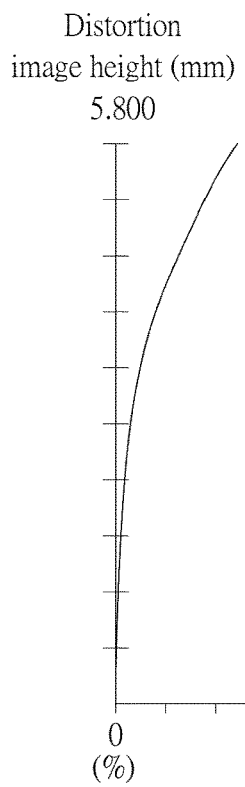
FIG. 9D

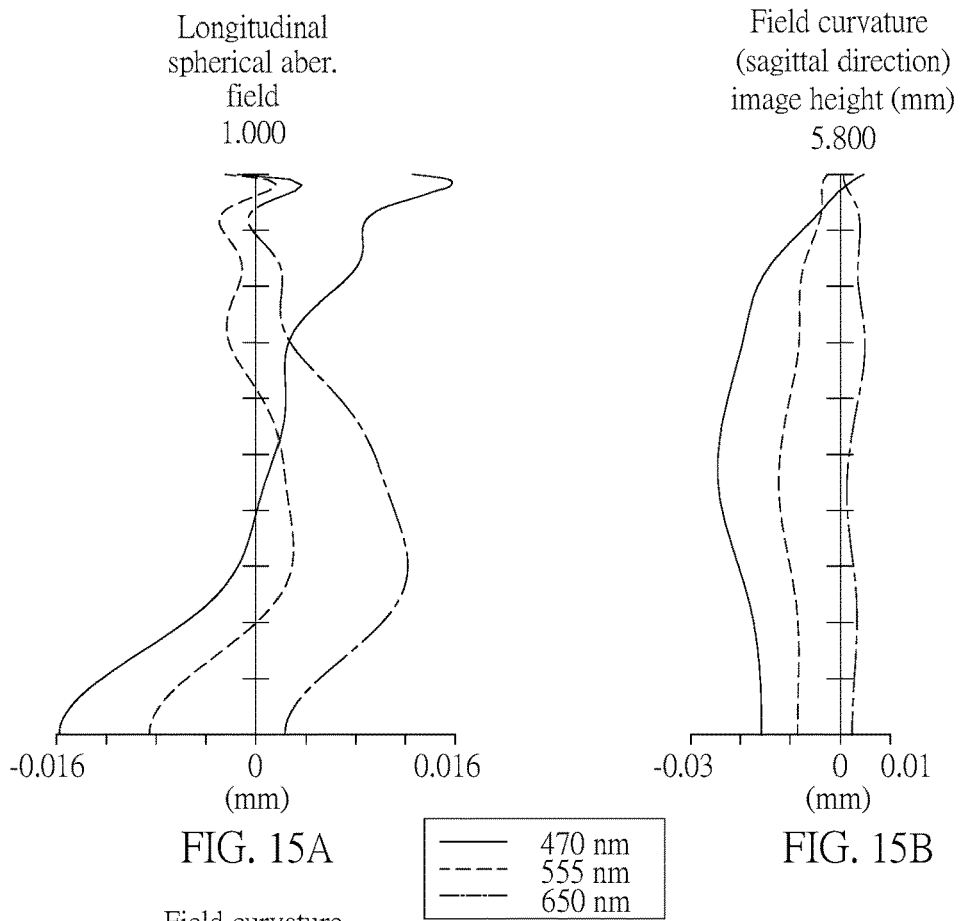
FIG. 15A
FIG. 15B
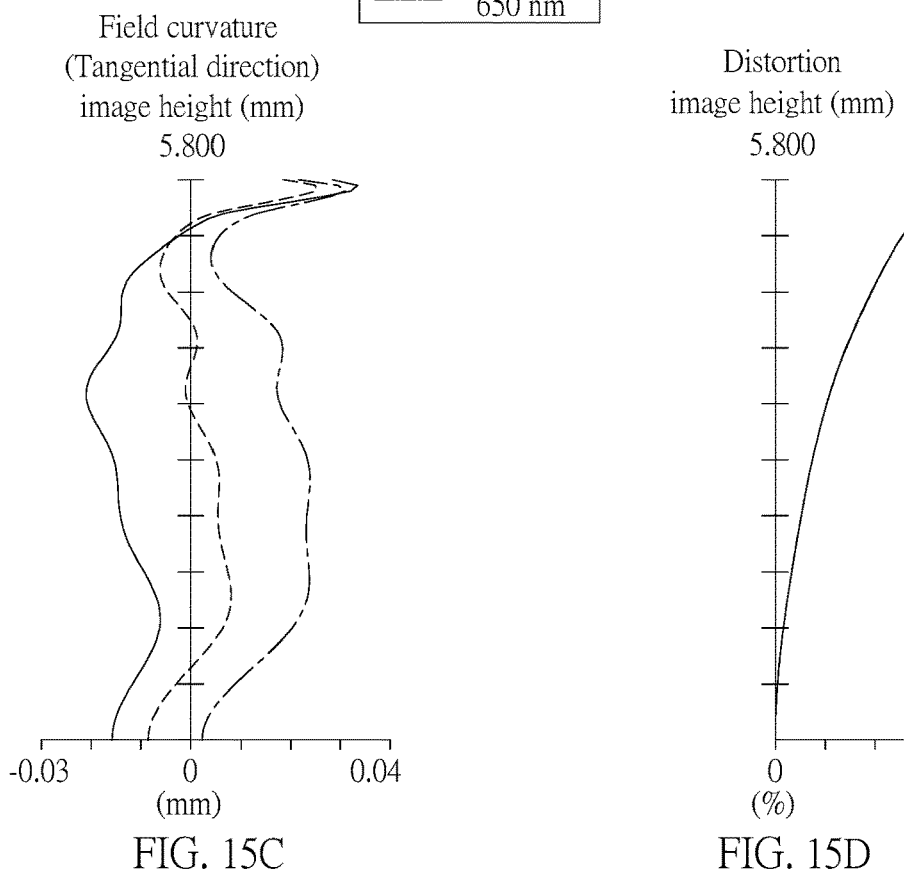
FIG. 15C
FIG. 15D

Longitudinal spherical aber.
field
1.000

Field curvature
(sagittal direction)
image height (mm)
5.800

——— 470 nm
– – – 555 nm
–·–·– 650 nm

Field curvature
(Tangential direction)
image height (mm)
5.800

Distortion
image height (mm)
5.800

Longitudinal spherical aber.
field
1.000

-0.08    0  0.02
(mm)

———  470 nm
- - -  555 nm
-·-·-  650 nm

Field curvature
(sagittal direction)
image height (mm)
5.800

-0.08    0  0.04
(mm)

Field curvature
(Tangential direction)
image height (mm)
5.800

-0.12    0    0.16
(mm)

Distortion
image height (mm)
5.800

0    60
(%)

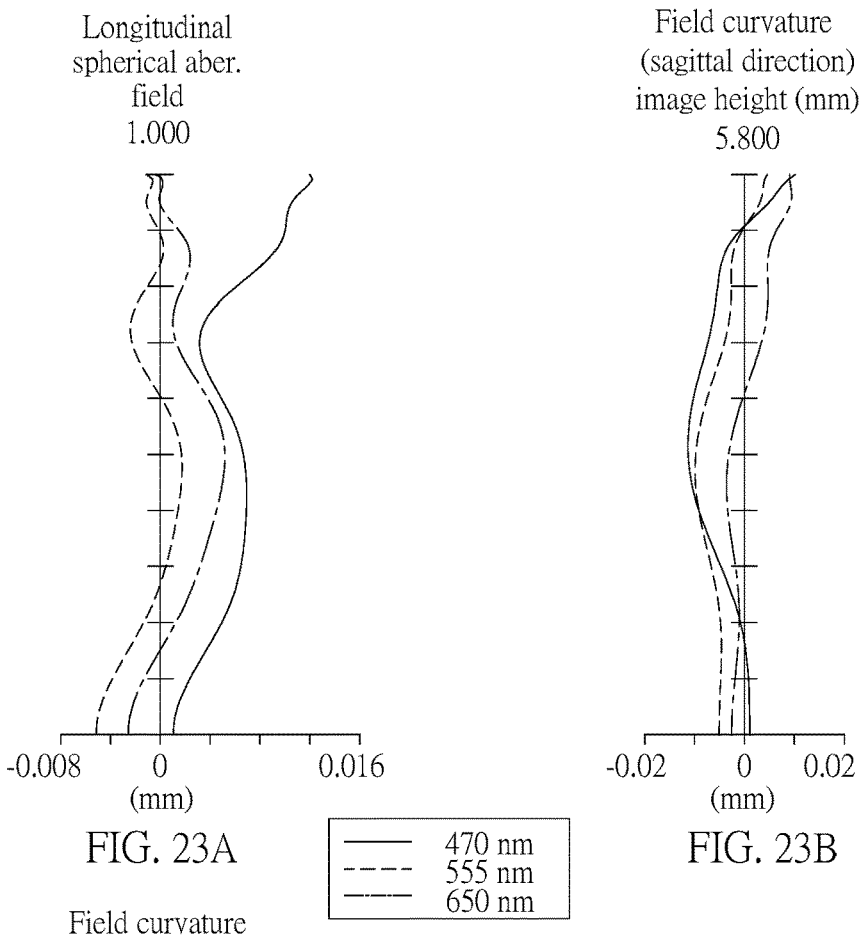
FIG. 23A
FIG. 23B
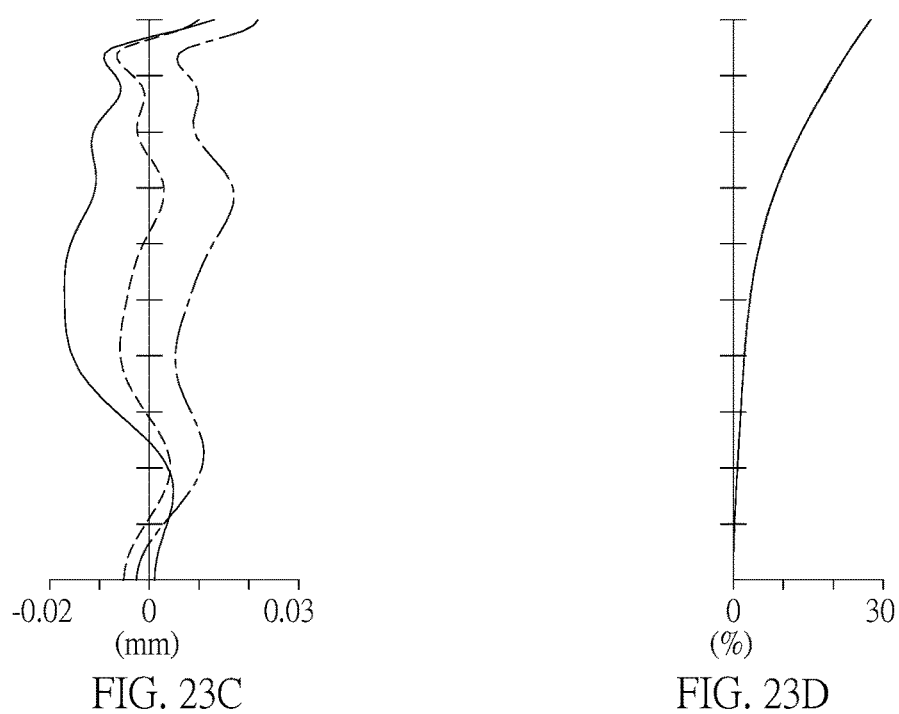
FIG. 23C
FIG. 23D

Longitudinal spherical aber.
field
1.000

-0.012  0  0.012
(mm)

—— 470 nm
---- 555 nm
-·-· 650 nm

Field curvature
(sagittal direction)
image height (mm)
5.800

-0.02  0  0.02
(mm)

Field curvature
(Tangential direction)
image height (mm)
5.800

-0.02  0  0.06
(mm)

Distortion
image height (mm)
5.800

0  16
(%)

OPTICAL IMAGING LENS INCLUDING SEVEN LENSES OF +−+−++− REFRACTIVE POWERS

CROSS-REFERENCE TO RELATED APPLICATIONS

This application claims priority to P.R.C. Patent Application No. 202011353723.1 titled "Optical Imaging Lens," filed Nov. 26, 2020, with the State Intellectual Property Office (SIPO) of the People's Republic of China.

TECHNICAL FIELD

The present disclosure relates to optical imaging lenses, and particularly, optical imaging lenses of portable electronic devices.

BACKGROUND

Recently, application of optical imaging lenses expands along with the continuous evolvement of the optical imaging lenses. Slim and compact appearance, small Fno for increasing luminous flux, and great field of view are the trends in the industry. To provide for great pixels and high resolution, an imaging height must be increased to adopt an image sensor with great sizes accepting imaging rays. Therefore, how to design an optical imaging lens with slim and compact appearance, small Fno, great field of view, great imaging height and good imaging quality is the key topic to research.

SUMMARY

The present disclosure provides for optical imaging lenses with slim and compact appearance, small Fno, great field of view and great imaging height in view of providing good imaging quality.

In an example embodiment, an optical imaging lens may comprise seven lens elements, hereinafter referred to as first, second, third, fourth, fifth, sixth and seventh lens element and positioned sequentially from an object side to an image side along an optical axis. Each of the first, second, third, fourth, fifth, sixth and seventh lens element may also have an object-side surface facing toward the object side and allowing imaging rays to pass through and an image-side surface facing toward the image side and allowing the imaging rays to pass through.

In the specification, parameters used here are defined as follows. A thickness of the first lens element along the optical axis is represented by T1. A distance from the image-side surface of the first lens element to the object-side surface of the second lens element along the optical axis, i.e. an air gap between the first lens element and the second lens element along the optical axis, is represented by G12. A thickness of the second lens element along the optical axis is represented by T2. A distance from the image-side surface of the second lens element to the object-side surface of the third lens element along the optical axis, i.e. an air gap between the second lens element and the third lens element along the optical axis, is represented by G23. A thickness of the third lens element along the optical axis is represented by T3. A distance from the image-side surface of the third lens element to the object-side surface of the fourth lens element along the optical axis, i.e. an air gap between the third lens element and the fourth lens element along the optical axis, is represented by G34. A thickness of the fourth lens element along the optical axis is represented by T4. A distance from the image-side surface of the fourth lens element to the object-side surface of the fifth lens element along the optical axis, i.e. an air gap between the fourth lens element and the fifth lens element along the optical axis, is represented by G45. A thickness of the fifth lens element along the optical axis is represented by T5. A distance from the image-side surface of the fifth lens element to the object-side surface of the sixth lens element along the optical axis, i.e. an air gap between the fifth lens element and the sixth lens element along the optical axis, is represented by G56. A thickness of the sixth lens element along the optical axis is represented by T6. A distance from the image-side surface of the sixth lens element to the object-side surface of the seventh lens element along the optical axis, i.e. an air gap between the sixth lens element and the seventh lens element along the optical axis, is represented by G67. A thickness of the seventh lens element along the optical axis is represented by T7. A distance from the image-side surface of the seventh lens element to an object-side surface of a filtering unit along the optical axis is represented by G7F. A thickness of the filtering unit along the optical axis is represented by TTF. A distance from an image-side surface of the filtering unit to the image plane along the optical axis is represented by GFP. A focal length of the first lens element is represented by f1. A focal length of the second lens element is represented by f2. A focal length of the third lens element is represented by f3. A focal length of the fourth lens element is represented by f4. A focal length of the fifth lens element is represented by f5. A focal length of the sixth lens element is represented by f6. A focal length of the seventh lens element is represented by f7. A refractive index of the first lens element is represented by n1. A refractive index of the second lens element is represented by n2. A refractive index of the third lens element is represented by n3. A refractive index of the fourth lens element is represented by n4. A refractive index of the fifth lens element is represented by n5. A refractive index of the sixth lens element is represented by n6. A refractive index of the seventh lens element is represented by n7. An abbe number of the first lens element is represented by V1. An abbe number of the second lens element is represented by V2. An abbe number of the third lens element is represented by V3. An abbe number of the fourth lens element is represented by V4. An abbe number of the fifth lens element is represented by V5. An abbe number of the sixth lens element is represented by V6. An abbe number of the seventh lens element is represented by V7. An effective focal length of the optical imaging lens is represented by EFL. A distance from the object-side surface of the first lens element to the image-side surface of the seventh lens element along the optical axis is represented by TL. A distance from the object-side surface of the first lens element to the image plane along the optical axis, i.e. a system length, is represented by TTL. A sum of the thicknesses of all seven lens elements from the first lens element to the seventh lens element along the optical axis, i.e. a sum of T1, T2, T3, T4, T5, T6 and T7, is represented by ALT. A sum of six air gaps from the first lens element to the seventh lens element along the optical axis, i.e. a sum of G12, G23, G34, G45, G56 and G67, is represented by AAG. A distance from the image-side surface of the seventh lens element to the image plane along the optical axis, i.e. a sum of G7F, TTF and GFP, is represented by BFL. A half field of view of the optical imaging lens is represented by HFOV. An image height of the optical imaging lens is represented by ImgH. A f-number of the optical imaging lens is represented by Fno.

In an aspect of the present disclosure, in the optical imaging lens, a periphery region of the image-side surface of the third lens element is convex, an optical axis region of the image-side surface of the fourth lens element is convex, an optical axis region of the object-side surface of the fifth lens element is convex, an optical axis region of the image-side surface of the fifth lens element is convex, and the sixth lens element has positive refracting power. Lens elements included by the optical imaging lens are only the seven lens elements described above, and the optical imaging lens satisfies the inequality:

$$V5 \leq 40.000. \qquad \text{Inequality (1)}$$

In another aspect of the present disclosure, in the optical imaging lens, a periphery region of the object-side surface of the third lens element is concave, a periphery region of the image-side surface of the third lens element is convex, an optical axis region of the image-side surface of the fourth lens element is convex, the fifth lens element has positive refracting power, and the sixth lens element has positive refracting power. Lens elements included by the optical imaging lens are only the seven lens elements described above, and the optical imaging lens satisfies Inequality (1) and the inequality:

$$TL/Fno \geq 3.300. \qquad \text{Inequality (2)}$$

In another aspect of the present disclosure, in the optical imaging lens, a periphery region of the object-side surface of the third lens element is concave, the fourth lens element has negative refracting power, an optical axis region of the image-side surface of the fifth lens element is convex, and an optical axis region of the image-side surface of the sixth lens element is convex. Lens elements included by the optical imaging lens are only the seven lens elements described above, and the optical imaging lens satisfies Inequalities (1) and (2).

In another example embodiment, other inequality(s), such as those relating to the ratio among parameters could be taken into consideration. For example:

$$(T1 + G12 + T2)/T5 \leq 2.900; \qquad \text{Inequality (3)}$$
$$TTL/T1 \leq 10.000; \qquad \text{Inequality (4)}$$
$$(T6 + G67)/T7 \geq 2.400; \qquad \text{Inequality (5)}$$
$$EFL/BFL \geq 2.900; \qquad \text{Inequality (6)}$$
$$(T2 + G23 + T3)/T4 \geq 2.800; \qquad \text{Inequality (7)}$$
$$(G23 + G45)/G34 \geq 1.500; \qquad \text{Inequality (8)}$$
$$(EFL + BFL)/T5 \leq 13.500; \qquad \text{Inequality (9)}$$
$$ALT/(G56 + T6 + G67) \leq 2.800; \qquad \text{Inequality (10)}$$
$$EFL/AAG \leq 3.300; \qquad \text{Inequality (11)}$$
$$HFOV/ImgH \leq 10.000 \text{ degree/mm} \qquad \text{Inequality (12)}$$
$$(T1 + T4 + T5)/T3 \geq 2.900; \qquad \text{Inequality (13)}$$
$$(T3 + T6)/T2 \geq 3.900; \qquad \text{Inequality (14)}$$
$$G56/G45 \geq 1.000; \qquad \text{Inequality (15)}$$
$$AAG/BFL \geq 1.500; \qquad \text{Inequality (16)}$$
$$G67/(G23 + G34) \geq 0.900; \qquad \text{Inequality (17)}$$
$$ALT/BFL \geq 3.000; \text{ and/or} \qquad \text{Inequality (18)}$$
$$TTL/(G12 + T7) \geq 9.800. \qquad \text{Inequality (19)}$$

In some example embodiments, more details about the convex or concave surface structure, refracting power or chosen material etc. could be incorporated for one specific lens element or broadly for a plurality of lens elements to improve the control for the system performance and/or resolution. It is noted that the details listed herein could be incorporated in example embodiments if no inconsistency occurs.

The optical imaging lens in example embodiments may shorten system length, decrease Fno and increase field of view and imaging height in view of achieving good imaging quality.

BRIEF DESCRIPTION OF THE DRAWINGS

Example embodiments will be more readily understood from the following detailed description when read in conjunction with the appended drawing, in which:

FIG. 1 depicts a cross-sectional view of one single lens element according to the present disclosure;

FIG. 2 depicts a cross-sectional view showing the relation between the shape of a portion and the position where a collimated ray meets the optical axis;

FIGS. 9A-9D depict charts of a longitudinal spherical aberration and other kinds of optical aberrations of a second embodiment of the optical imaging lens according to the present disclosure;

FIGS. 15A-15D depict charts of a longitudinal spherical aberration and other kinds of optical aberrations of a fifth embodiment of the optical imaging lens according to the present disclosure;

FIGS. 23A-23D depict charts of a longitudinal spherical aberration and other kinds of optical aberrations of a ninth embodiment of the optical imaging lens according to the present disclosure;

DETAILED DESCRIPTION

For a more complete understanding of the present disclosure and its advantages, reference is now made to the following description taken in conjunction with the accompanying drawings, in which like reference numbers indicate like features. Persons of ordinary skill in the art having the benefit of the present disclosure will understand other variations for implementing embodiments within the scope of the present disclosure, including those specific examples described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

The terms "optical axis region", "periphery region", "concave", and "convex" used in this specification and claims should be interpreted based on the definition listed in the specification by the principle of lexicographer.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
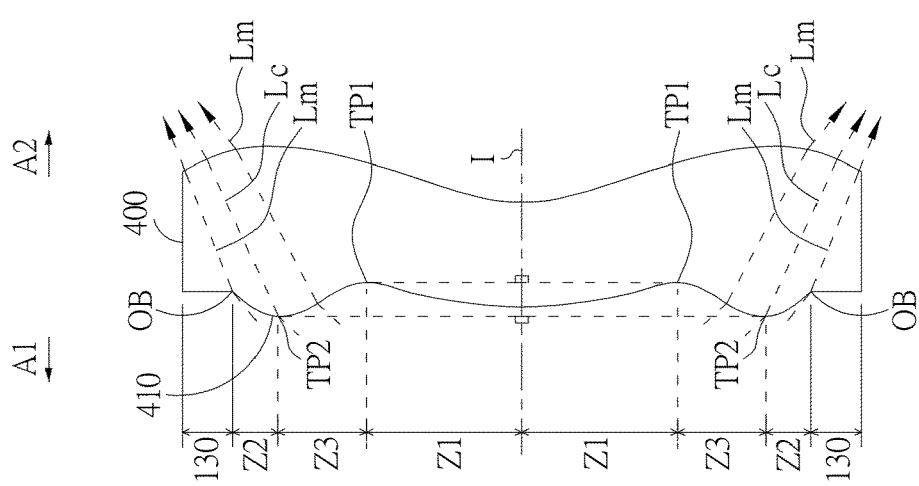
FIG. 4 depicts a cross-sectional view showing a second example of determining the shape of lens element regions and the boundaries of regions.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 3:
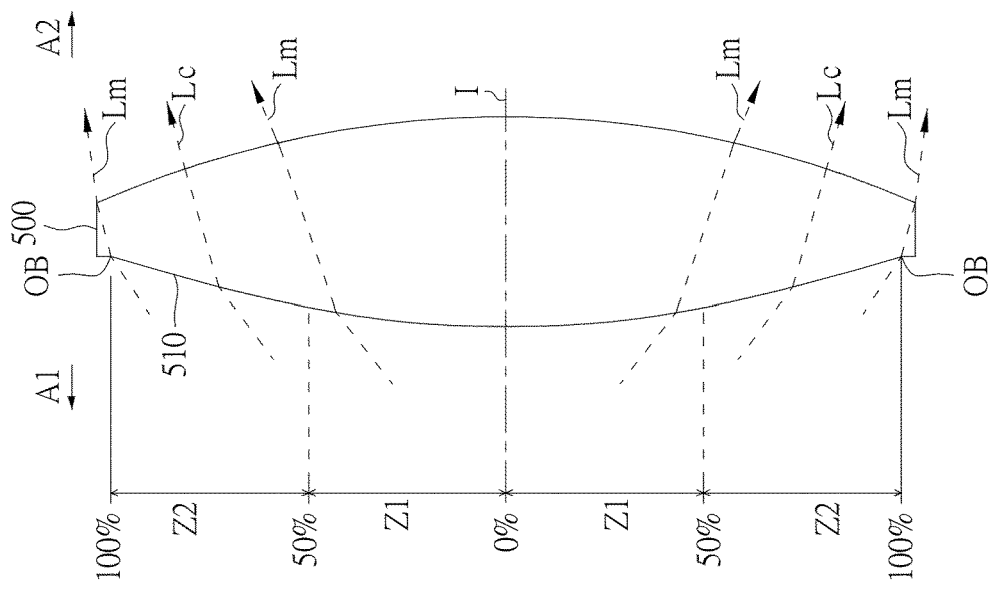
FIG. 3 depicts a cross-sectional view showing a first example of determining the shape of lens element regions and the boundaries of regions.
Figure 5:
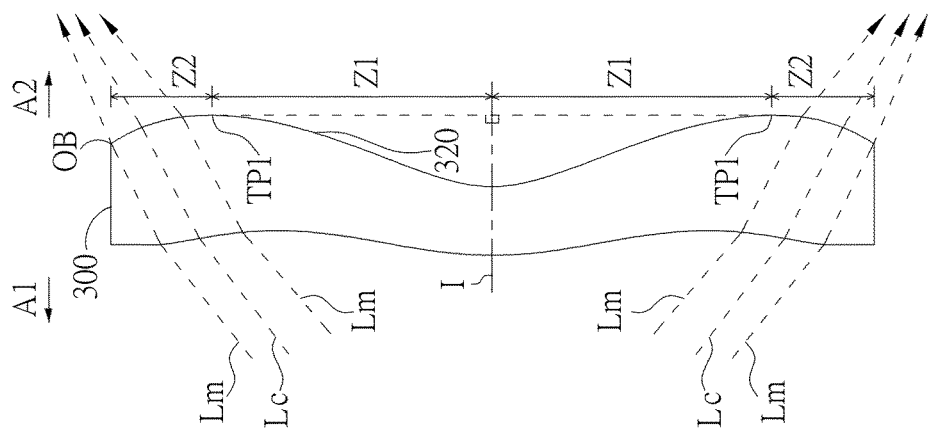
FIG. 5 depicts a cross-sectional view showing a third example of determining the shape of lens element regions and the boundaries of regions.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

In the present disclosure, examples of an optical imaging lens are provided. Example embodiments of an optical imaging lens may comprise a first lens element, a second lens element, a third lens element, a fourth lens element, a fifth lens element, a sixth lens element and a seventh lens element arranged sequentially from the object side to the image side along an optical axis. Each of the lens elements may comprise an object-side surface facing toward an object side allowing imaging rays to pass through and an image-side surface facing toward an image side allowing the imaging rays to pass through. Through controlling shape of the surfaces and range of the parameters, the optical imaging lens in example embodiments may shorten system length, decrease Fno and increase field of view angle and image height of the optical imaging lens.

In some embodiments, the lens elements are designed with convex/concave surface shape and refracting power of lens elements in light of the optical characteristics and system length. When an optical imaging lens satisfies the limitations: a periphery region of the image-side surface of the third lens element is convex, an optical axis region of the image-side surface of the fourth lens element is convex, an optical axis region of the object-side surface of the fifth lens element is convex, an optical axis region of the image-side surface of the fifth lens element is convex and the sixth lens element has positive refracting power, distortion aberration and other aberrations of the optical imaging lens may be improved. When the optical imaging lens further satisfies V5≤40.000, chromatic aberration may be effective eliminated to present good imaging quality. Preferably, the optical imaging lens may satisfy 20.000≤V5≤40.000.

When an optical imaging lens satisfies the limitations: a periphery region of the object-side surface of the third lens element is concave, a periphery region of the image-side surface of the third lens element is convex, an optical axis region of the image-side surface of the fourth lens element is convex, the fifth lens element has positive refracting power and the sixth lens element has positive refracting power, distortion aberration and other aberrations of the optical imaging lens may be improved. When the optical imaging lens further satisfies V5≤40.000, chromatic aberration may be effective eliminated and unnecessary stray light may be reduced. When the optical imaging lens further satisfies TL/Fno≥3.300 mm, it may be benefit to decrease Fno of the optical imaging lens, sustain good imaging quality and meanwhile increase luminous flux. Preferably, the optical imaging lens may satisfy 20.000≤V5≤40.000, 3.300 mm≤TL/Fno≤4.600 mm.

When an optical imaging lens satisfies the limitations: a periphery region of the object-side surface of the third lens element is concave, the fourth lens element has negative refracting power, an optical axis region of the image-side surface of the fifth lens element is convex and an optical axis region of the image-side surface of the sixth lens element is convex, it may be benefit to focus imaging rays on a same plane and improve distortion aberration and other aberrations of the optical imaging lens. When the optical imaging lens further satisfies V5≤40.000, chromatic aberration may be effective eliminated and unnecessary stray light may be reduced. When the optical imaging lens further satisfies TL/Fno≥3.300 mm, it may be benefit to decrease Fno of the optical imaging lens, sustain good imaging quality and meanwhile increase luminous flux. Preferably, the optical imaging lens may satisfy 20.000≤V5≤40.000, 3.300 mm≤TL/Fno≤4.600 mm.

When the optical imaging lens further satisfies HFOV/ImgH≤10.000 degree/mm, it may be benefit to increase image height and field of view of the optical imaging lens and meanwhile sustain good imaging quality. Preferably, the optical imaging lens may satisfy 5.800 degree/mm≤HFOV/ImgH≤10.000 degree/mm.

When the optical imaging lens further satisfies at least one of the inequalities listed below, the thickness of each lens element and air gap between lens elements may be sustained proper values to avoid any excessive value which may be unfavorable to shorten system length and any insufficient value which may increase the production or assembly difficulty:

(T1+G12+T2)/T5≤2.900, and preferably, 1.100≤(T1+G12+T2)/T5≤2.900;
TTL/T1≤10.000, and preferably, 5.700≤TTL/T1≤10.000;
(T6+G67)/T7≥2.400, and preferably, 2.400≤(T6+G67)/T7≤11.800;
EFL/BFL≥2.900, and preferably, 2.900≤EFL/BFL≤8.300;
(T2+G23+T3)/T4≥2.800, and preferably, 2.800≤(T2+G23+T3)/T4≤8.000;
(G23+G45)/G34≥1.500, and preferably, 1.500≤(G23+G45)/G34≤11.600;
(EFL+BFL)/T5≤13.500, and preferably, 5.800≤(EFL+BFL)/T5≤13.500;
ALT/(G56+T6+G67)≤2.800, and preferably, 1.100≤ALT/(G56+T6+G67)≤2.800;
EFL/AAG≤3.300, and preferably, 1.700≤EFL/AAG≤3.300;
(T1+T4+T5)/T3≥2.900, and preferably, 2.900≤(T1+T4+T5)/T3≤5.600;
(T3+T6)/T2≥3.900, and preferably, 3.900≤(T3+T6)/T2≤8.800;
G56/G45≥1.000, and preferably, 1.000≤G56/G45≤9.800;
AAG/BFL≥1.500, and preferably, 1.500≤AAG/BFL≤4.300;
G67/(G23+G34)≥0.900, and preferably, 0.900≤G67/(G23+G34)≤2.600;
ALT/BFL≥3.000, and preferably, 3.000≤ALT/BFL≤6.000;
TTL/(G12+T7)≥9.800, and preferably, 9.800≤TTL/(G12+T7)≤33.500.

In light of the unpredictability in an optical system, satisfying these inequalities listed above may result in promoting the imaging quality, shortening the system length of the optical imaging lens, lowering the f-number, increasing HFOV and/or increasing the yield in the assembly process in the present disclosure.

When implementing example embodiments, more details about the convex or concave surface or refracting power could be incorporated for one specific lens element or broadly for a plurality of lens elements to improve the control for the system volume, performance, resolution, and/or promote the yield. For example, in an example embodiment, each lens element may be made from plastic to decrease weight and cost, but other transparent materials, such as glass, resin, etc. may be used too. It is noted that the details listed here could be incorporated in example embodiments if no inconsistency occurs.

Figure 6:
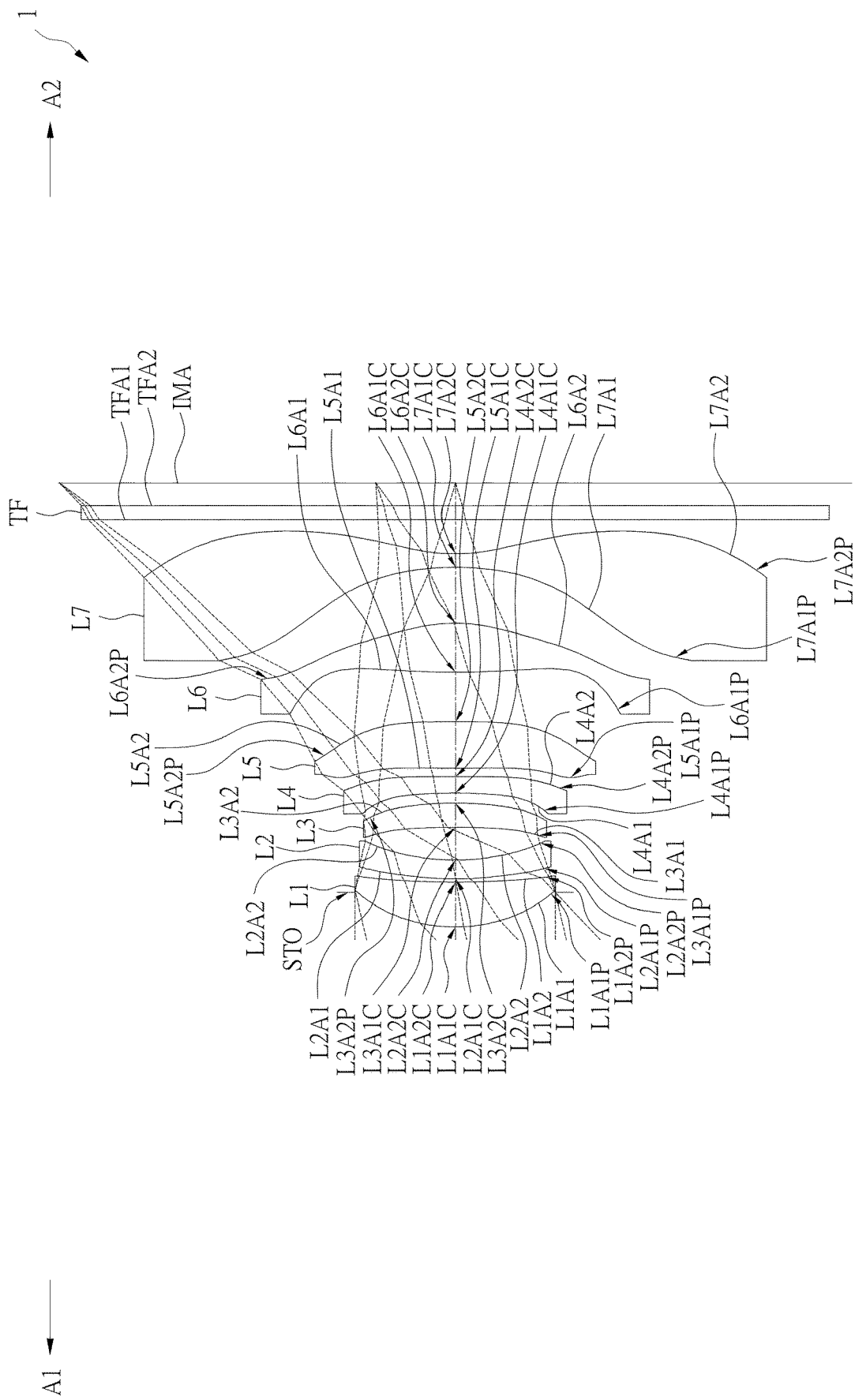
FIG. 6 depicts a cross-sectional view of a first embodiment of an optical imaging lens having seven lens elements according to the present disclosure.

Several example embodiments and associated optical data will now be provided for illustrating example embodiments of an optical imaging lens with good optical characteristics, a wide field of view and/or a low f-number. Reference is now made to FIGS. 6, 7A-7D and Tables 1, 2. FIG. 6 illustrates an example cross-sectional view of an optical imaging lens 1 having seven lens elements of the optical imaging lens 1 according to a first example embodiment. FIGS. 7A-7D show example charts of a longitudinal spherical aberration and other kinds of optical aberrations of the optical imaging lens 1 according to an example embodiment. Table 1 illustrates an example table of optical data of each lens element of the optical imaging lens 1 according to an example embodiment. Table 2 depicts an example table of aspherical data of the optical imaging lens 1 according to an example embodiment.

As shown in FIG. 6, the optical imaging lens 1 of the present embodiment may comprise, in the order from an object side A1 to an image side A2 along an optical axis, an aperture stop STO, a first lens element L1, a second lens element L2, a third lens element L3, a fourth lens element L4, a fifth lens element L5, a sixth lens element L6 and a seventh lens element L7. A filtering unit TF and an image plane IMA of an image sensor may be positioned at the image side A2 of the optical lens 1. Each of the first, second, third, fourth, fifth, sixth and seventh lens element L1, L2, L3, L4, L5, L6, L7 and the filtering unit TF may comprise an object-side surface L1A1/L2A1/L3A1/L4A1/L5A1/L6A1/L7A1/TFA1 facing toward the object side A1 and an image-side surface L1A2/L2A2/L3A2/L4A2/L5A2/L6A2/L7A2/TFA2 facing toward the image side A2. The filtering unit TF, positioned between the seventh lens element L7 and the image plane IMA, may selectively absorb light with specific wavelength(s) from the light passing through optical imaging lens 1. The example embodiment of the filtering unit TF which may selectively absorb light with specific wavelength(s) from the light passing through optical imaging lens 1 may be an IR cut filter (infrared cut filter). Then, IR light may be absorbed, and this may prohibit the IR light, which might not be seen by human eyes, from producing an image on the image plane IMA.

Example embodiments of each lens element of the optical imaging lens 1, which may be constructed by glass, plastic, resin material or other transparent material and is constructed by plastic material here for example, will now be described with reference to the drawings.

An example embodiment of the first lens element L1 may have positive refracting power. On the object-side surface L1A1, an optical axis region L1A1C may be convex and a periphery region L1A1P may be convex. On the image-side surface L1A2, an optical axis region L1A2C may be concave and a periphery region L1A2P may be concave.

An example embodiment of the second lens element L2 may have negative refracting power. On the object-side surface L2A1, an optical axis region L2A1C may be convex and a periphery region L2A1P may be convex. On the image-side surface L2A2, an optical axis region L2A2C may be concave and a periphery region L2A2P may be concave.

An example embodiment of the third lens element L3 may have positive refracting power. On the object-side surface L3A1, an optical axis region L3A1C may be concave and a periphery region L3A1P may be concave. On the image-side surface L3A2, an optical axis region L3A2C may be convex and a periphery region L3A2P may be convex.

An example embodiment of the fourth lens element L4 may have negative refracting power. On the object-side surface L4A1, an optical axis region L4A1C may be concave and a periphery region L4A1P may be concave. On the image-side surface L4A2, an optical axis region L4A2C may be convex and a periphery region L4A2P may be convex.

An example embodiment of the fifth lens element L5 may have positive refracting power. On the object-side surface L5A1, an optical axis region L5A1C may be convex and a periphery region L5A1P may be convex. On the image-side surface L5A2, an optical axis region L5A2C may be convex and a periphery region L5A2P may be convex.

An example embodiment of the sixth lens element L6 may have positive refracting power. On the object-side surface L6A1, an optical axis region L6A1C may be convex and a periphery region L6A1P may be concave. On the image-side surface L6A2, an optical axis region L6A2C may be convex and a periphery region L6A2P may be convex.

An example embodiment of the seventh lens element L7 may have negative refracting power. On the object-side surface L7A1, an optical axis region L7A1C may be concave and a periphery region L7A1P may be concave. On the image-side surface L7A2, an optical axis region L7A2C may be concave and a periphery region L7A2P may be convex.

In example embodiments, air gaps may exist between each pair of adjacent lens elements, as well as between the seventh lens element L7 and the filtering unit TF, and the filtering unit TF and the image plane IMA of the image sensor. Please note, in other embodiments, any of the aforementioned air gaps may or may not exist. For example, profiles of opposite surfaces of a pair of adjacent lens elements may align with and/or attach to each other, and in such situations, the air gap might not exist. Table 1 depicts the optical characteristics of each lens elements in the optical imaging lens 1 of the present embodiment. Please also refer to Table 23 for the values of V5, TL/Fno, (T1+G12+T2)/T5, TTL/T1, (T6+G67)/T7, EFL/BFL, (T2+G23+T3)/T4, (G23+G45)/G34, (EFL+BFL)/T5, ALT/(G56+T6+G67), EFL/AAG, HFOV/ImgH, (T1+T4+T5)/T3, (T3+T6)/T2, G56/G45, AAG/BFL, G67/(G23+G34), ALT/BFL and TTL/(G12+T7) corresponding to the present embodiment.

TABLE 1

Embodiment 1
EFL = 4.839 mm; HFOV = 43.700 degrees; TTL = 6.513 mm
Fno = 1.650; Image Height = 5.800 mm

| Surface # | | Radius of curvature (mm) | Thickness/ air gap (mm) | Refractive index | Abbe number | Focal length (mm) | Material |
|---|---|---|---|---|---|---|---|
| OBJ | Object | INFINITY | INFINITY | | | | |
| STO | Aperture stop | INFINITY | −0.502 | | | | |
| L1A1 | 1st lens element | 2.403 | 0.652 | 1.545 | 55.987 | 5.639 | Plastic |
| L1A2 | | 9.883 | 0.050 | | | | |
| L2A1 | 2nd lens element | 4.700 | 0.276 | 1.661 | 20.373 | −17.449 | Plastic |
| L2A2 | | 3.269 | 0.479 | | | | |
| L3A1 | 3rd lens element | −14.533 | 0.355 | 1.545 | 55.987 | 17.102 | Plastic |
| L3A2 | | −5.736 | 0.149 | | | | |
| L4A1 | 4th lens element | −6.092 | 0.241 | 1.661 | 20.373 | −12.557 | Plastic |
| L4A2 | | −22.691 | 0.124 | | | | |
| L5A1 | 5th lens element | 19.292 | 0.683 | 1.567 | 37.533 | 24.791 | Plastic |
| L5A2 | | −52.068 | 0.718 | | | | |
| L6A1 | 6th lens element | 10.346 | 0.723 | 1.545 | 55.987 | 3.584 | Plastic |
| L6A2 | | −2.355 | 0.820 | | | | |
| L7A1 | 7th lens element | −4.499 | 0.200 | 1.545 | 55.987 | −2.880 | Plastic |
| L7A2 | | 2.458 | 0.500 | | | | |
| TFA1 | Filtering unit | INFINITY | 0.210 | 1.517 | 64.167 | | |
| TFA2 | | INFINITY | 0.332 | | | | |
| IMA | Image plane | INFINITY | | | | | |

The totaled 14 aspherical surfaces, including the object-side surface L1A1 and the image-side surface L1A2 of the first lens element L1, the object-side surface L2A1 and the image-side surface L2A2 of the second lens element L2, the object-side surface L3A1 and the image-side surface L3A2 of the third lens element L3, the object-side surface L4A1 and the image-side surface L4A2 of the fourth lens element L4, the object-side surface L5A1 and the image-side surface L5A2 of the fifth lens element L5, the object-side surface L6A1 and the image-side surface L6A2 of the sixth lens element L6, and the object-side surface L7A1 and the image-side surface L7A2 of the seventh lens element L7 may all be defined by the following aspherical formula:

$$Z(Y) = \frac{Y^2}{R} \bigg/ \left(1 + \sqrt{1 - (1+K)\frac{Y^2}{R^2}}\right) + \sum_{i=1}^{n} a_i \times Y^i$$

wherein, Y represents the perpendicular distance between the point of the aspherical surface and the optical axis; Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; K represents a conic constant; $a_i$ represents an aspherical coefficient of $i^{th}$ level. The values of each aspherical parameter are shown in Table 2.

TABLE 2

Embodiment 1
Aspherical Parameters

| Surface # | K | a2 | a4 | a6 |
|---|---|---|---|---|
| L1A1 | 0.000000E+00 | 0.000000E+00 | 3.571284E−03 | 2.151651E−03 |
| L1A2 | 0.000000E+00 | 0.000000E+00 | −3.276137E−02 | 5.112971E−02 |
| L2A1 | 0.000000E+00 | 0.000000E+00 | −4.837852E−02 | 5.550893E−02 |
| L2A2 | −8.347863E−01 | 0.000000E+00 | −1.452358E−02 | 1.703354E−02 |
| L3A1 | 0.000000E+00 | 0.000000E+00 | −2.089188E−02 | −1.322002E−02 |
| L3A2 | 0.000000E+00 | 0.000000E+00 | 3.048709E−02 | −1.357811E−01 |
| L4A1 | 0.000000E+00 | 0.000000E+00 | 1.054433E−01 | −2.742938E−01 |
| L4A2 | 0.000000E+00 | 0.000000E+00 | 7.992102E−02 | −2.072217E−01 |
| L5A1 | 0.000000E+00 | 0.000000E+00 | −3.165586E−02 | −1.904442E−02 |
| L5A2 | 0.000000E+00 | 0.000000E+00 | −5.632174E−02 | 1.785772E−02 |
| L6A1 | 0.000000E+00 | 0.000000E+00 | −1.601654E−02 | 9.308981E−03 |
| L6A2 | −4.799499E+00 | 0.000000E+00 | 8.701707E−03 | −3.473188E−03 |
| L7A1 | 0.000000E+00 | 0.000000E+00 | −1.204456E−02 | −1.668887E−03 |
| L7A2 | −7.157617E+00 | 0.000000E+00 | −1.875580E−02 | 2.309284E−03 |

TABLE 2-continued

Embodiment 1
Aspherical Parameters

| Surface # | a8 | a10 | a12 | a14 |
|---|---|---|---|---|
| L1A1 | −2.073750E−03 | 2.389797E−03 | −1.298713E−03 | 3.842417E−04 |
| L1A2 | −5.037309E−02 | 3.473880E−02 | −1.563895E−02 | 4.012585E−03 |
| L2A1 | −4.931687E−02 | 3.352936E−02 | −1.545001E−02 | 4.192884E−03 |
| L2A2 | −1.074844E−02 | 9.015460E−03 | −5.717451E−03 | 2.184628E−03 |
| L3A1 | 1.857167E−02 | −1.970456E−02 | 1.128214E−02 | −3.506045E−03 |
| L3A2 | 1.706315E−01 | −1.407912E−01 | 7.077062E−02 | −1.983277E−02 |
| L4A1 | 2.946177E−01 | −2.042717E−01 | 7.757725E−02 | −8.766125E−03 |
| L4A2 | 2.254284E−01 | −1.633133E−01 | 8.126745E−02 | −2.769689E−02 |
| L5A1 | 1.798790E−02 | −2.109002E−03 | −2.832484E−03 | 1.615912E−03 |
| L5A2 | −1.457081E−02 | 8.442705E−03 | −3.076576E−03 | 7.879868E−04 |
| L6A1 | −4.970757E−03 | 1.397817E−03 | −5.909783E−04 | 2.095075E−04 |
| L6A2 | 7.678362E−03 | −5.422059E−03 | 1.682931E−03 | −2.786096E−04 |
| L7A1 | 4.402059E−04 | 7.912775E−05 | −2.477646E−03 | 2.521939E−06 |
| L7A2 | −8.312034E−05 | −1.589130E−05 | 2.467180E−06 | −1.586796E−07 |

| Surface # | a16 | a18 | a20 |
|---|---|---|---|
| L1A1 | −4.956726E−05 | | |
| L1A2 | −4.363364E−04 | | |
| L2A1 | −4.779650E−04 | | |
| L2A2 | −2.982208E−04 | | |
| L3A1 | 4.977542E−04 | | |
| L3A2 | 2.391919E−03 | | |
| L4A1 | −4.600244E−03 | 1.846368E−03 | −1.984667E−04 |
| L4A2 | 6.261996E−03 | −8.508371E−04 | 5.292724E−05 |
| L5A1 | −3.968625E−04 | 4.885958E−05 | −2.464318E−06 |
| L5A2 | −1.454586E−04 | 1.745431E−05 | −9.689977E−07 |
| L6A1 | −4.100073E−05 | 3.976336E−06 | −1.503430E−07 |
| L6A2 | 2.590109E−05 | −1.284657E−06 | 2.660369E−08 |
| L7A1 | −1.284729E−07 | 3.290028E−09 | −3.324500E−11 |
| L7A2 | 5.287050E−09 | −8.399200E−11 | 4.220000E−13 |

Figure 7A:
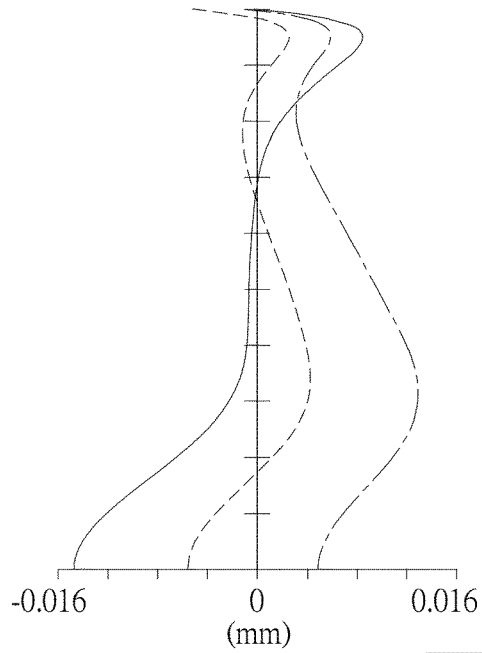
FIGS. 7A-7D depict charts of a longitudinal spherical aberration and other kinds of optical aberrations of a first embodiment of the optical imaging lens according to the present disclosure.
Figure 7B:
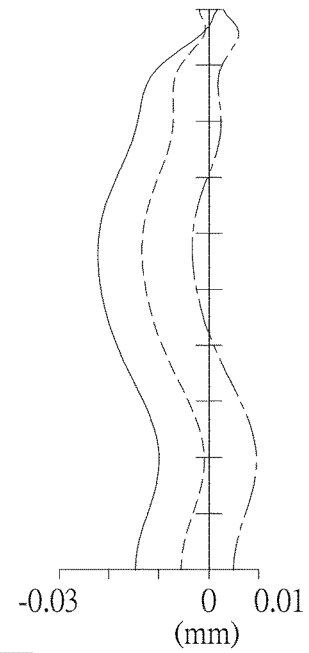
Figure 7C:
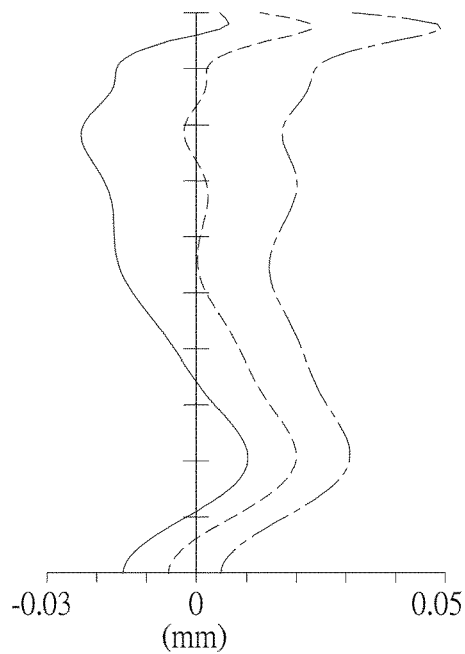
Figure 7D:
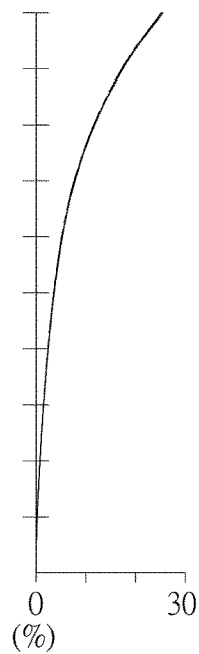

Referring to FIG. 7A, a longitudinal spherical aberration of the optical imaging lens in the present embodiment is shown in coordinates in which the horizontal axis represents the longitudinal spherical aberration and the vertical axis represents field of view, and field curvature aberration of the optical imaging lens in the present embodiment in the sagittal direction is shown in FIG. 7B, and field curvature aberration of the optical imaging lens in the present embodiment in the tangential direction is shown in FIG. 7C, in which the horizontal axis represents field curvature aberration, the vertical axis represents image height, and distortion aberration of the optical imaging lens in the present embodiment is shown in FIG. 7D, in which the horizontal axis represents percentage and the vertical axis represents image height. The curves of different wavelengths (470 nm, 555 nm, 650 nm) may be close to each other. This represents that off-axis light with respect to these wavelengths may be focused around an image point. From the vertical deviation of each curve shown therein, the offset of the off-axis light relative to the image point may be within −0.016~0.014 mm. Therefore, the present embodiment may improve the longitudinal spherical aberration with respect to different wavelengths. For field curvature aberration in the sagittal direction, the focus variation with respect to the three wavelengths in the whole field may fall within −0.025~0.01 mm, for field curvature aberration in the tangential direction, the focus variation with respect to the three wavelengths in the whole field may fall within −0.025~0.035 mm, and the variation of the distortion aberration may be within 0~25%.

According to the values of the aberrations, it is shown that the optical imaging lens 1 of the present embodiment, with system length as short as 6.513 mm, HFOV as great as 43.700 degrees, Fno as small as 1.650 and image height as great as 5.800 mm, may be capable of providing good imaging quality.

Figure 8:
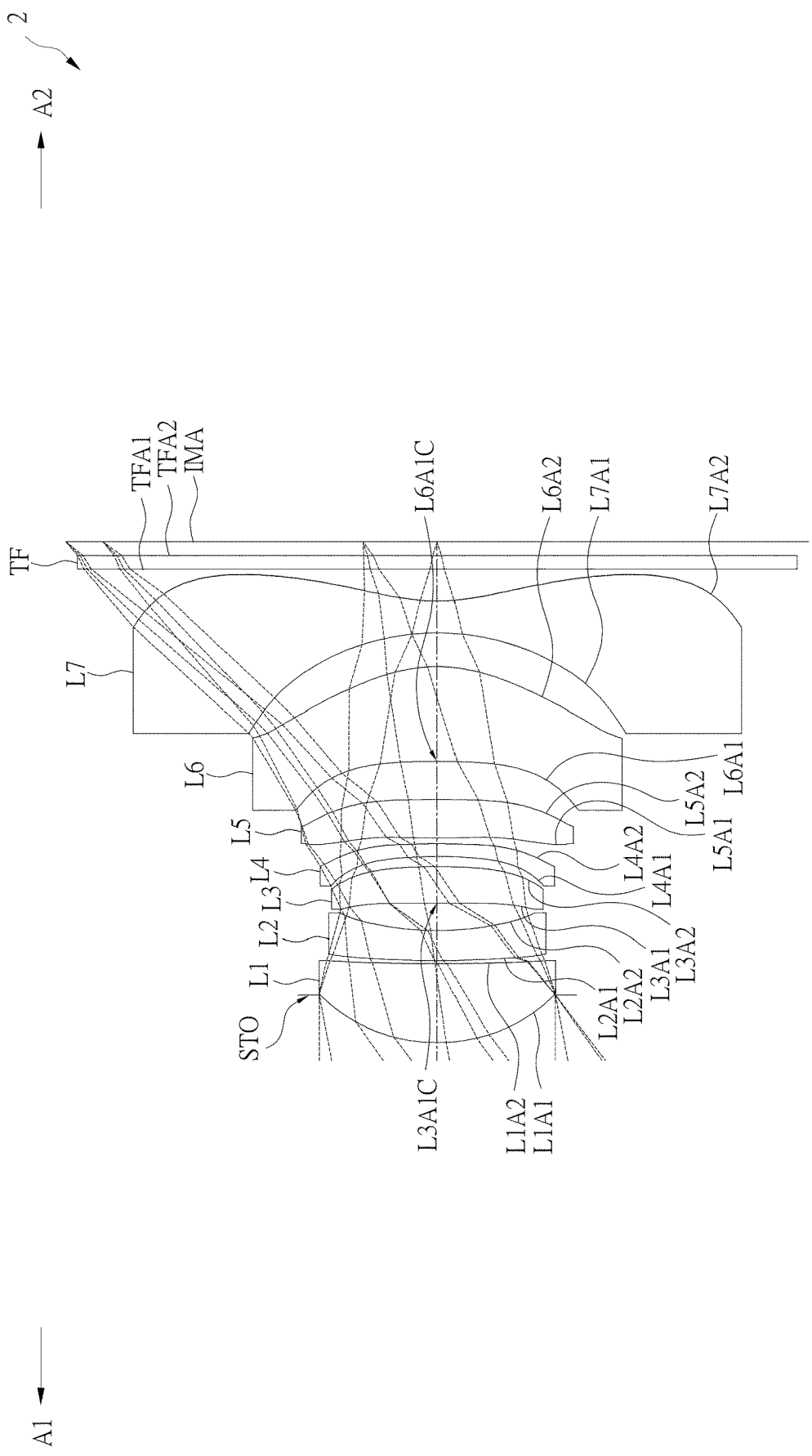
FIG. 8 depicts a cross-sectional view of a second embodiment of an optical imaging lens having seven lens elements according to the present disclosure.

Reference is now made to FIGS. 8, 9A-9D and Tables 3,4. FIG. 8 illustrates an example cross-sectional view of an optical imaging lens 2 having seven lens elements of the optical imaging lens according to a second example embodiment. FIGS. 9A-9D show example charts of a longitudinal spherical aberration and other kinds of optical aberrations of the optical imaging lens 2 according to the second example embodiment. Table 3 shows an example table of optical data of each lens element of the optical imaging lens 2 according to the second example embodiment. Table 4 shows an example table of aspherical data of the optical imaging lens 2 according to the second example embodiment.

As shown in FIG. 8, the optical imaging lens 2 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6 and a seventh lens element L7.

The differences between the second embodiment and the first embodiment may include the radius of curvature, thickness of each lens element, the value of each air gap, aspherical data, related optical parameters, such as back focal length, and the configuration of the concave/convex shape of the object-side surfaces L3A1, L6A1; but the configuration of the concave/convex shape of surfaces, comprising the object-side surfaces L1A1, L2A1, L4A1, L5A1 and L7A1 facing to the object side A1 and the image-side surfaces L1A2, L2A2, L3A2, L4A2, L5A2, L6A2 and L7A2 facing to the image side A2, and positive or negative configuration of the refracting power of each lens element may be similar to those in the first embodiment. Here and in the embodiments hereinafter, for clearly showing the drawings of the present embodiment, only the surface shapes which are different from that in the first embodiment may be labeled. Specifically, an optical axis region L3A1C of the object-side surface L3A1 of the third lens element L3 may be convex, and an optical axis region L6A1C of the object-side surface L6A1 of the sixth lens element L6 may be concave. Please refer to Table 3 for the optical characteristics of each lens elements in the optical imaging lens 2 of the present embodiment, and please refer to Table 23 for the values of V5, TL/Fno, (T1+G12+T2)/T5, TTL/T1, (T6+G67)/T7, EFL/BFL, (T2+G23+T3)/T4, (G23+G45)/G34, (EFL+BFL)/T5, ALT/(G56+T6+G67), EFL/AAG, HFOV/ImgH, (T1+T4+T5)/T3, (T3+T6)/T2, G56/G45, AAG/BFL, G67/(G23+G34), ALT/BFL and TTL/(G12+T7) of the present embodiment.

TABLE 3

Embodiment 2
EFL = 6.084 mm; HFOV = 37.443 degrees; TTL = 7.824 mm
Fno = 1.650; Image Height = 5.800 mm

| Surface # | | Radius of curvature (mm) | Thickness/ air gap (mm) | Refractive index | Abbe number | Focal length (mm) | Material |
|---|---|---|---|---|---|---|---|
| OBJ | Object | INFINITY | INFINITY | | | | |
| STO | Aperture stop | INFINITY | −0.746 | | | | |
| L1A1 | 1st lens element | 2.656 | 1.237 | 1.545 | 55.987 | 5.400 | Plastic |
| L1A2 | | 22.299 | 0.050 | | | | |
| L2A1 | 2nd lens element | 11.469 | 0.460 | 1.661 | 20.373 | −11.967 | Plastic |
| L2A2 | | 4.631 | 0.425 | | | | |
| L3A1 | 3rd lens element | 41.029 | 0.576 | 1.545 | 55.987 | 14.851 | Plastic |
| L3A2 | | −10.062 | 0.158 | | | | |
| L4A1 | 4th lens element | −6.098 | 0.200 | 1.661 | 20.373 | −17.695 | Plastic |
| L4A2 | | −12.780 | 0.089 | | | | |
| L5A1 | 5th lens element | 14.110 | 0.603 | 1.567 | 37.533 | 20.425 | Plastic |
| L5A2 | | −65.402 | 0.598 | | | | |
| L6A1 | 6th lens element | −13.885 | 1.475 | 1.545 | 55.987 | 4.883 | Plastic |
| L6A2 | | −2.322 | 0.525 | | | | |
| L7A1 | 7th lens element | −4.061 | 0.502 | 1.545 | 55.987 | −3.016 | Plastic |
| L7A2 | | 2.893 | 0.500 | | | | |
| TFA1 | Filtering unit | INFINITY | 0.210 | 1.517 | 64.167 | | |
| TFA2 | | INFINITY | 0.215 | | | | |
| IMA | Image plane | INFINITY | | | | | |

The values of each aspherical parameter are shown in Table 4.

TABLE 4

Embodiment 2
Aspherical Parameters

| Surface # | K | a2 | a4 | a6 |
|---|---|---|---|---|
| L1A1 | 0.000000E+00 | 0.000000E+00 | 8.781331E−04 | 6.100431E−04 |
| L1A2 | 0.000000E+00 | 0.000000E+00 | −2.026862E−02 | 2.249441E−02 |
| L2A1 | 0.000000E+00 | 0.000000E+00 | −2.753504E−02 | 2.376840E−02 |
| L2A2 | −1.601058E+00 | 0.000000E+00 | −7.276970E−03 | 6.160539E−03 |
| L3A1 | 0.000000E+00 | 0.000000E+00 | −1.924851E−02 | −2.520318E−03 |
| L3A2 | 0.000000E+00 | 0.000000E+00 | −2.541756E−03 | −3.232797E−02 |
| L4A1 | 0.000000E+00 | 0.000000E+00 | 5.761679E−02 | −1.153697E−01 |
| L4A2 | 0.000000E+00 | 0.000000E+00 | 4.482853E−02 | −1.157079E−01 |
| L5A1 | 0.000000E+00 | 0.000000E+00 | −2.125381E−02 | −3.146571E−02 |
| L5A2 | 0.000000E+00 | 0.000000E+00 | −2.679481E−02 | 1.004075E−03 |
| L6A1 | 0.000000E+00 | 0.000000E+00 | −2.217459E−02 | 2.774199E−03 |
| L6A2 | −2.590226E+00 | 0.000000E+00 | 1.114016E−02 | −7.590514E−03 |
| L7A1 | 0.000000E+00 | 0.000000E+00 | −6.528064E−03 | 1.919100E−03 |
| L7A2 | −8.637397E+00 | 0.000000E+00 | −1.506899E−02 | 3.715787E−03 |

| Surface # | a8 | a10 | a12 | a14 |
|---|---|---|---|---|
| L1A1 | −6.555885E−04 | 5.959465E−04 | −2.697698E−04 | 6.229016E−05 |
| L1A2 | −1.442703E−02 | 6.363297E−03 | −1.891217E−03 | 3.371489E−04 |
| L2A1 | −1.322003E−02 | 5.417369E−03 | −1.524767E−03 | 2.741451E−04 |
| L2A2 | −6.874591E−04 | −6.189928E−04 | 7.534659E−04 | −2.911273E−04 |
| L3A1 | −2.094973E−05 | −1.034206E−03 | 1.128832E−03 | −3.829534E−04 |
| L3A2 | 2.109689E−02 | −1.011295E−02 | 3.442618E−03 | −6.542741E−04 |
| L4A1 | 9.177537E−02 | −4.909547E−02 | 1.519609E−02 | −1.638396E−03 |
| L4A2 | 9.745471E−02 | −5.014942E−02 | 1.497085E−02 | −1.570222E−03 |
| L5A1 | 2.798423E−02 | −1.328666E−02 | 5.119334E−03 | −1.466502E−03 |
| L5A2 | 3.955285E−04 | −2.031072E−03 | 2.133200E−03 | −1.010260E−03 |
| L6A1 | −2.579289E−03 | 1.051871E−03 | −2.499450E−04 | 3.149808E−05 |

TABLE 4-continued

Embodiment 2
Aspherical Parameters

| | | | | |
|---|---|---|---|---|
| L6A2 | 3.522192E−03 | −1.251995E−03 | 3.330580E−04 | −6.071411E−05 |
| L7A1 | −2.838446E−04 | 5.668717E−05 | −2.607878E−05 | 6.784554E−06 |
| L7A2 | −6.740159E−04 | 8.364240E−05 | −7.041126E−06 | 3.924548E−07 |

| Surface # | a16 | a18 | a20 |
|---|---|---|---|
| L1A1 | −5.916065E−06 | | |
| L1A2 | −2.718512E−05 | | |
| L2A1 | −2.317092E−05 | | |
| L2A2 | 5.378407E−05 | | |
| L3A1 | 5.256039E−05 | | |
| L3A2 | 4.387794E−05 | | |
| L4A1 | −4.337010E−04 | 1.374905E−04 | −9.307326E−06 |
| L4A2 | −4.451939E−04 | 1.577161E−04 | −1.426720E−05 |
| L5A1 | 2.604978E−04 | −2.450528E−05 | 9.232799E−07 |
| L5A2 | 2.585970E−04 | −3.537575E−05 | 2.047604E−06 |
| L6A1 | −6.838843E−07 | −6.021940E−07 | 8.351786E−08 |
| L6A2 | 6.868144E−06 | −4.245496E−07 | 1.086270E−08 |
| L7A1 | −9.591857E−07 | 7.009541E−08 | −2.048537E−09 |
| L7A2 | −1.386376E−08 | 2.808310E−10 | −2.484000E−12 |

As the longitudinal spherical aberration shown in FIG. 9A, the offset of the off-axis light relative to the image point may be within −0.008~0.012 mm. As the field curvature aberration in the sagittal direction shown in FIG. 9B, the focus variation with regard to the three wavelengths in the whole field may fall within −0.015~0.01 mm. As the field curvature aberration in the tangential direction shown in FIG. 9C, the focus variation with regard to the three wavelengths in the whole field may fall within −0.015~0.05 mm. As shown in FIG. 9D, the variation of the distortion aberration may be within 0~25%. Compared with the first embodiment, the longitudinal spherical aberration of the present embodiment is smaller.

According to the values of the aberrations, it is shown that the optical imaging lens 2 of the present embodiment, with system length as short as 7.824 mm, HFOV as great as 37.443 degrees, Fno as small as 1.650 and image height as great as 5.800 mm, may be capable of providing good imaging quality.

Figure 10:
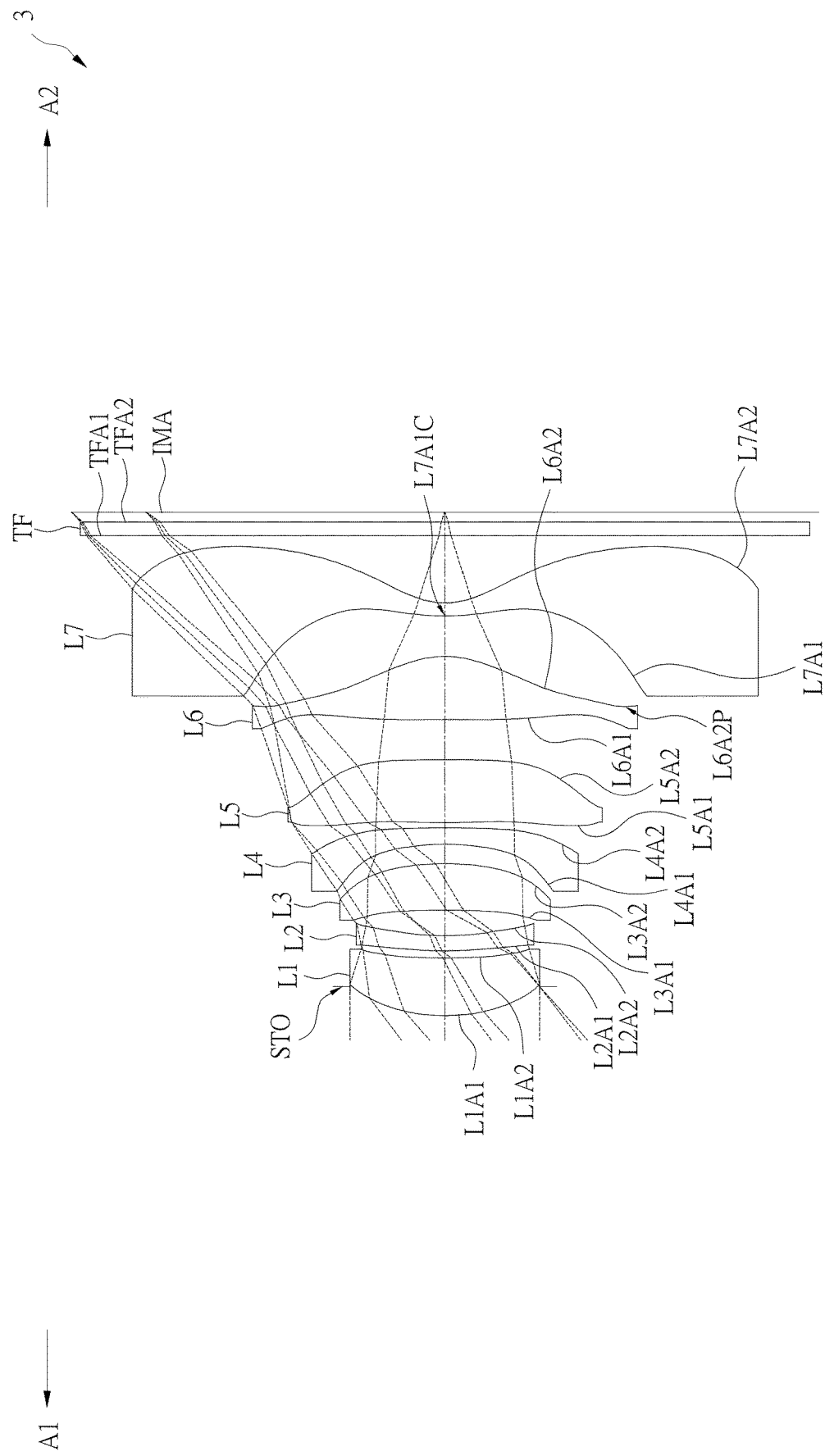
FIG. 10 depicts a cross-sectional view of a third embodiment of an optical imaging lens having seven lens elements according to the present disclosure.

Reference is now made to FIGS. 10, 11A-11D and Tables 5, 6. FIG. 10 illustrates an example cross-sectional view of an optical imaging lens 3 having seven lens elements of the optical imaging lens according to a third example embodiment. FIGS. 11A-11D show example charts of a longitudinal spherical aberration and other kinds of optical aberrations of the optical imaging lens 3 according to the third example embodiment. Table 5 shows an example table of optical data of each lens element of the optical imaging lens 3 according to the third example embodiment. Table 6 shows an example table of aspherical data of the optical imaging lens 3 according to the third example embodiment.

As shown in FIG. 10, the optical imaging lens 3 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6 and a seventh lens element L7.

The differences between the third embodiment and the first embodiment may include the radius of curvature and thickness of each lens element, the value of each air gap, aspherical data, related optical parameters, such as back focal length, and the configuration of the object-side surface L7A1 and the image-side surface L6A2; but the configuration of the concave/convex shape of surfaces, comprising the object-side surfaces L1A1, L2A1, L3A1, L4A1, L5A1 and L6A1 facing to the object side A1 and the image-side surfaces L1A2, L2A2, L3A2, L4A2, L5A2 and L7A2 facing to the image side A2, and positive or negative configuration of the refracting power of each lens element may be similar to those in the first embodiment. Specifically, a periphery region L6A2P of the image-side surface L6A2 of the sixth lens element L6 may be concave, and an optical axis region L7A1C of the object-side surface L7A1 of the seventh lens element L7 may be convex. Please refer to Table 5 for the optical characteristics of each lens elements in the optical imaging lens 3 of the present embodiment, and please refer to Table 23 for the values of V5, TL/Fno, (T1+G12+T2)/T5, TTL/T1, (T6+G67)/T7, EFL/BFL, (T2+G23+T3)/T4, (G23+G45)/G34, (EFL+BFL)/T5, ALT/(G56+T6+G67), EFL/AAG, HFOV/ImgH, (T1+T4+T5)/T3, (T3+T6)/T2, G56/G45, AAG/BFL, G67/(G23+G34), ALT/BFL and TTL/(G12+T7) of the present embodiment.

TABLE 5

Embodiment 3
EFL = 4.861 mm; HFOV = 41.556 degrees; TTL = 7.835 mm
Fno = 1.650; Image Height = 5.800 mm

| Surface # | | Radius of curvature (mm) | Thickness/ air gap (mm) | Refractive index | Abbe number | Focal length (mm) | Material |
|---|---|---|---|---|---|---|---|
| OBJ | Object | INFINITY | INFINITY | | | | |
| STO | Aperture stop | INFINITY | −0.452 | | | | |
| L1A1 | 1st lens element | 2.887 | 0.897 | 1.545 | 55.987 | 7.001 | Plastic |

TABLE 5-continued

Embodiment 3
EFL = 4.861 mm; HFOV = 41.556 degrees; TTL = 7.835 mm
Fno = 1.650; Image Height = 5.800 mm

| Surface # | | Radius of curvature (mm) | Thickness/ air gap (mm) | Refractive index | Abbe number | Focal length (mm) | Material |
|---|---|---|---|---|---|---|---|
| L1A2 | | 10.484 | 0.113 | | | | |
| L2A1 | 2nd lens element | 5.895 | 0.225 | 1.661 | 20.373 | −16.810 | Plastic |
| L2A2 | | 3.805 | 0.397 | | | | |
| L3A1 | 3rd lens element | −23.408 | 0.727 | 1.545 | 55.987 | 10.456 | Plastic |
| L3A2 | | −4.642 | 0.304 | | | | |
| L4A1 | 4th lens element | −3.982 | 0.259 | 1.661 | 20.373 | −7.807 | Plastic |
| L4A2 | | −17.352 | 0.080 | | | | |
| L5A1 | 5th lens element | 14.151 | 0.979 | 1.567 | 37.533 | 23.416 | Plastic |
| L5A2 | | −227.702 | 0.626 | | | | |
| L6A1 | 6th lens element | 69.247 | 0.980 | 1.545 | 55.987 | 2.610 | Plastic |
| L6A2 | | −1.449 | 0.632 | | | | |
| L7A1 | 7th lens element | 3.989 | 0.200 | 1.545 | 55.987 | −2.827 | Plastic |
| L7A2 | | 1.094 | 1.050 | | | | |
| TFA1 | Filtering unit | INFINITY | 0.210 | 1.517 | 64.167 | | |
| TFA2 | | INFINITY | 0.155 | | | | |
| IMA | Image plane | INFINITY | | | | | |

The values of each aspherical parameter are shown in Table 6.

TABLE 6

Embodiment 3
Aspherical Parameters

| Surface # | K | a2 | a4 | a6 |
|---|---|---|---|---|
| L1A1 | 0.000000E+00 | 0.000000E+00 | 8.997084E−03 | −6.158769E−04 |
| L1A2 | 0.000000E+00 | 0.000000E+00 | 2.132621E−02 | −7.334948E−03 |
| L2A1 | 0.000000E+00 | 0.000000E+00 | −1.395203E−02 | −1.236963E−02 |
| L2A2 | −8.564885E+00 | 0.000000E+00 | −7.160183E−03 | −5.401379E−03 |
| L3A1 | 0.000000E+00 | 0.000000E+00 | −2.076175E−02 | 2.358036E−03 |
| L3A2 | 0.000000E+00 | 0.000000E+00 | −1.251366E−02 | −1.038897E−02 |
| L4A1 | 0.000000E+00 | 0.000000E+00 | 3.118274E−02 | −6.436110E−02 |
| L4A2 | 0.000000E+00 | 0.000000E+00 | 4.367487E−02 | −9.540378E−02 |
| L5A1 | 0.000000E+00 | 0.000000E+00 | −1.062542E−02 | −3.445294E−02 |
| L5A2 | 0.000000E+00 | 0.000000E+00 | −2.839969E−02 | 1.192077E−02 |
| L6A1 | 0.000000E+00 | 0.000000E+00 | −9.558522E−03 | 2.288231E−02 |
| L6A2 | −4.526625E+00 | 0.000000E+00 | −2.356059E−02 | 2.535208E−02 |
| L7A1 | 0.000000E+00 | 0.000000E+00 | −2.021563E−03 | −4.692481E−02 |
| L7A2 | −1.660603E+00 | 0.000000E+00 | −8.392899E−02 | 2.022735E−02 |

| Surface # | a8 | a10 | a12 | a14 |
|---|---|---|---|---|
| L1A1 | 5.416414E−03 | −5.384534E−03 | 3.337677E−03 | −1.049961E−03 |
| L1A2 | 2.863888E−03 | 2.703502E−03 | −3.153253E−03 | 1.124817E−03 |
| L2A1 | 8.235675E−03 | −9.359931E−04 | −2.795476E−03 | 2.226328E−03 |
| L2A2 | −4.070694E−03 | 1.377166E−02 | −1.288431E−02 | 6.314193E−03 |
| L3A1 | −1.905767E−02 | 2.333896E−02 | −1.700578E−02 | 6.724515E−03 |
| L3A2 | −6.433210E−04 | 7.489189E−04 | −6.235332E−04 | 3.878809E−04 |
| L4A1 | 3.192862E−02 | −4.743169E−03 | −1.154643E−02 | 1.007065E−02 |
| L4A2 | 8.586757E−02 | −5.149423E−02 | 2.088930E−02 | −5.641808E−03 |
| L5A1 | 3.095334E−02 | −1.316883E−02 | 3.431140E−03 | −5.771727E−04 |
| L5A2 | −1.525916E−02 | 8.735260E−03 | −3.027001E−03 | 6.823309E−04 |
| L6A1 | −1.448492E−02 | 5.076163E−03 | −1.108448E−03 | 1.489763E−04 |
| L6A2 | −1.235093E−02 | 4.485607E−03 | −1.092822E−03 | 1.632156E−04 |
| L7A1 | 2.243278E−02 | −5.775942E−03 | 9.467493E−04 | −1.034084E−04 |
| L7A2 | −3.037234E−03 | 3.049316E−04 | −2.082271E−05 | 9.550952E−07 |

| Surface # | a16 | a18 | a20 |
|---|---|---|---|
| L1A1 | 1.446679E−04 | | |
| L1A2 | −4.280983E−05 | | |
| L2A1 | −4.934293E−04 | | |
| L2A2 | −1.143777E−03 | | |
| L3A1 | −9.890392E−04 | | |
| L3A2 | −7.537711E−05 | | |
| L4A1 | −3.801949E−03 | 7.199255E−04 | −5.413048E−05 |
| L4A2 | 9.688363E−04 | −9.519187E−05 | 4.046900E−06 |

TABLE 6-continued

Embodiment 3
Aspherical Parameters

| L5A1 | 6.160631E−05 | −3.806793E−06 | 1.043276E−07 |
| L5A2 | −9.589837E−05 | 7.531298E−06 | −2.487193E−07 |
| L6A1 | −1.181843E−05 | 5.036289E−07 | −8.812686E−09 |
| L6A2 | −1.423313E−05 | 6.657067E−07 | −1.291681E−08 |
| L7A1 | 7.402484E−06 | −3.178951E−07 | 6.254050E−09 |
| L7A2 | −2.816902E−08 | 4.825710E−10 | −3.651000E−12 |

Figure 11A:
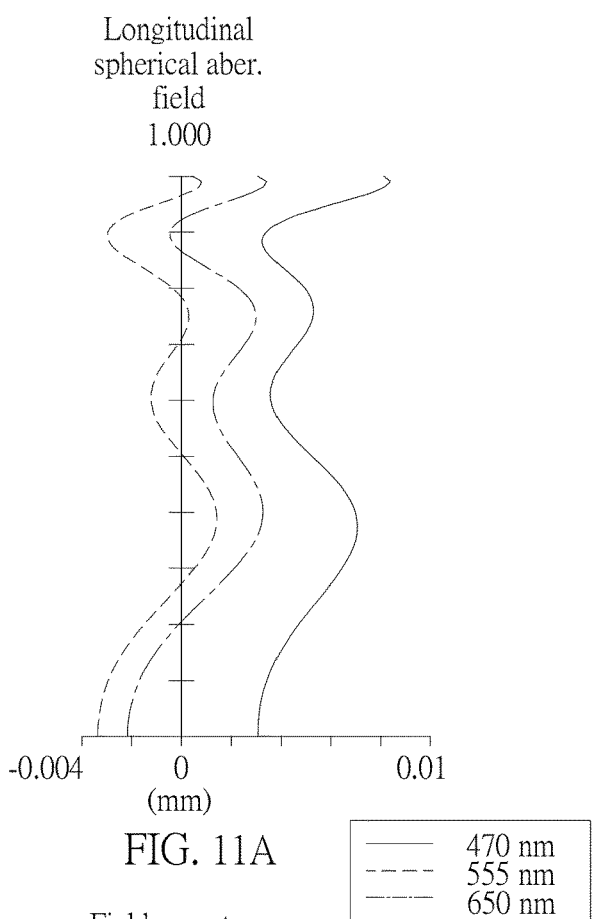
FIGS. 11A-11D depict charts of a longitudinal spherical aberration and other kinds of optical aberrations of a third embodiment of the optical imaging lens according to the present disclosure.
Figure 11B:
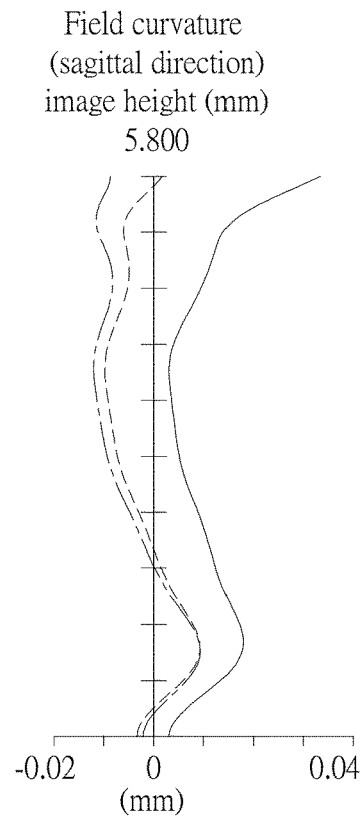
Figure 11C:
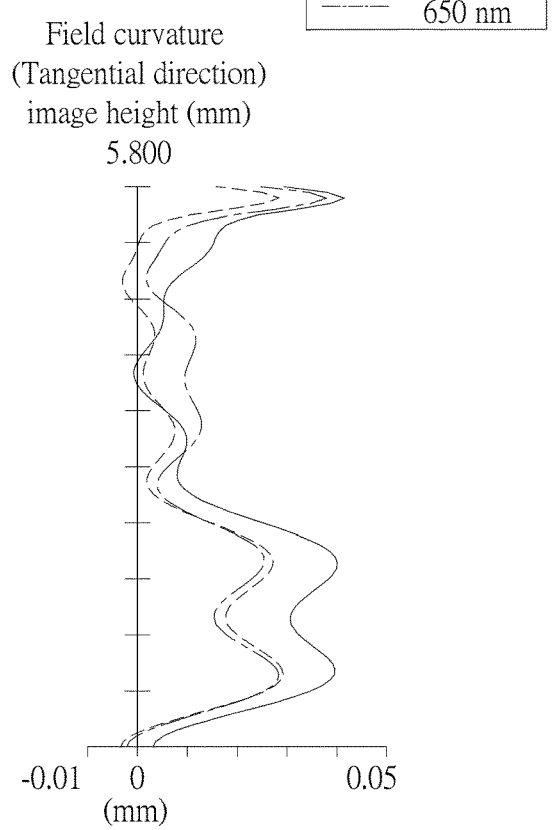
Figure 11D:
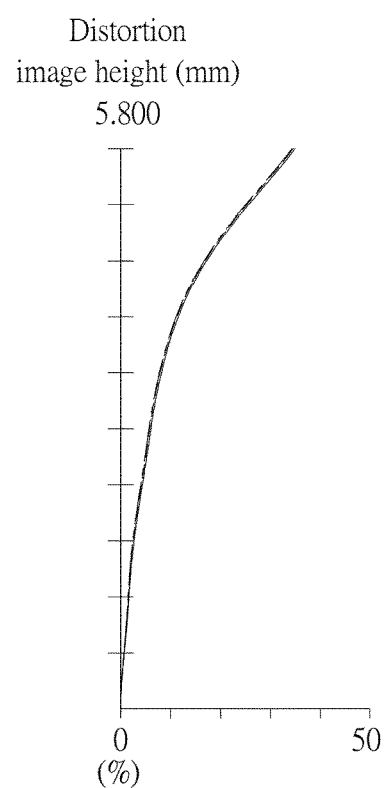

As the longitudinal spherical aberration shown in FIG. 11A, the offset of the off-axis light relative to the image point may be within −0.004~0.009 mm. As the field curvature aberration in the sagittal direction shown in FIG. 11B, the focus variation with regard to the three wavelengths in the whole field may fall within −0.015~0.04 mm. As the field curvature aberration in the tangential direction shown in FIG. 11C, the focus variation with regard to the three wavelengths in the whole field may fall within −0.01~0.04 mm. As shown in FIG. 11D, the variation of the distortion aberration may be within 0~35%. Compared with the first embodiment, the longitudinal spherical aberration may be smaller in the present embodiment.

According to the values of the aberrations, it is shown that the optical imaging lens 3 of the present embodiment, with system length as short as 7.835 mm, HFOV as great as 41.556 degrees, Fno as small as 1.650 and image height as great as 5.800 mm, may be capable of providing good imaging quality.

Figure 12:
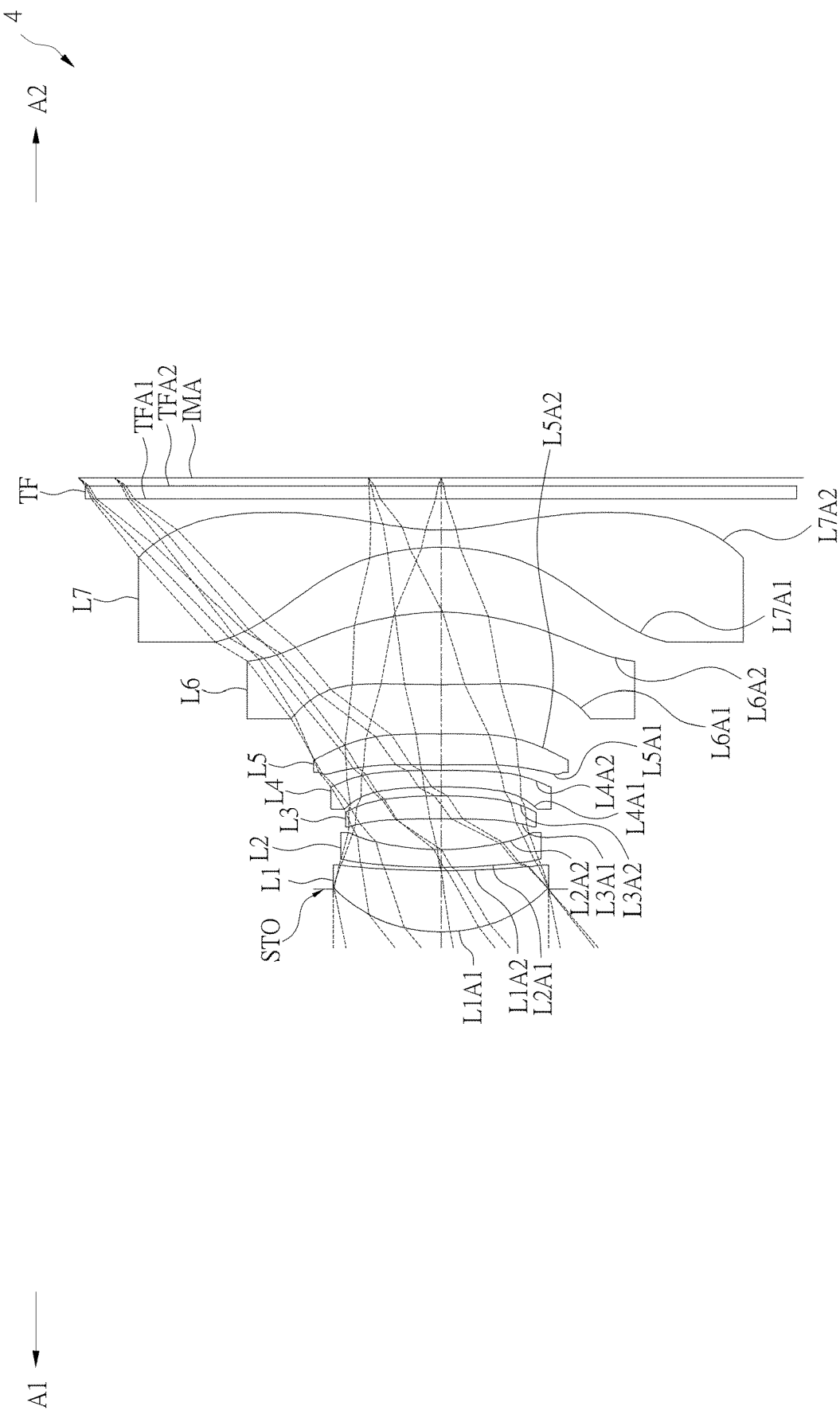
FIG. 12 depicts a cross-sectional view of a fourth embodiment of an optical imaging lens having seven lens elements according to the present disclosure.

Reference is now made to FIGS. 12, 13A-13D and Tables 7, 8. FIG. 12 illustrates an example cross-sectional view of an optical imaging lens 4 having seven lens elements of the optical imaging lens according to a fourth example embodiment. FIGS. 13A-13D show example charts of a longitudinal spherical aberration and other kinds of optical aberrations of the optical imaging lens 4 according to the fourth embodiment. Table 7 shows an example table of optical data of each lens element of the optical imaging lens 4 according to the fourth example embodiment. Table 8 shows an example table of aspherical data of the optical imaging lens 4 according to the fourth example embodiment.

As shown in FIG. 12, the optical imaging lens 4 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6 and a seventh lens element L7.

The differences between the fourth embodiment and the first embodiment may include the radius of curvature and thickness of each lens element, the value of each air gap, aspherical data and related optical parameters, such as back focal length; but the configuration of the concave/convex shape of surfaces, comprising the object-side surfaces L1A1, L2A1, L3A1, L4A1, L5A1, L6A1 and L7A1 facing to the object side A1 and the image-side surfaces L1A2, L2A2, L3A2, L4A2, L5A2, L6A2 and L7A2 facing to the image side A2, and positive or negative configuration of the refracting power of each lens element may be similar to those in the first embodiment. Please refer to Table 7 for the optical characteristics of each lens elements in the optical imaging lens 4 of the present embodiment, please refer to Table 23 for the values of V5, TL/Fno, (T1+G12+T2)/T5, TTL/T1, (T6+G67)/T7, EFL/BFL, (T2+G23+T3)/T4, (G23+G45)/G34, (EFL+BFL)/T5, ALT/(G56+T6+G67), EFL/AAG, HFOV/ImgH, (T1+T4+T5)/T3, (T3+T6)/T2, G56/G45, AAG/BFL, G67/(G23+G34), ALT/BFL and TTL/(G12+T7) of the present embodiment.

TABLE 7

Embodiment 4
EFL = 5.691 mm; HFOV = 40.610 degrees; TTL = 7.282 mm
Fno = 1.650; Image Height = 5.800 mm

| Surface # | | Radius of curvature (mm) | Thickness/ air gap (mm) | Refractive index | Abbe number | Focal length (mm) | Material |
|---|---|---|---|---|---|---|---|
| OBJ | Object | INFINITY | INFINITY | | | | |
| STO | Aperture stop | INFINITY | −0.678 | | | | |
| L1A1 | 1st lens element | 2.557 | 0.977 | 1.545 | 55.987 | 5.714 | Plastic |
| L1A2 | | 12.235 | 0.050 | | | | |
| L2A1 | 2nd lens element | 7.722 | 0.289 | 1.661 | 20.373 | −15.840 | Plastic |
| L2A2 | | 4.395 | 0.493 | | | | |
| L3A1 | 3rd lens element | −31.392 | 0.369 | 1.545 | 55.987 | 20.709 | Plastic |
| L3A2 | | −8.351 | 0.145 | | | | |
| L4A1 | 4th lens element | −7.135 | 0.264 | 1.661 | 20.373 | −20.000 | Plastic |
| L4A2 | | −15.564 | 0.088 | | | | |
| L5A1 | 5th lens element | 19.742 | 0.497 | 1.567 | 37.533 | 31.568 | Plastic |
| L5A2 | | −200.569 | 0.784 | | | | |
| L6A1 | 6th lens element | 19.904 | 1.166 | 1.545 | 55.987 | 5.867 | Plastic |
| L6A2 | | −3.741 | 1.039 | | | | |
| L7A1 | 7th lens element | −4.557 | 0.279 | 1.545 | 55.987 | −3.604 | Plastic |
| L7A2 | | 3.541 | 0.500 | | | | |

TABLE 7-continued

Embodiment 4
EFL = 5.691 mm; HFOV = 40.610 degrees; TTL = 7.282 mm
Fno = 1.650; Image Height = 5.800 mm

| Surface # | | Radius of curvature (mm) | Thickness/ air gap (mm) | Refractive index | Abbe number | Focal length (mm) | Material |
|---|---|---|---|---|---|---|---|
| TFA1 | Filtering unit | INFINITY | 0.210 | 1.517 | 64.167 | | |
| TFA2 | | INFINITY | 0.131 | | | | |
| IMA | Image plane | INFINITY | | | | | |

The values of each aspherical parameter are shown in Table 8.

TABLE 8

Embodiment 4
Aspherical Parameters

| Surface # | K | a2 | a4 | a6 |
|---|---|---|---|---|
| L1A1 | 0.000000E+00 | 0.000000E+00 | 1.833470E−03 | 1.002707E−03 |
| L1A2 | 0.000000E+00 | 0.000000E+00 | −3.138832E−02 | 3.888593E−02 |
| L2A1 | 0.000000E+00 | 0.000000E+00 | −4.297455E−02 | 4.473856E−02 |
| L2A2 | −1.214982E+00 | 0.000000E+00 | −1.274822E−02 | 1.688545E−02 |
| L3A1 | 0.000000E+00 | 0.000000E+00 | −1.537279E−02 | −1.065848E−02 |
| L3A2 | 0.000000E+00 | 0.000000E+00 | 1.656080E−02 | −7.545893E−02 |
| L4A1 | 0.000000E+00 | 0.000000E+00 | 6.942091E−02 | −1.620029E−01 |
| L4A2 | 0.000000E+00 | 0.000000E+00 | 5.515905E−02 | −1.389839E−01 |
| L5A1 | 0.000000E+00 | 0.000000E+00 | −2.852347E−02 | −2.470703E−02 |
| L5A2 | 0.000000E+00 | 0.000000E+00 | −4.676869E−02 | 1.440154E−02 |
| L6A1 | 0.000000E+00 | 0.000000E+00 | −1.090571E−02 | −8.675314E−04 |
| L6A2 | −3.738984E+00 | 0.000000E+00 | 1.076985E−02 | −3.562059E−03 |
| L7A1 | 0.000000E+00 | 0.000000E+00 | −2.027298E−02 | 6.920649E−03 |
| L7A2 | −1.065801E+01 | 0.000000E+00 | −1.497748E−02 | 3.313175E−03 |

| Surface # | a8 | a10 | a12 | a14 |
|---|---|---|---|---|
| L1A1 | −8.602901E−04 | 8.737287E−04 | −4.138447E−04 | 1.027836E−04 |
| L1A2 | −2.966419E−02 | 1.608783E−02 | −5.824588E−03 | 1.226983E−03 |
| L2A1 | −3.085514E−02 | 1.608179E−02 | −5.835162E−03 | 1.286438E−03 |
| L2A2 | −1.090860E−02 | 6.822785E−03 | −2.935964E−03 | 7.280929E−04 |
| L3A1 | 1.731670E−02 | −1.879353E−02 | 1.127183E−02 | −3.509985E−03 |
| L3A2 | 8.212622E−02 | −5.934255E−02 | 2.657804E−02 | −6.585558E−03 |
| L4A1 | 1.577035E−01 | −1.034020E−01 | 4.016003E−02 | −6.827145E−03 |
| L4A2 | 1.422793E−01 | −9.638827E−02 | 4.438161E−02 | −1.402369E−02 |
| L5A1 | 2.994752E−02 | −1.196854E−02 | 5.331897E−04 | 1.233753E−03 |
| L5A2 | −9.905040E−03 | 6.424519E−03 | −2.672231E−03 | 6.755684E−04 |
| L6A1 | −5.621458E−04 | 1.401792E−04 | −3.299845E−05 | 1.440648E−05 |
| L6A2 | 6.875580E−04 | −2.515032E−04 | 7.052799E−05 | −1.013057E−05 |
| L7A1 | −2.122539E−03 | 4.673142E−04 | −6.292883E−05 | 5.234334E−06 |
| L7A2 | −5.853255E−04 | 7.364088E−05 | −6.290690E−06 | 3.521281E−07 |

| Surface # | a16 | a18 | a20 |
|---|---|---|---|
| L1A1 | −1.036085E−05 | | |
| L1A2 | −1.106617E−04 | | |
| L2A1 | −1.223360E−04 | | |
| L2A2 | −6.230550E−05 | | |
| L3A1 | 4.564795E−04 | | |
| L3A2 | 6.871689E−04 | | |
| L4A1 | −7.873977E−04 | 5.149946E−04 | −6.133720E−05 |
| L4A2 | 2.977469E−03 | −3.845162E−04 | 2.275469E−05 |
| L5A1 | −4.476505E−04 | 6.533701E−05 | −3.605261E−06 |
| L5A2 | −1.023074E−04 | 9.046731E−06 | −3.789987E−07 |
| L6A1 | −4.296104E−06 | 6.073703E−07 | −3.213613E−08 |
| L6A2 | 7.695971E−07 | −3.001768E−08 | 4.784960E−10 |
| L7A1 | −2.644932E−07 | 7.448887E−09 | −8.960900E−11 |
| L7A2 | −1.233320E−08 | 2.447970E−10 | −2.099000E−12 |

Figure 13A:
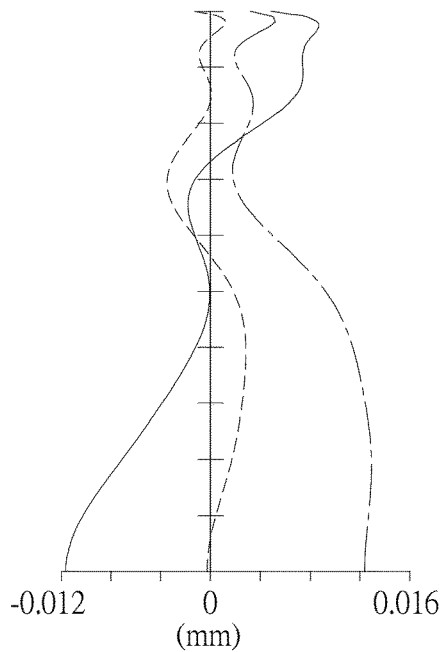
FIGS. 13A-13D depict charts of a longitudinal spherical aberration and other kinds of optical aberrations of a fourth embodiment of the optical imaging lens according to the present disclosure.
Figure 13B:
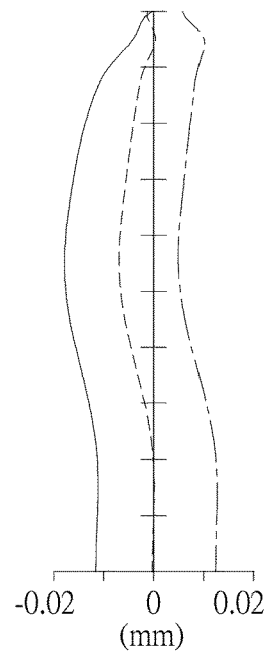
Figure 13C:
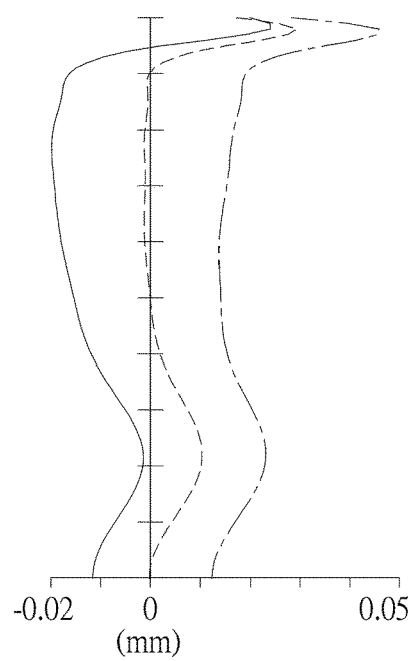
Figure 13D:
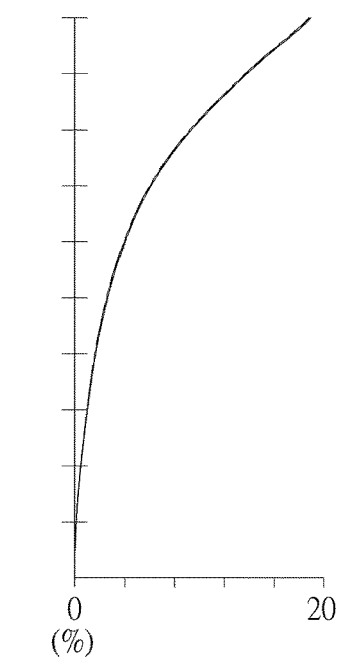

As the longitudinal spherical aberration shown in FIG. 13A, the offset of the off-axis light relative to the image point may be within −0.012~0.013 mm. As the field curvature aberration in the sagittal direction shown in FIG. 13B, the focus variation with regard to the three wavelengths in the whole field may fall within −0.02~0.015 mm. As the field curvature aberration in the tangential direction shown in FIG. 13C, the focus variation with regard to the three wavelengths in the whole field may fall within −0.02~0.02 mm. As shown in FIG. 13D, the variation of the distortion aberration may be within 0~20%. Compared with the first embodiment, the longitudinal spherical aberration, the field curvature aberration in the sagittal direction and the distortion aberration may be smaller in the present embodiment.

According to the values of the aberrations, it is shown that the optical imaging lens 4 of the present embodiment, with system length as short as 7.282 mm, HFOV as great as 40.610 degrees, Fno as small as 1.650 and image height as great as 5.800 mm, may be capable of providing good imaging quality.

Figure 14:
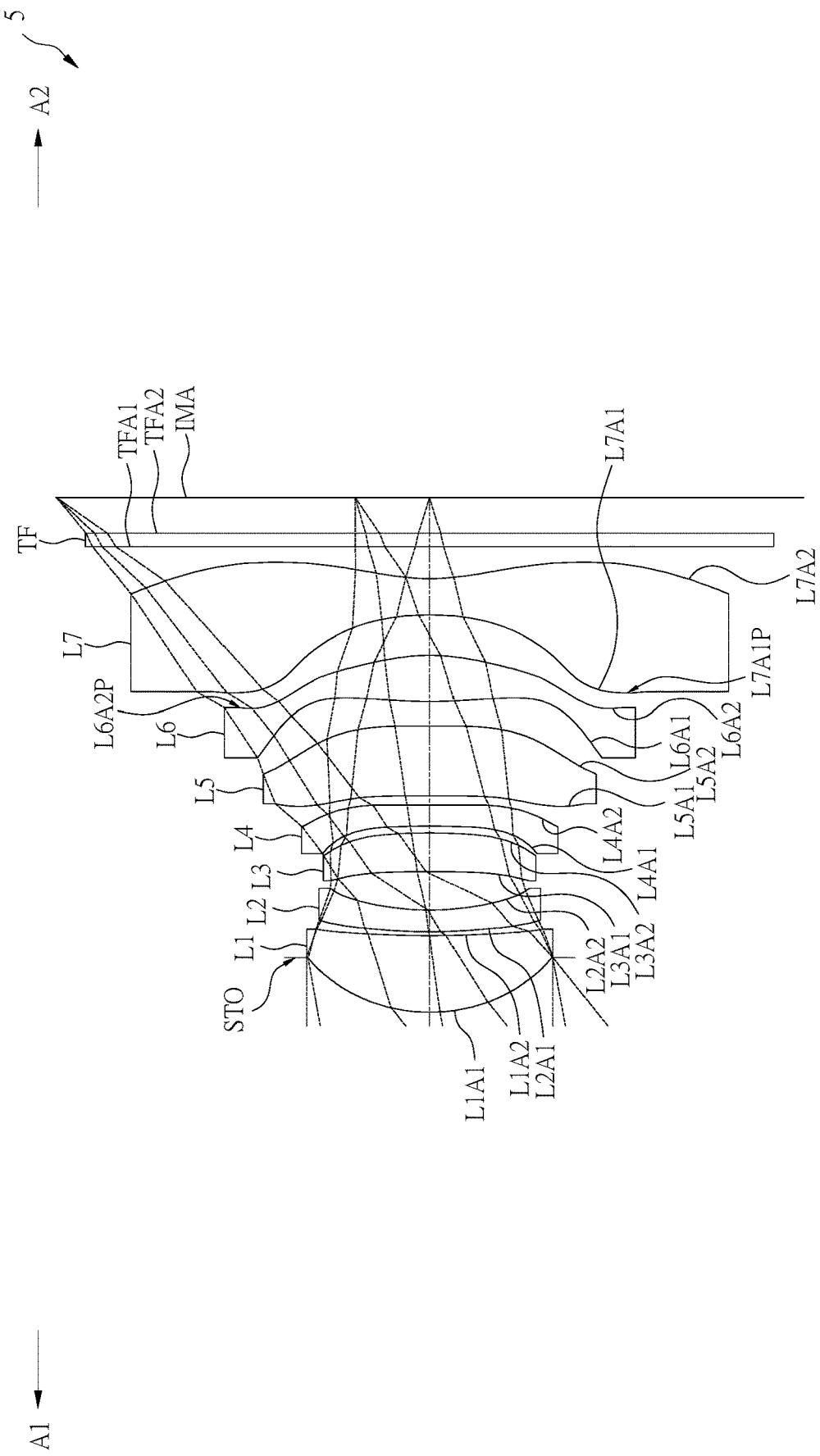
FIG. 14 depicts a cross-sectional view of a fifth embodiment of an optical imaging lens having seven lens elements according to the present disclosure.

Reference is now made to FIGS. 14, 15A-15D and Tables 9, 10. FIG. 14 illustrates an example cross-sectional view of an optical imaging lens 5 having seven lens elements of the optical imaging lens according to a fifth example embodiment. FIGS. 15A-15D show example charts of a longitudinal spherical aberration and other kinds of optical aberrations of the optical imaging lens 5 according to the fifth embodiment. Table 9 shows an example table of optical data of each lens element of the optical imaging lens 5 according to the fifth example embodiment. Table 10 shows an example table of aspherical data of the optical imaging lens 5 according to the fifth example embodiment.

As shown in FIG. 14, the optical imaging lens 5 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6 and a seventh lens element L7.

The differences between the fifth embodiment and the first embodiment may include the radius of curvature and thickness of each lens element, the value of each air gap, aspherical data, related optical parameters, such as back focal length, and the configuration of the object-side surface L7A1 and the image-side surface L6A2; but the configuration of the concave/convex shape of surfaces, comprising the object-side surfaces L1A1, L2A1, L3A1, L4A1, L5A1 and L6A1 facing to the object side A1 and the image-side surfaces L1A2, L2A2, L3A2, L4A2, L5A2 and L7A2 facing to the image side A2, and positive or negative configuration of the refracting power of each lens element may be similar to those in the first embodiment. Specifically, a periphery region L6A2P of the image-side surface L6A2 of the sixth lens element L6 may be concave, and a periphery region L7A1P of the object-side surface L7A1 of the seventh lens element L7 may be convex. Please refer to Table 9 for the optical characteristics of each lens elements in the optical imaging lens 5 of the present embodiment, please refer to Table 23 for the values of V5, TL/Fno, (T1+G12+T2)/T5, TTL/T1, (T6+G67)/T7, EFL/BFL, (T2+G23+T3)/T4, (G23+G45)/G34, (EFL+BFL)/T5, ALT/(G56+T6+G67), EFL/AAG, HFOV/ImgH, (T1+T4+T5)/T3, (T3+T6)/T2, G56/G45, AAG/BFL, G67/(G23+G34), ALT/BFL and TTL/(G12+T7) of the present embodiment.

TABLE 9

Embodiment 5
EFL = 6.315 mm; HFOV = 38.896 degrees; TTL = 8.012 mm
Fno = 1.650; Image Height = 5.800 mm

| Surface # | | Radius of curvature (mm) | Thickness/ air gap (mm) | Refractive index | Abbe number | Focal length (mm) | Material |
|---|---|---|---|---|---|---|---|
| OBJ | Object | INFINITY | INFINITY | | | | |
| STO | Aperture stop | INFINITY | −0.853 | | | | |
| L1A1 | 1st lens element | 2.634 | 1.187 | 1.545 | 55.987 | 5.757 | Plastic |
| L1A2 | | 13.621 | 0.061 | | | | |
| L2A1 | 2nd lens element | 7.072 | 0.339 | 1.661 | 20.373 | −15.677 | Plastic |
| L2A2 | | 4.138 | 0.597 | | | | |
| L3A1 | 3rd lens element | −46.144 | 0.607 | 1.545 | 55.987 | 20.015 | Plastic |
| L3A2 | | −8.880 | 0.107 | | | | |
| L4A1 | 4th lens element | −10.778 | 0.327 | 1.661 | 20.373 | −16.162 | Plastic |
| L4A2 | | −31874.582 | 0.138 | | | | |
| L5A1 | 5th lens element | 138.617 | 1.092 | 1.567 | 37.533 | 242.772 | Plastic |
| L5A2 | | −66594.208 | 0.377 | | | | |
| L6A1 | 6th lens element | 7.637 | 0.717 | 1.545 | 55.987 | 4.269 | Plastic |
| L6A2 | | −3.246 | 0.635 | | | | |
| L7A1 | 7th lens element | −4.517 | 0.563 | 1.545 | 55.987 | −3.307 | Plastic |
| L7A2 | | 3.144 | 0.500 | | | | |
| TFA1 | Filtering unit | INFINITY | 0.210 | 1.517 | 64.167 | | |
| TFA2 | | INFINITY | 0.555 | | | | |
| IMA | Image plane | INFINITY | | | | | |

The values of each aspherical parameter are shown in Table 10.

TABLE 10

Embodiment 5
Aspherical Parameters

| Surface # | K | a2 | a4 | a6 |
|---|---|---|---|---|
| L1A1 | 0.000000E+00 | 0.000000E+00 | 9.441864E−04 | 1.476675E−03 |
| L1A2 | 0.000000E+00 | 0.000000E+00 | −2.282689E−02 | 2.433003E−02 |
| L2A1 | 0.000000E+00 | 0.000000E+00 | −3.467858E−02 | 2.903147E−02 |
| L2A2 | −1.465430E+00 | 0.000000E+00 | −1.092884E−02 | 9.334228E−03 |
| L3A1 | 0.000000E+00 | 0.000000E+00 | −1.818082E−02 | −3.189273E−03 |

TABLE 10-continued

Embodiment 5
Aspherical Parameters

| | | | | |
|---|---|---|---|---|
| L3A2 | 0.000000E+00 | 0.000000E+00 | 3.149552E−02 | −9.546910E−02 |
| L4A1 | 0.000000E+00 | 0.000000E+00 | 6.207474E−02 | −1.388746E−01 |
| L4A2 | 0.000000E+00 | 0.000000E+00 | 2.680043E−02 | −6.700280E−02 |
| L5A1 | 0.000000E+00 | 0.000000E+00 | −1.745960E−02 | −4.384301E−03 |
| L5A2 | 0.000000E+00 | 0.000000E+00 | −4.456650E−02 | 1.607701E−02 |
| L6A1 | 0.000000E+00 | 0.000000E+00 | −2.869350E−02 | 1.673485E−02 |
| L6A2 | −3.567698E+00 | 0.000000E+00 | 1.041395E−02 | 1.834467E−03 |
| L7A1 | 0.000000E+00 | 0.000000E+00 | −2.912252E−02 | 8.786664E−03 |
| L7A2 | −1.056053E+01 | 0.000000E+00 | −1.689537E−02 | 2.908222E−03 |

| Surface # | a8 | a10 | a12 | a14 |
|---|---|---|---|---|
| L1A1 | −1.446183E−03 | 1.032282E−03 | −3.850933E−04 | 7.585519E−05 |
| L1A2 | −1.428437E−02 | 5.445838E−03 | −1.321452E−03 | 1.873801E−04 |
| L2A1 | −1.502036E−02 | 5.376768E−03 | −1.246478E−03 | 1.889337E−04 |
| L2A2 | −3.697314E−04 | −2.380272E−03 | 2.061703E−03 | −7.263138E−04 |
| L3A1 | 1.440751E−03 | −1.281157E−03 | 7.263481E−04 | −1.685962E−04 |
| L3A2 | 7.690966E−02 | −3.876196E−02 | 1.217263E−02 | −2.130974E−03 |
| L4A1 | 1.133092E−01 | −6.913514E−02 | 3.528785E−02 | −1.524960E−02 |
| L4A2 | 3.979951E−02 | −1.270740E−02 | 1.759948E−03 | 1.968785E−04 |
| L5A1 | −4.680454E−03 | 6.964180E−03 | −3.072655E−03 | 7.136815E−04 |
| L5A2 | −1.127478E−02 | 5.315268E−03 | −1.560095E−03 | 2.987703E−04 |
| L6A1 | −1.118435E−02 | 4.252798E−03 | −1.239882E−03 | 2.713914E−04 |
| L6A2 | −9.274604E−04 | −6.616009E−04 | 3.355570E−04 | −6.131574E−05 |
| L7A1 | −3.105789E−03 | 8.800627E−04 | −1.403036E−04 | 1.291352E−05 |
| L7A2 | −3.598916E−04 | 3.226751E−05 | −2.101806E−06 | 9.389519E−08 |

| Surface # | a16 | a18 | a20 |
|---|---|---|---|
| L1A1 | −6.129458E−06 | | |
| L1A2 | −1.214578E−05 | | |
| L2A1 | −1.465093E−05 | | |
| L2A2 | 1.159484E−04 | | |
| L3A1 | 2.328565E−05 | | |
| L3A2 | 1.548405E−04 | | |
| L4A1 | 4.839011E−03 | −9.342477E−04 | 7.985834E−05 |
| L4A2 | −1.240293E−04 | 1.992803E−05 | −1.131322E−06 |
| L5A1 | −9.553265E−05 | 7.019807E−06 | −2.208434E−07 |
| L5A2 | −3.648984E−05 | 2.588317E−06 | −8.131692E−08 |
| L6A1 | −3.931717E−05 | 3.232628E−06 | −1.121378E−07 |
| L6A2 | 5.641135E−06 | −2.638395E−07 | 5.015643E−09 |
| L7A1 | −6.935187E−07 | 2.033529E−08 | −2.527850E−10 |
| L7A2 | −2.623912E−09 | 4.024800E−11 | −2.550000E−13 |

As the longitudinal spherical aberration shown in FIG. 15A, the offset of the off-axis light relative to the image point may be within −0.016~0.016 mm. As the field curvature aberration in the sagittal direction shown in FIG. 15B, the focus variation with regard to the three wavelengths in the whole field may fall within −0.025~0.01 mm. As the field curvature aberration in the tangential direction shown in FIG. 15C, the focus variation with regard to the three wavelengths in the whole field may fall within −0.025~0.035 mm. As shown in FIG. 15D, the variation of the distortion aberration may be within 0~14%. Compared with the first embodiment, the distortion aberration may be smaller in the present embodiment.

According to the values of the aberrations, it is shown that the optical imaging lens 5 of the present embodiment, with system length as short as 8.012 mm, HFOV as great as 38.896 degrees, Fno as small as 1.650 and image height as great as 5.800 mm, may be capable of providing good imaging quality.

Figure 16:
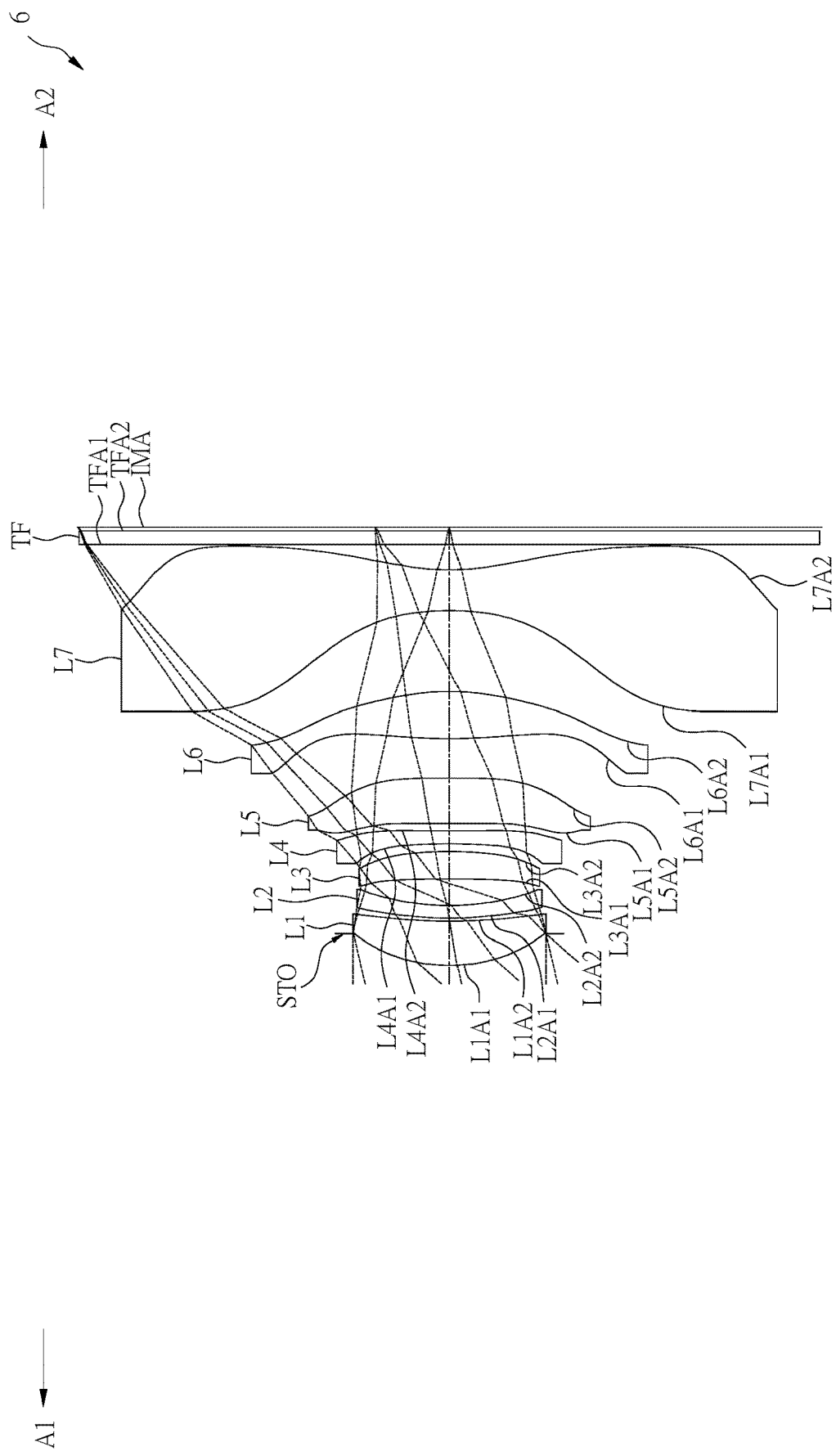
FIG. 16 depicts a cross-sectional view of a sixth embodiment of an optical imaging lens having seven lens elements according to the present disclosure.

Reference is now made to FIGS. 16, 17A-17D and Tables 11, 12. FIG. 16 illustrates an example cross-sectional view of an optical imaging lens 6 having seven lens elements of the optical imaging lens according to a sixth example embodiment. FIGS. 17A-17D show example charts of a longitudinal spherical aberration and other kinds of optical aberrations of the optical imaging lens 6 according to the sixth embodiment. Table 11 shows an example table of optical data of each lens element of the optical imaging lens 6 according to the sixth example embodiment. Table 12 shows an example table of aspherical data of the optical imaging lens 6 according to the sixth example embodiment.

As shown in FIG. 16, the optical imaging lens 6 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6 and a seventh lens element L7.

The differences between the sixth embodiment and the first embodiment may include the radius of curvature and thickness of each lens element, the value of each air gap, aspherical data and related optical parameters, such as back focal length; but the configuration of the concave/convex shape of surfaces, comprising the object-side surfaces L1A1, L2A1, L3A1, L4A1, L5A1, L6A1 and L7A1 facing to the object side A1 and the image-side surfaces L1A2, L2A2, L3A2, L4A2, L5A2, L6A2 and L7A2 facing to the image side A2, and positive or negative configuration of the refracting power of each lens element may be similar to those in the first embodiment. Please refer to Table 11 for the optical characteristics of each lens elements in the optical imaging lens 6 of the present embodiment, please refer to Table 23 for the values of V5, TL/Fno, (T1+G12+T2)/T5, TTL/T1, (T6+G67)/T7, EFL/BFL, (T2+G23+T3)/T4, (G23+G45)/G34, (EFL+BFL)/T5, ALT/(G56+T6+G67), EFL/AAG, HFOV/ImgH, (T1+T4+T5)/T3, (T3+T6)/T2, G56/G45, AAG/BFL, G67/(G23+G34), ALT/BFL and TTL/(G12+T7) of the present embodiment.

TABLE 11

| | Embodiment 6 | | | | | |
|---|---|---|---|---|---|---|
| | EFL = 4.983 mm; HFOV = 48.6910 degrees; TTL = 6.852 mm | | | | | |
| | Fno = 1.650; Image Height = 5.800 mm | | | | | |
| Surface # | | Radius of curvature (mm) | Thickness/ air gap (mm) | Refractive index | Abbe number | Focal length (mm) | Material |
|---|---|---|---|---|---|---|---|
| OBJ | Object | INFINITY | INFINITY | | | | |
| STO | Aperture stop | INFINITY | −0.494 | | | | |
| L1A1 | 1st lens element | 2.588 | 0.685 | 1.545 | 55.987 | 6.901 | Plastic |
| L1A2 | | 7.482 | 0.050 | | | | |
| L2A1 | 2nd lens element | 5.149 | 0.200 | 1.661 | 20.373 | −31.397 | Plastic |
| L2A2 | | 4.069 | 0.414 | | | | |
| L3A1 | 3rd lens element | −37.830 | 0.429 | 1.545 | 55.987 | 13.376 | Plastic |
| L3A2 | | −6.149 | 0.126 | | | | |
| L4A1 | 4th lens element | −7.468 | 0.200 | 1.661 | 20.373 | −11.529 | Plastic |
| L4A2 | | −259.893 | 0.116 | | | | |
| L5A1 | 5th lens element | 25.727 | 0.711 | 1.567 | 37.533 | 32.611 | Plastic |
| L5A2 | | −66.237 | 0.617 | | | | |
| L6A1 | 6th lens element | 9.095 | 0.731 | 1.545 | 55.987 | 4.948 | Plastic |
| L6A2 | | −3.737 | 1.269 | | | | |
| L7A1 | 7th lens element | −4.455 | 0.637 | 1.545 | 55.987 | −3.450 | Plastic |
| L7A2 | | 3.432 | 0.400 | | | | |
| TFA1 | Filtering unit | INFINITY | 0.210 | 1.517 | 64.167 | | |
| TFA2 | | INFINITY | 0.056 | | | | |
| IMA | Image plane | INFINITY | | | | | |

The values of each aspherical parameter are shown in Table 12.

TABLE 12

| | Embodiment 6 Aspherical Parameters | | | |
|---|---|---|---|---|
| Surface # | K | a2 | a4 | a6 |
| L1A1 | 0.000000E+00 | 0.000000E+00 | 2.063203E−03 | 5.392686E−03 |
| L1A2 | 0.000000E+00 | 0.000000E+00 | −1.931071E−02 | 1.681157E−02 |
| L2A1 | 0.000000E+00 | 0.000000E+00 | −2.838591E−02 | 1.702992E−02 |
| L2A2 | −1.046814E+00 | 0.000000E+00 | −6.711320E−03 | 7.908629E−03 |
| L3A1 | 0.000000E+00 | 0.000000E+00 | −1.608384E−02 | −2.011784E−03 |
| L3A2 | 0.000000E+00 | 0.000000E+00 | 1.652477E−02 | −7.359180E−02 |
| L4A1 | 0.000000E+00 | 0.000000E+00 | 7.227604E−02 | −1.531953E−01 |
| L4A2 | 0.000000E+00 | 0.000000E+00 | 4.475953E−02 | −1.002068E−01 |
| L5A1 | 0.000000E+00 | 0.000000E+00 | −4.577639E−02 | 7.261710E−03 |
| L5A2 | 0.000000E+00 | 0.000000E+00 | −4.876579E−02 | 2.842223E−03 |
| L6A1 | 0.000000E+00 | 0.000000E+00 | −6.527796E−03 | −3.891924E−04 |
| L6A2 | −3.058539E+00 | 0.000000E+00 | 1.415515E−02 | −4.336814E−03 |
| L7A1 | 0.000000E+00 | 0.000000E+00 | −2.690550E−02 | 3.630409E−03 |
| L7A2 | −8.914744E+00 | 0.000000E+00 | −1.177946E−02 | 1.674984E−03 |

| Surface # | a8 | a10 | a12 | a14 |
|---|---|---|---|---|
| L1A1 | −8.099555E−03 | 8.141691E−03 | −4.563531E−03 | 1.367152E−03 |
| L1A2 | −1.517196E−02 | 1.411225E−02 | −9.122918E−03 | 3.121223E−03 |
| L2A1 | −9.039038E−03 | 8.066173E−03 | −6.090421E−03 | 2.361259E−03 |
| L2A2 | −5.488416E−03 | 7.411899E−03 | −6.043980E−03 | 2.396981E−03 |
| L3A1 | −1.265514E−03 | −5.761105E−04 | 1.820635E−03 | −1.298979E−03 |
| L3A2 | 6.730484E−02 | −4.372283E−02 | 2.022660E−02 | −5.951571E−03 |
| L4A1 | 1.111206E−01 | −3.937380E−02 | −1.791100E−02 | 3.242570E−02 |
| L4A2 | 1.062991E−01 | −8.847239E−02 | 5.349189E−02 | −2.196779E−02 |
| L5A1 | 1.919988E−02 | −2.291933E−02 | 1.233452E−02 | −3.664230E−03 |
| L5A2 | 6.400220E−03 | −7.332630E−03 | 4.331953E−03 | −1.533251E−03 |
| L6A1 | −1.718380E−03 | 1.019509E−03 | −4.171965E−04 | 1.091801E−04 |

TABLE 12-continued

Embodiment 6
Aspherical Parameters

| | | | | |
|---|---|---|---|---|
| L6A2 | 1.342191E−03 | −6.921872E−04 | 1.831807E−04 | −2.283930E−05 |
| L7A1 | −9.052125E−05 | 4.650235E−06 | −1.175511E−06 | 3.094909E−08 |
| L7A2 | −1.568479E−04 | 1.084504E−05 | −6.575960E−07 | 3.820742E−08 |

| Surface # | a16 | a18 | a20 |
|---|---|---|---|
| L1A1 | −1.727111E−04 | | |
| L1A2 | −4.251301E−04 | | |
| L2A1 | −3.345144E−04 | | |
| L2A2 | −3.593297E−04 | | |
| L3A1 | 2.734860E−04 | | |
| L3A2 | 7.817339E−04 | | |
| L4A1 | −1.862560E−02 | 5.077725E−03 | −5.474979E−04 |
| L4A2 | 5.763861E−03 | −8.680023E−04 | 5.709226E−05 |
| L5A1 | 6.217990E−04 | −5.670934E−05 | 2.157609E−06 |
| L5A2 | 3.224934E−04 | −3.627919E−05 | 1.657468E−06 |
| L6A1 | −1.670550E−05 | 1.357237E−06 | −4.496044E−08 |
| L6A2 | 1.305539E−06 | −2.276430E−08 | −3.654220E−10 |
| L7A1 | 5.504979E−09 | −3.785950E−10 | 7.070000E−12 |
| L7A2 | −1.760682E−09 | 4.673800E−11 | −4.990000E−13 |

Figure 17A:
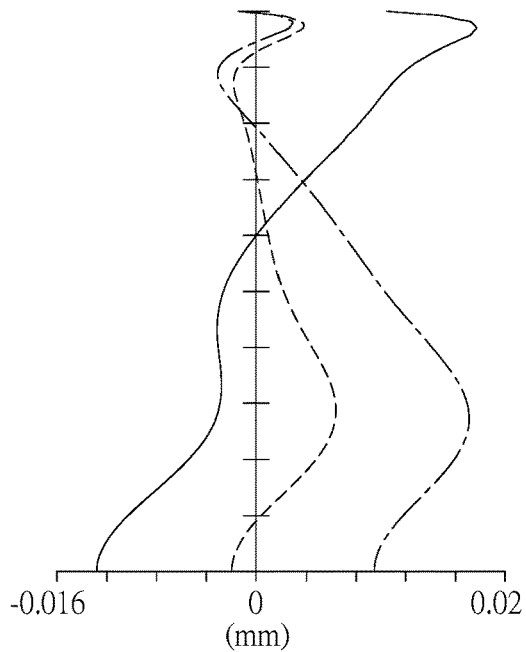
FIGS. 17A-17D depicts charts of a longitudinal spherical aberration and other kinds of optical aberrations of a sixth embodiment of the optical imaging lens according the present disclosure.
Figure 17B:
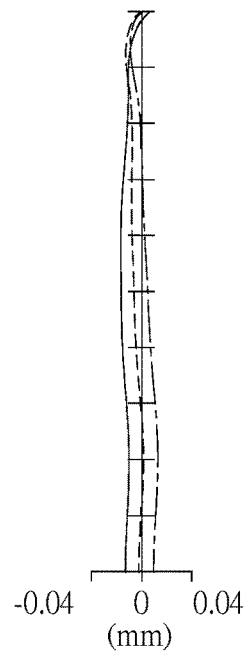
Figure 17C:
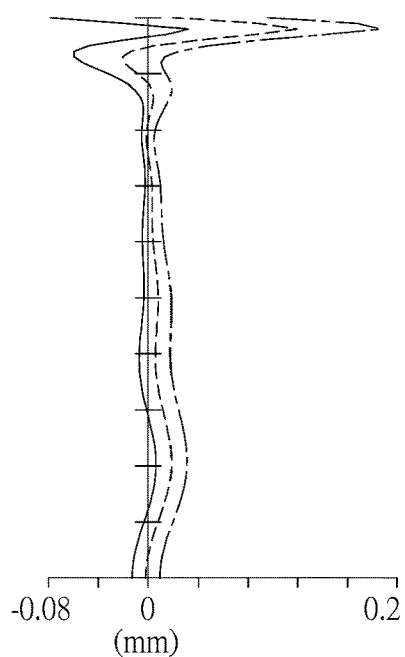
Figure 17D:
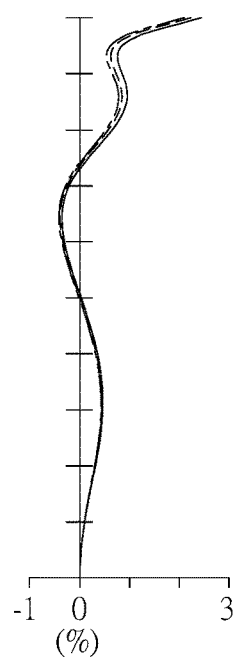

As the longitudinal spherical aberration shown in FIG. 17A, the offset of the off-axis light relative to the image point may be within −0.015~0.018 mm. As the field curvature aberration in the sagittal direction shown in FIG. 17B, the focus variation with regard to the three wavelengths in the whole field may fall within −0.005~0.005 mm. As the field curvature aberration in the tangential direction shown in FIG. 17C, the focus variation with regard to the three wavelengths in the whole field may fall within −0.08~0.2 mm. As shown in FIG. 17D, the variation of the distortion aberration may be within −1~2.5%. Compared with the first embodiment, the field curvature aberration in the sagittal direction and the distortion aberration may be smaller in the present embodiment.

According to the values of the aberrations, it is shown that the optical imaging lens 6 of the present embodiment, with system length as short as 6.852 mm, HFOV as great as 48.691 degrees, Fno as small as 1.650 and image height as great as 5.800 mm, may be capable of providing good imaging quality.

Figure 18:
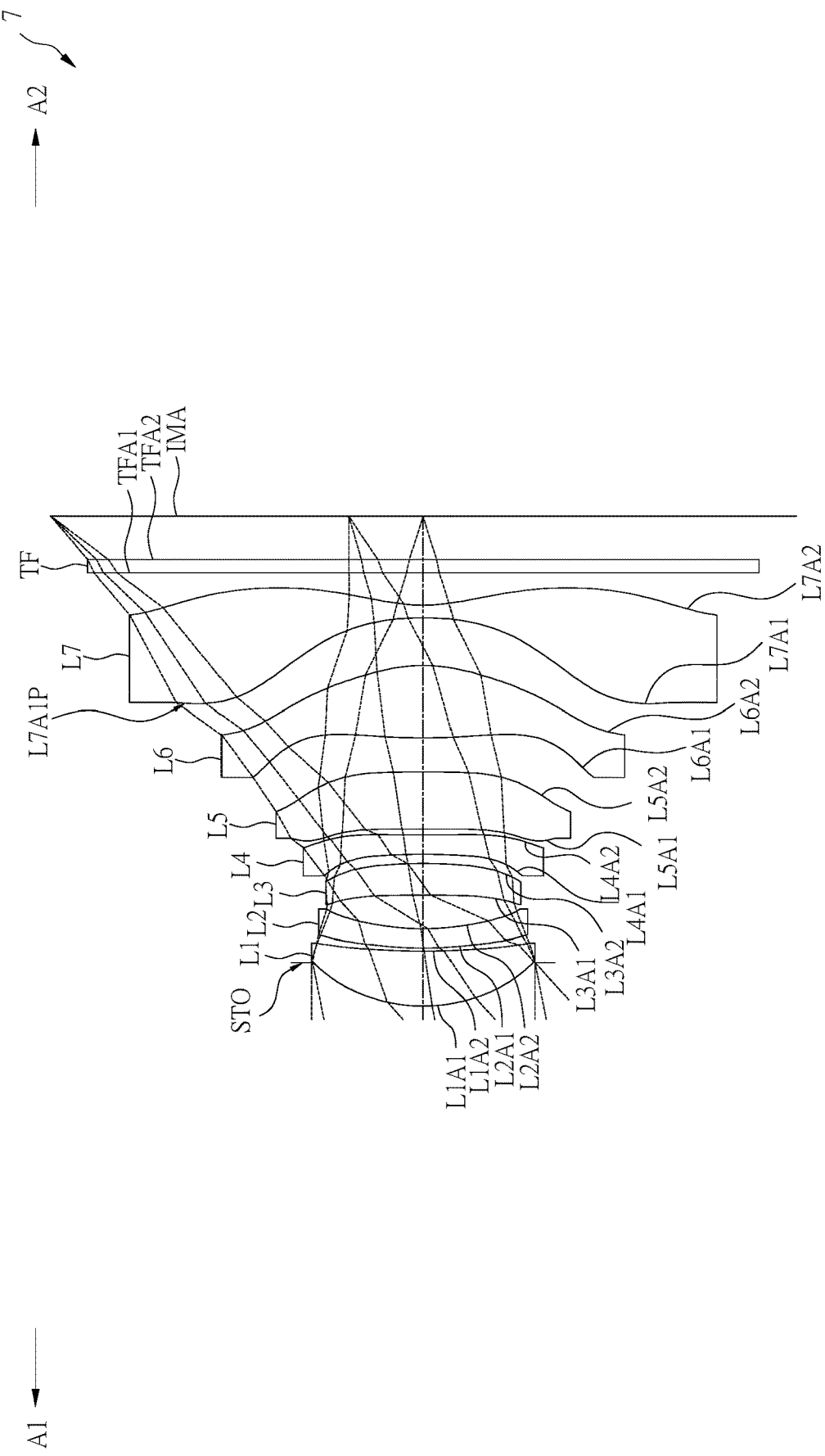
FIG. 18 depicts a cross-sectional view of a seventh embodiment of an optical imaging lens having seven lens elements according to the present disclosure.

Reference is now made to FIGS. 18, 19A-19D and Tables 13, 14. FIG. 18 illustrates an example cross-sectional view of an optical imaging lens 7 having seven lens elements of the optical imaging lens according to a seventh example embodiment. FIGS. 19A-19D show example charts of a longitudinal spherical aberration and other kinds of optical aberrations of the optical imaging lens 7 according to the seventh embodiment. Table 13 shows an example table of optical data of each lens element of the optical imaging lens 7 according to the seventh example embodiment. Table 14 shows an example table of aspherical data of the optical imaging lens 7 according to the seventh example embodiment.

As shown in FIG. 18, the optical imaging lens 7 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6 and a seventh lens element L7.

The differences between the seventh embodiment and the first embodiment may include the radius of curvature and thickness of each lens element, the value of each air gap, aspherical data, related optical parameters, such as back focal length, and the configuration of the object-side surface L7A1; but the configuration of the concave/convex shape of surfaces, comprising the object-side surfaces L1A1, L2A1, L3A1, L4A1, L5A1 and L6A1 facing to the object side A1 and the image-side surfaces L1A2, L2A2, L3A2, L4A2, L5A2, L6A2 and L7A2 facing to the image side A2, and positive or negative configuration of the refracting power of each lens element may be similar to those in the first embodiment. Specifically, a periphery region L7A1P of the object-side surface L7A1 of the seventh lens element L7 may be convex. Please refer to Table 13 for the optical characteristics of each lens elements in the optical imaging lens 7 of the present embodiment, please refer to Table 24 for the values of V5, TL/Fno, (T1+G12+T2)/T5, TTL/T1, (T6+G67)/T7, EFL/BFL, (T2+G23+T3)/T4, (G23+G45)/G34, (EFL+BFL)/T5, ALT/(G56+T6+G67), EFL/AAG, HFOV/ImgH, (T1+T4+T5)/T3, (T3+T6)/T2, G56/G45, AAG/BFL, G67/(G23+G34), ALT/BFL and TTL/(G12+T7) of the present embodiment.

TABLE 13

Embodiment 7
EFL = 5.742 mm; HFOV = 42.261 degrees; TTL = 7.631 mm
Fno = 1.650; Image Height = 5.800 mm

| Surface # | | Radius of curvature (mm) | Thickness/ air gap (mm) | Refractive index | Abbe number | Focal length (mm) | Material |
|---|---|---|---|---|---|---|---|
| OBJ | Object | INFINITY | INFINITY | | | | |
| STO | Aperture stop | INFINITY | −0.676 | | | | |
| L1A1 | 1st lens element | 2.629 | 0.854 | 1.545 | 55.987 | 6.321 | Plastic |

TABLE 13-continued

Embodiment 7
EFL = 5.742 mm; HFOV = 42.261 degrees; TTL = 7.631 mm
Fno = 1.650; Image Height = 5.800 mm

| Surface # | | Radius of curvature (mm) | Thickness/ air gap (mm) | Refractive index | Abbe number | Focal length (mm) | Material |
|---|---|---|---|---|---|---|---|
| L1A2 | | 9.751 | 0.050 | | | | |
| L2A1 | 2nd lens element | 5.601 | 0.294 | 1.661 | 20.373 | −22.463 | Plastic |
| L2A2 | | 3.991 | 0.527 | | | | |
| L3A1 | 3rd lens element | −28.459 | 0.493 | 1.545 | 55.987 | 19.263 | Plastic |
| L3A2 | | −7.729 | 0.141 | | | | |
| L4A1 | 4th lens element | −8.667 | 0.303 | 1.661 | 20.373 | −13.014 | Plastic |
| L4A2 | | −5156.834 | 0.090 | | | | |
| L5A1 | 5th lens element | 41.769 | 0.895 | 1.567 | 37.533 | 73.282 | Plastic |
| L5A2 | | −131277.566 | 0.528 | | | | |
| L6A1 | 6th lens element | 7.835 | 1.123 | 1.545 | 55.987 | 3.592 | Plastic |
| L6A2 | | −2.485 | 0.746 | | | | |
| L7A1 | 7th lens element | −4.512 | 0.200 | 1.545 | 55.987 | −3.036 | Plastic |
| L7A2 | | 2.663 | 0.500 | | | | |
| TFA1 | Filtering unit | INFINITY | 0.210 | 1.517 | 64.167 | | |
| TFA2 | | INFINITY | 0.677 | | | | |
| IMA | Image plane | INFINITY | | | | | |

The values of each aspherical parameter are shown in Table 14.

TABLE 14

Embodiment 7
Aspherical Parameters

| Surface # | K | a2 | a4 | a6 |
|---|---|---|---|---|
| L1A1 | 0.000000E+00 | 0.000000E+00 | 1.303350E−03 | 3.900681E−03 |
| L1A2 | 0.000000E+00 | 0.000000E+00 | −2.291506E−02 | 2.360594E−02 |
| L2A1 | 0.000000E+00 | 0.000000E+00 | −3.389040E−02 | 2.664140E−02 |
| L2A2 | −1.701070E+00 | 0.000000E+00 | −8.580854E−03 | 4.266862E−03 |
| L3A1 | 0.000000E+00 | 0.000000E+00 | −1.633743E−02 | −4.289068E−03 |
| L3A2 | 0.000000E+00 | 0.000000E+00 | 2.343227E−02 | −7.984970E−02 |
| L4A1 | 0.000000E+00 | 0.000000E+00 | 6.138400E−02 | −1.259859E−01 |
| L4A2 | 0.000000E+00 | 0.000000E+00 | 3.472506E−02 | −6.983954E−02 |
| L5A1 | 0.000000E+00 | 0.000000E+00 | −3.574369E−02 | 1.701364E−02 |
| L5A2 | 0.000000E+00 | 0.000000E+00 | −5.205810E−02 | 1.737077E−02 |
| L6A1 | 0.000000E+00 | 0.000000E+00 | −2.652408E−02 | 1.047898E−02 |
| L6A2 | −2.932277E+00 | 0.000000E+00 | 1.710314E−02 | −8.568169E−03 |
| L7A1 | 0.000000E+00 | 0.000000E+00 | −2.847442E−02 | 7.924144E−03 |
| L7A2 | −1.015732E+01 | 0.000000E+00 | −1.946484E−02 | 3.500079E−03 |

| Surface # | a8 | a10 | a12 | a14 |
|---|---|---|---|---|
| L1A1 | −4.800375E−03 | 3.976458E−03 | −1.785155E−03 | 4.247037E−04 |
| L1A2 | −1.323994E−02 | 4.592051E−03 | −9.069884E−04 | 8.800832E−05 |
| L2A1 | −1.348471E−02 | 4.548453E−03 | −8.176427E−04 | 7.101624E−05 |
| L2A2 | 4.950120E−03 | −7.165006E−03 | 4.724325E−03 | −1.522356E−03 |
| L3A1 | 1.636925E−03 | −1.604011E−03 | 6.612024E−04 | −4.648697E−05 |
| L3A2 | 7.148904E−02 | −4.334917E−02 | 1.636997E−02 | −3.357199E−03 |
| L4A1 | 9.255524E−02 | −4.511299E−02 | 1.401823E−02 | −3.784766E−03 |
| L4A2 | 4.619830E−02 | −1.977266E−02 | 5.939908E−03 | −1.394642E−03 |
| L5A1 | −2.261400E−02 | 2.030862E−02 | −1.058334E−02 | 3.432807E−03 |
| L5A2 | −9.335685E−03 | 3.395261E−03 | −7.489970E−04 | 1.062570E−04 |
| L6A1 | −6.665552E−03 | 2.823052E−03 | −9.647541E−04 | 2.346968E−04 |
| L6A2 | 4.044052E−03 | −1.599079E−03 | 3.686560E−04 | −4.743623E−05 |
| L7A1 | −2.211978E−03 | 5.091932E−04 | −6.880261E−05 | 5.446642E−06 |
| L7A2 | −4.508948E−04 | 4.060371E−05 | −2.480742E−06 | 9.486381E−08 |

| Surface # | a16 | a18 | a20 |
|---|---|---|---|
| L1A1 | −4.167587E−05 | | |
| L1A2 | −3.879130E−06 | | |
| L2A1 | −1.371824E−06 | | |
| L2A2 | 2.166498E−04 | | |
| L3A1 | −4.762890E−06 | | |
| L3A2 | 2.777272E−04 | | |
| L4A1 | 1.438561E−03 | −4.516084E−04 | 5.870966E−05 |
| L4A2 | 2.825222E−04 | −4.219212E−05 | 3.035776E−06 |

TABLE 14-continued

Embodiment 7
Aspherical Parameters

| L5A1 | −6.801200E−04 | 7.498699E−05 | −3.521980E−06 |
| L5A2 | −1.162231E−05 | 1.345396E−06 | −9.518241E−08 |
| L6A1 | −3.576898E−05 | 3.010693E−06 | −1.057679E−07 |
| L6A2 | 3.395750E−06 | −1.257941E−07 | 1.849629E−09 |
| L7A1 | −2.527216E−07 | 6.406507E−09 | −6.874500E−11 |
| L7A2 | −1.907074E−09 | 1.060700E−11 | 1.340000E−13 |

Figure 19A:
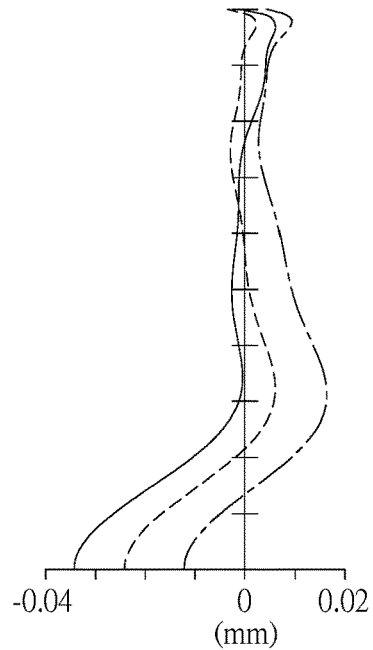
FIGS. 19A-19D depict charts of a longitudinal spherical aberration and other kinds of optical aberrations of a seventh embodiment of the optical imaging lens according to the present disclosure.
Figure 19B:
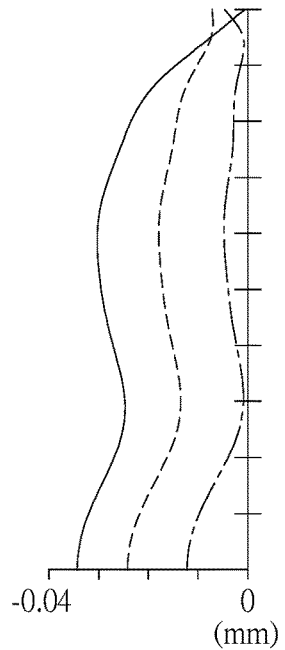
Figure 19C:
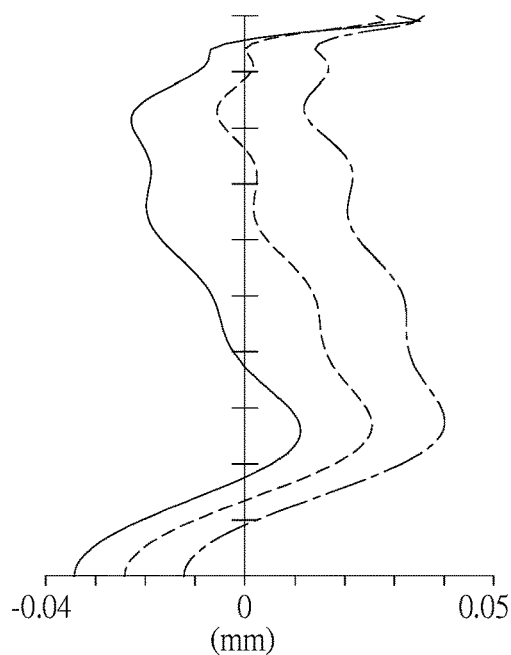
Figure 19D:
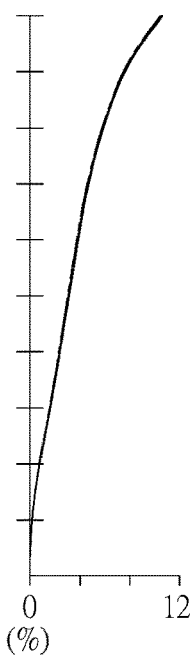

As the longitudinal spherical aberration shown in FIG. 19A, the offset of the off-axis light relative to the image point may be within −0.035~0.02 mm. As the field curvature aberration in the sagittal direction shown in FIG. 19B, the focus variation with regard to the three wavelengths in the whole field may fall within −0.035~0 mm. As the field curvature aberration in the tangential direction shown in FIG. 19C, the focus variation with regard to the three wavelengths in the whole field may fall within −0.035~0.04 mm. As shown in FIG. 19D, the variation of the distortion aberration may be within 0~12%. Compared with the first embodiment, the distortion aberration may be smaller in the present embodiment.

According to the values of the aberrations, it is shown that the optical imaging lens 7 of the present embodiment, with system length as short as 7.631 mm, HFOV as great as 42.261 degrees, Fno as small as 1.650 and image height as great as 5.800 mm, may be capable of providing good imaging quality.

Figure 20:
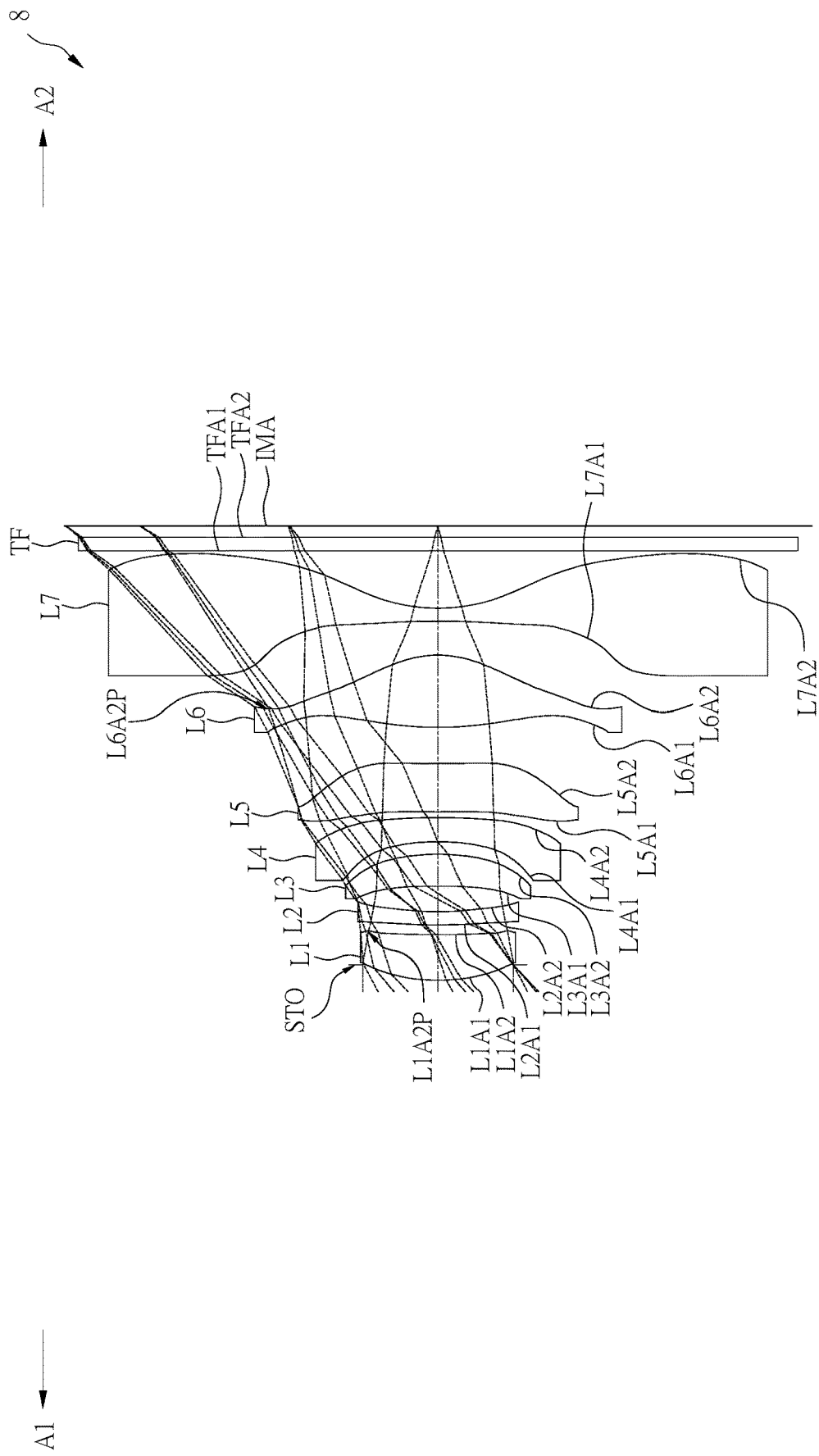
FIG. 20 depicts a cross-sectional view of an eighth embodiment of an optical imaging lens having seven lens elements according to the present disclosure.

Reference is now made to FIGS. 20, 21A-21D and Tables 15, 16. FIG. 20 illustrates an example cross-sectional view of an optical imaging lens 8 having seven lens elements of the optical imaging lens according to an eighth example embodiment.

FIGS. 21A-21D show example charts of a longitudinal spherical aberration and other kinds of optical aberrations of the optical imaging lens 8 according to the eighth embodiment. Table 15 shows an example table of optical data of each lens element of the optical imaging lens 8 according to the eighth example embodiment. Table 16 shows an example table of aspherical data of the optical imaging lens 8 according to the eighth example embodiment.

As shown in FIG. 20, the optical imaging lens 8 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6 and a seventh lens element L7.

The differences between the eighth embodiment and the first embodiment may include the radius of curvature and thickness of each lens element, the value of each air gap, aspherical data, related optical parameters, such as back focal length, and the configuration of the concave/convex shape of the image-side surfaces L1A2, L6A2; but the configuration of the concave/convex shape of surfaces comprising the object-side surfaces L1A1, L2A1, L3A1, L4A1, L5A1, L6A1 and L7A1 facing to the object side A1 and the image-side surfaces L2A2, L3A2, L4A2, L5A2 and L7A2 facing to the image side A2, and positive or negative configuration of the refracting power of each lens element may be similar to those in the first embodiment. Specifically, a periphery region L1A2P of the image-side surface L1A2 of the first lens element L1 may be convex, and a periphery region L6A2P of the image-side surface L6A2 of the sixth lens element L6 may be concave. Please refer to Table 15 for the optical characteristics of each lens elements in the optical imaging lens 8 of the present embodiment, and please refer to Table 24 for the values of V5, TL/Fno, (T1+G12+T2)/T5, TTL/T1, (T6+G67)/T7, EFL/BFL, (T2+G23+T3)/T4, (G23+G45)/G34, (EFL+BFL)/T5, ALT/(G56+T6+G67), EFL/AAG, HFOV/ImgH, (T1+T4+T5)/T3, (T3+T6)/T2, G56/G45, AAG/BFL, G67/(G23+G34), ALT/BFL and TTL/(G12+T7) of the present embodiment.

TABLE 15

Embodiment 8
EFL = 3.861 mm; HFOV = 43.216 degrees; TTL = 7.084 mm
Fno = 1.650; Image Height = 5.800 mm

| Surface # | | Radius of curvature (mm) | Thickness/ air gap (mm) | Refractive index | Abbe number | Focal length (mm) | Material |
|---|---|---|---|---|---|---|---|
| OBJ | Object | INFINITY | INFINITY | | | | |
| STO | Aperture stop | INFINITY | −0.244 | | | | |
| L1A1 | 1st lens element | 2.843 | 0.708 | 1.545 | 55.987 | 5.791 | Plastic |
| L1A2 | | 25.543 | 0.152 | | | | |
| L2A1 | 2nd lens element | 8.636 | 0.203 | 1.661 | 20.373 | −14.621 | Plastic |
| L2A2 | | 4.537 | 0.399 | | | | |
| L3A1 | 3rd lens element | −9.366 | 0.503 | 1.545 | 55.987 | 8.556 | Plastic |
| L3A2 | | −3.177 | 0.192 | | | | |
| L4A1 | 4th lens element | −3.283 | 0.375 | 1.661 | 20.373 | −7.276 | Plastic |
| L4A2 | | −10.607 | 0.095 | | | | |
| L5A1 | 5th lens element | 70.402 | 0.755 | 1.567 | 37.533 | 121.085 | Plastic |
| L5A2 | | −3434.195 | 0.563 | | | | |
| L6A1 | 6th lens element | 7.118 | 1.119 | 1.545 | 55.987 | 2.480 | Plastic |
| L6A2 | | −1.580 | 0.532 | | | | |
| L7A1 | 7th lens element | −15.621 | 0.200 | 1.545 | 55.987 | −4.368 | Plastic |
| L7A2 | | 2.829 | 0.900 | | | | |

TABLE 15-continued

Embodiment 8
EFL = 3.861 mm; HFOV = 43.216 degrees; TTL = 7.084 mm
Fno = 1.650; Image Height = 5.800 mm

| Surface # | | Radius of curvature (mm) | Thickness/ air gap (mm) | Refractive index | Abbe number | Focal length (mm) | Material |
|---|---|---|---|---|---|---|---|
| TFA1 | Filtering unit | INFINITY | 0.210 | 1.517 | 64.167 | | |
| TFA2 | | INFINITY | 0.178 | | | | |
| IMA | Image plane | INFINITY | | | | | |

The values of each aspherical parameter are shown in Table 16.

TABLE 16

Embodiment 8
Aspherical Parameters

| Surface # | K | a2 | a4 | a6 |
|---|---|---|---|---|
| L1A1 | 0.000000E+00 | 0.000000E+00 | 6.843643E−03 | 1.238613E−02 |
| L1A2 | 0.000000E+00 | 0.000000E+00 | 1.655762E−02 | −2.311543E−02 |
| L2A1 | 0.000000E+00 | 0.000000E+00 | −6.878264E−03 | −5.763258E−02 |
| L2A2 | −6.024537E+00 | 0.000000E+00 | −9.551815E−03 | −3.270764E−02 |
| L3A1 | 0.000000E+00 | 0.000000E+00 | −2.657870E−02 | 1.956345E−02 |
| L3A2 | 0.000000E+00 | 0.000000E+00 | −8.861145E−03 | 1.081667E−01 |
| L4A1 | 0.000000E+00 | 0.000000E+00 | −7.186394E−02 | 5.091703E−01 |
| L4A2 | 0.000000E+00 | 0.000000E+00 | −2.842357E−02 | 1.383330E−01 |
| L5A1 | 0.000000E+00 | 0.000000E+00 | 4.163025E−02 | −2.361978E−01 |
| L5A2 | 0.000000E+00 | 0.000000E+00 | 1.087612E−01 | −2.646663E−01 |
| L6A1 | 0.000000E+00 | 0.000000E+00 | 5.019724E−02 | −5.847364E−02 |
| L6A2 | −3.181789E+00 | 0.000000E+00 | −1.816103E−02 | 6.234540E−03 |
| L7A1 | 0.000000E+00 | 0.000000E+00 | −3.336278E−02 | 4.646543E−02 |
| L7A2 | −9.425512E−01 | 0.000000E+00 | 2.517884E−02 | −1.646840E−02 |

| Surface # | a8 | a10 | a12 | a14 |
|---|---|---|---|---|
| L1A1 | −2.959801E−02 | 4.252172E−02 | −3.321692E−02 | 1.328467E−02 |
| L1A2 | 5.505829E−02 | −1.118334E−01 | 1.207535E−01 | −6.319851E−02 |
| L2A1 | 1.334357E−01 | −2.028751E−01 | 1.775836E−01 | −7.425899E−02 |
| L2A2 | 6.339535E−02 | −7.235181E−02 | 4.709934E−02 | −1.027502E−02 |
| L3A1 | −8.197307E−02 | 1.115568E−01 | −7.666787E−02 | 2.176021E−02 |
| L3A2 | −3.178090E−01 | 3.281009E−01 | −1.614230E−01 | 3.651702E−02 |
| L4A1 | −1.249316E+00 | 1.604846E+00 | −1.374930E+00 | 8.134927E−01 |
| L4A2 | −2.489792E−01 | 2.265308E−01 | −1.260863E−01 | 4.455969E−02 |
| L5A1 | 2.839568E−01 | −1.788712E−01 | 6.823422E−02 | −1.631335E−02 |
| L5A2 | 2.361336E−01 | −1.392340E−01 | 5.605111E−02 | −1.486952E−02 |
| L6A1 | 3.246585E−02 | −1.175024E−02 | 2.820789E−03 | −4.589991E−04 |
| L6A2 | 8.647996E−03 | −4.877847E−03 | 9.810088E−04 | −7.825810E−05 |
| L7A1 | −2.278970E−02 | 5.636687E−03 | −8.089752E−04 | 7.038221E−05 |
| L7A2 | 3.127306E−03 | −3.236439E−04 | 2.042247E−05 | −8.060559E−07 |

| Surface # | a16 | a18 | a20 |
|---|---|---|---|
| L1A1 | −2.150287E−03 | | |
| L1A2 | 1.245671E−02 | | |
| L2A1 | 1.104403E−02 | | |
| L2A2 | −2.806870E−04 | | |
| L3A1 | −9.205732E−04 | | |
| L3A2 | −2.841455E−03 | | |
| L4A1 | −3.134805E−01 | 6.939244E−02 | −6.604868E−03 |
| L4A2 | −9.721140E−03 | 1.191771E−03 | −6.287147E−05 |
| L5A1 | 2.398465E−03 | −1.988902E−04 | 7.141117E−06 |
| L5A2 | 2.453565E−03 | −2.264147E−04 | 8.897381E−06 |
| L6A1 | 4.944489E−05 | −3.155990E−06 | 8.854539E−08 |
| L6A2 | −3.075027E−07 | 3.845882E−07 | −1.547064E−08 |
| L7A1 | −3.663291E−06 | 1.050423E−07 | −1.277525E−09 |
| L7A2 | 1.940168E−08 | −2.596670E−10 | 1.473000E−12 |

Figure 21A:
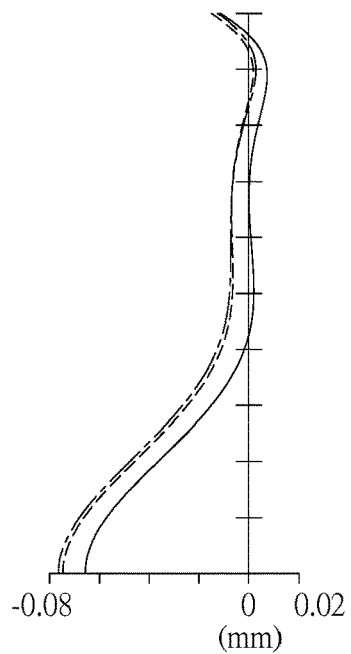
FIGS. 21A-21D depict charts of a longitudinal spherical aberration and other kinds of optical aberrations of an eighth embodiment of the optical imaging lens according to the present disclosure.
Figure 21B:
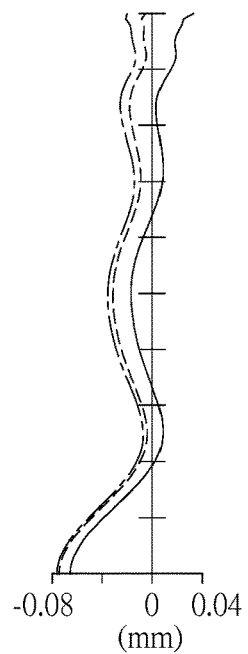
Figure 21C:
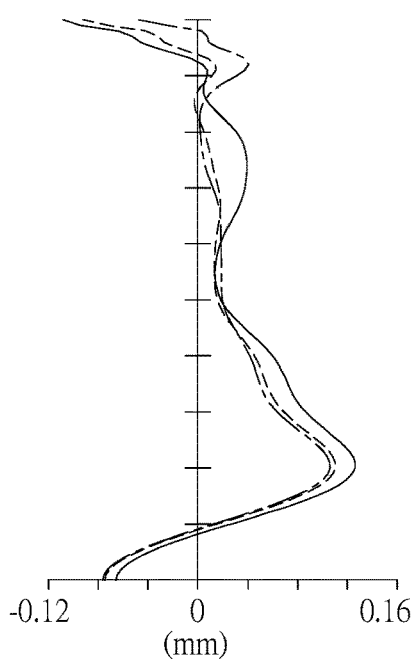
Figure 21D:
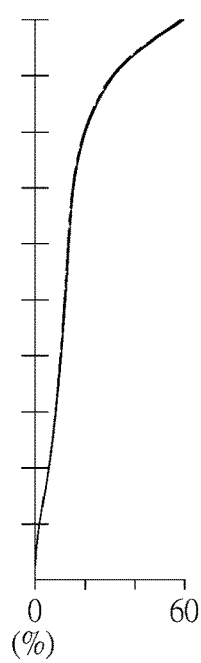

As the longitudinal spherical aberration shown in FIG. 21A, the offset of the off-axis light relative to the image point may be within −0.08~0.01 mm. As the field curvature aberration in the sagittal direction shown in FIG. 21B, the focus variation with regard to the three wavelengths in the whole field may fall within −0.08~0.04 mm. As the field curvature aberration in the tangential direction shown in FIG. 21C, the focus variation with regard to the three wavelengths in the whole field may fall within −0.12~0.14 mm. As shown in FIG. 21D, the variation of the distortion aberration may be within 0~60%.

According to the values of the aberrations, it is shown that the optical imaging lens 8 of the present embodiment, with system length as short as 7.084 mm, HFOV as great as 43.216 degrees, Fno as small as 1.650 and image height as great as 5.800 mm, may be capable of providing good imaging quality.

Figure 22:
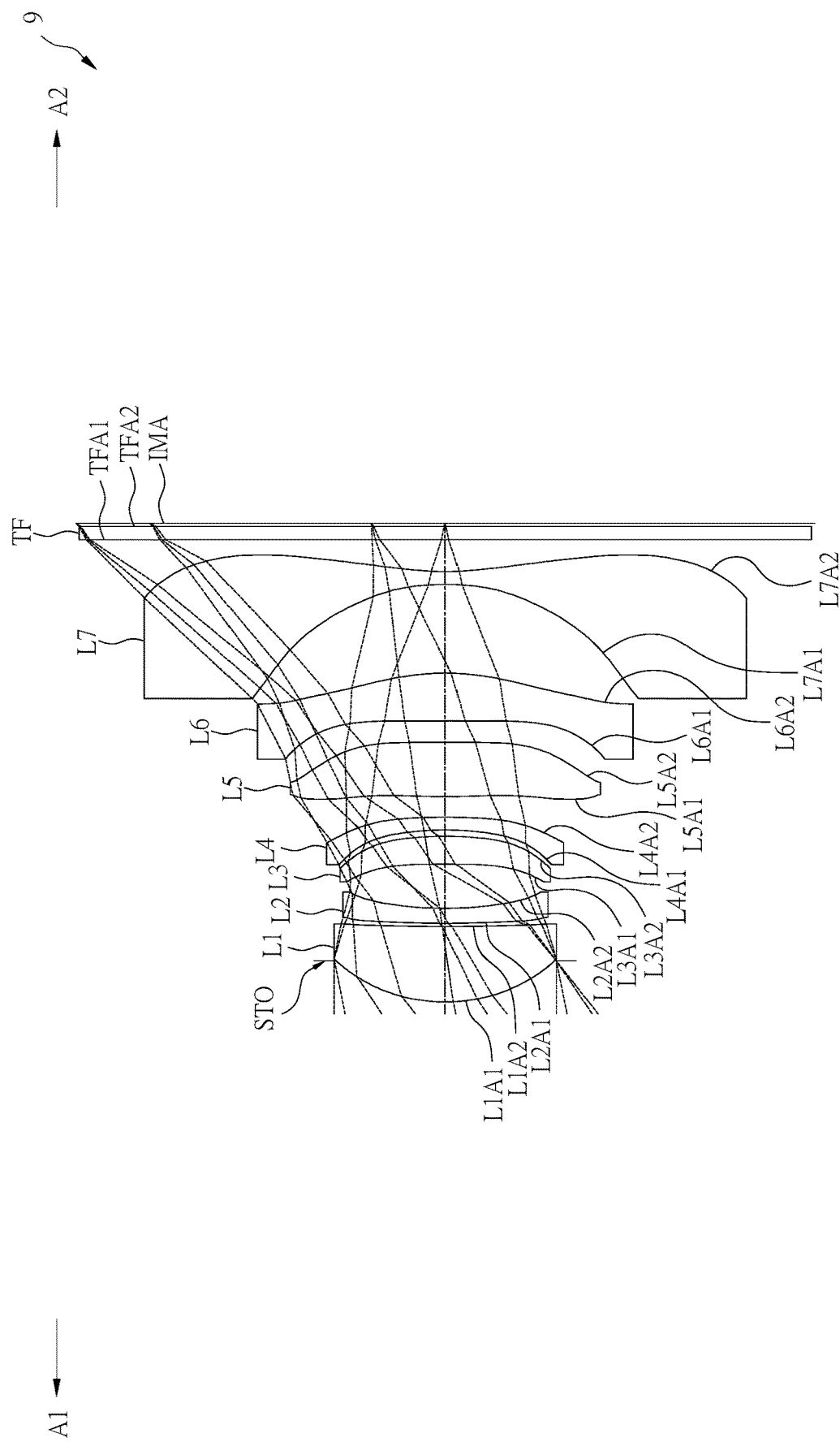
FIG. 22 depicts a cross-sectional view of a ninth embodiment of an optical imaging lens having seven lens elements according to the present disclosure.

Reference is now made to FIGS. 22, 23A-23D and Tables 17, 18. FIG. 22 illustrates an example cross-sectional view of an optical imaging lens 9 having seven lens elements of the optical imaging lens according to a ninth example embodiment. FIGS. 23A-23D show example charts of a longitudinal spherical aberration and other kinds of optical aberrations of the optical imaging lens 9 according to the ninth embodiment. Table 17 shows an example table of optical data of each lens element of the optical imaging lens 9 according to the ninth example embodiment. Table 18 shows an example table of aspherical data of the optical imaging lens 9 according to the ninth example embodiment.

As shown in FIG. 22, the optical imaging lens 9 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6 and a seventh lens element L7.

The differences between the ninth embodiment and the first embodiment may include the radius of curvature and thickness of each lens element, the value of each air gap, aspherical data and related optical parameters, such as back focal length; but the configuration of the concave/convex shape of surfaces comprising the object-side surfaces L1A1, L2A1, L3A1, L4A1, L5A1, L6A1 and L7A1 facing to the object side A1 and the image-side surfaces L1A2, L2A2, L3A2, L4A2, L5A2, L6A2 and L7A2 facing to the image side A2, and positive or negative configuration of the refracting power of each lens element may be similar to those in the first embodiment. Please refer to Table 17 for the optical characteristics of each lens elements in the optical imaging lens 9 of the present embodiment, and please refer to Table 24 for the values of V5, TL/Fno, (T1+G12+T2)/T5, TTL/T1, (T6+G67)/T7, EFL/BFL, (T2+G23+T3)/T4, (G23+G45)/G34, (EFL+BFL)/T5, ALT/(G56+T6+G67), EFL/AAG, HFOV/ImgH, (T1+T4+T5)/T3, (T3+T6)/T2, G56/G45, AAG/BFL, G67/(G23+G34), ALT/BFL and TTL/(G12+T7) of the present embodiment.

TABLE 17

Embodiment 9
EFL = 5.765 mm; HFOV = 38.240 degrees; TTL = 7.521 mm
Fno = 1.650; Image Height = 5.800 mm

| Surface # | | Radius of curvature (mm) | Thickness/ air gap (mm) | Refractive index | Abbe number | Focal length (mm) | Material |
|---|---|---|---|---|---|---|---|
| OBJ | Object | INFINITY | INFINITY | | | | |
| STO | Aperture stop | INFINITY | −0.643 | | | | |
| L1A1 | 1st lens element | 2.692 | 1.181 | 1.545 | 55.987 | 5.436 | Plastic |
| L1A2 | | 24.316 | 0.050 | | | | |
| L2A1 | 2nd lens element | 12.418 | 0.234 | 1.661 | 20.373 | −13.474 | Plastic |
| L2A2 | | 5.175 | 0.697 | | | | |
| L3A1 | 3rd lens element | −16.719 | 0.440 | 1.545 | 55.987 | 13.837 | Plastic |
| L3A2 | | −5.254 | 0.097 | | | | |
| L4A1 | 4th lens element | −4.387 | 0.200 | 1.661 | 20.373 | −11.093 | Plastic |
| L4A2 | | −10.969 | 0.326 | | | | |
| L5A1 | 5th lens element | 12.207 | 0.858 | 1.567 | 37.533 | 21.186 | Plastic |
| L5A2 | | −1057.944 | 0.335 | | | | |
| L6A1 | 6th lens element | 101.125 | 0.745 | 1.545 | 55.987 | 6.610 | Plastic |
| L6A2 | | −3.735 | 1.398 | | | | |
| L7A1 | 7th lens element | −4.044 | 0.200 | 1.545 | 55.987 | −3.884 | Plastic |
| L7A2 | | 4.541 | 0.500 | | | | |
| TFA1 | Filtering unit | INFINITY | 0.210 | 1.517 | 64.167 | | |
| TFA2 | | INFINITY | 0.050 | | | | |
| IMA | Image plane | INFINITY | | | | | |

The values of each aspherical parameter are shown in Table 18.

TABLE 18

Embodiment 9
Aspherical Parameters

| Surface # | K | a2 | a4 | a6 |
|---|---|---|---|---|
| L1A1 | 0.000000E+00 | 0.000000E+00 | 1.628515E−03 | 1.270377E−03 |
| L1A2 | 0.000000E+00 | 0.000000E+00 | −2.499333E−02 | 3.479503E−02 |
| L2A1 | 0.000000E+00 | 0.000000E+00 | −4.375617E−02 | 5.060586E−02 |
| L2A2 | −1.690175E+00 | 0.000000E+00 | −1.981576E−02 | 2.383974E−02 |
| L3A1 | 0.000000E+00 | 0.000000E+00 | −2.887877E−02 | −1.648531E−02 |
| L3A2 | 0.000000E+00 | 0.000000E+00 | 3.948180E−02 | −1.192479E−01 |
| L4A1 | 0.000000E+00 | 0.000000E+00 | 7.906003E−02 | −1.786945E−01 |
| L4A2 | 0.000000E+00 | 0.000000E+00 | 1.375959E−02 | −8.566138E−02 |
| L5A1 | 0.000000E+00 | 0.000000E+00 | −2.522227E−02 | −2.222730E−03 |

TABLE 18-continued

Embodiment 9
Aspherical Parameters

| | | | | |
|---|---|---|---|---|
| L5A2 | 0.000000E+00 | 0.000000E+00 | −1.850851E−02 | −1.071651E−03 |
| L6A1 | 0.000000E+00 | 0.000000E+00 | −1.099885E−02 | 2.690929E−03 |
| L6A2 | −8.850970E+00 | 0.000000E+00 | −1.071186E−02 | 6.513259E−03 |
| L7A1 | 0.000000E+00 | 0.000000E+00 | −4.071882E−02 | 2.651464E−02 |
| L7A2 | −2.457022E+01 | 0.000000E+00 | −9.051736E−03 | 2.849483E−03 |

| Surface # | a8 | a10 | a12 | a14 |
|---|---|---|---|---|
| L1A1 | −1.233188E−03 | 1.053008E−03 | −4.781083E−04 | 1.145089E−04 |
| L1A2 | −2.604715E−02 | 1.230810E−02 | −3.641251E−03 | 6.220245E−04 |
| L2A1 | −3.537191E−02 | 1.720683E−02 | −5.387817E−03 | 1.025880E−03 |
| L2A2 | −1.426146E−02 | 7.198161E−03 | −2.189143E−03 | 3.891058E−04 |
| L3A1 | 2.141301E−02 | −2.034314E−02 | 1.141233E−02 | −3.277108E−03 |
| L3A2 | 1.110419E−01 | −6.964345E−02 | 2.799367E−02 | −6.403942E−03 |
| L4A1 | 1.746780E−01 | −1.117325E−01 | 4.470584E−02 | −9.574774E−03 |
| L4A2 | 9.244537E−02 | −6.303137E−02 | 2.963213E−02 | −9.503127E−03 |
| L5A1 | 2.035252E−05 | 2.401079E−03 | −1.217504E−03 | 2.861737E−04 |
| L5A2 | −3.502237E−03 | 1.855889E−03 | −2.761003E−04 | −2.662500E−05 |
| L6A1 | −1.181903E−03 | −8.009341E−04 | 7.266543E−04 | −2.470045E−04 |
| L6A2 | −7.978061E−04 | 8.278124E−05 | −9.408415E−05 | 3.040121E−05 |
| L7A1 | −1.150875E−02 | 3.701663E−03 | −8.560230E−04 | 1.332097E−04 |
| L7A2 | −5.802274E−04 | 7.334625E−05 | −6.100077E−06 | 3.345088E−07 |

| Surface # | a16 | a18 | a20 |
|---|---|---|---|
| L1A1 | −1.169842E−05 | | |
| L1A2 | −4.870011E−05 | | |
| L2A1 | −9.044928E−05 | | |
| L2A2 | −1.346362E−05 | | |
| L3A1 | 3.823948E−04 | | |
| L3A2 | 6.257830E−04 | | |
| L4A1 | 3.147390E−04 | 2.630310E−04 | −3.435971E−05 |
| L4A2 | 1.951368E−03 | −2.262454E−04 | 1.106072E−05 |
| L5A1 | −3.693830E−05 | 2.537769E−06 | −7.187266E−08 |
| L5A2 | 1.470627E−05 | −1.964413E−06 | 9.595711E−08 |
| L6A1 | 4.399221E−05 | −4.041949E−06 | 1.505305E−07 |
| L6A2 | −4.115142E−06 | 2.589896E−07 | −6.289899E−09 |
| L7A1 | −1.314352E−05 | 7.410646E−07 | −1.808302E−08 |
| L7A2 | −1.165425E−08 | 2.336480E−10 | −2.052000E−12 |

As the longitudinal spherical aberration shown in FIG. 23A, the offset of the off-axis light relative to the image point may be within −0.006~0.014 mm. As the field curvature aberration in the sagittal direction shown in FIG. 23B, the focus variation with regard to the three wavelengths in the whole field may fall within −0.012~0.01 mm. As the field curvature aberration in the tangential direction shown in FIG. 23C, the focus variation with regard to the three wavelengths in the whole field may fall within −0.02~0.025 mm. As shown in FIG. 23D, the variation of the distortion aberration may be within 0~30%. Compared with the first embodiment, the field curvature aberration in the sagittal direction may be smaller in the present embodiment.

According to the values of the aberrations, it is shown that the optical imaging lens 9 of the present embodiment, with system length as short as 7.521 mm, HFOV as great as 38.240 degrees, Fno as small as 1.650 and image height as great as 5.800 mm, may be capable of providing good imaging quality.

Figure 24:
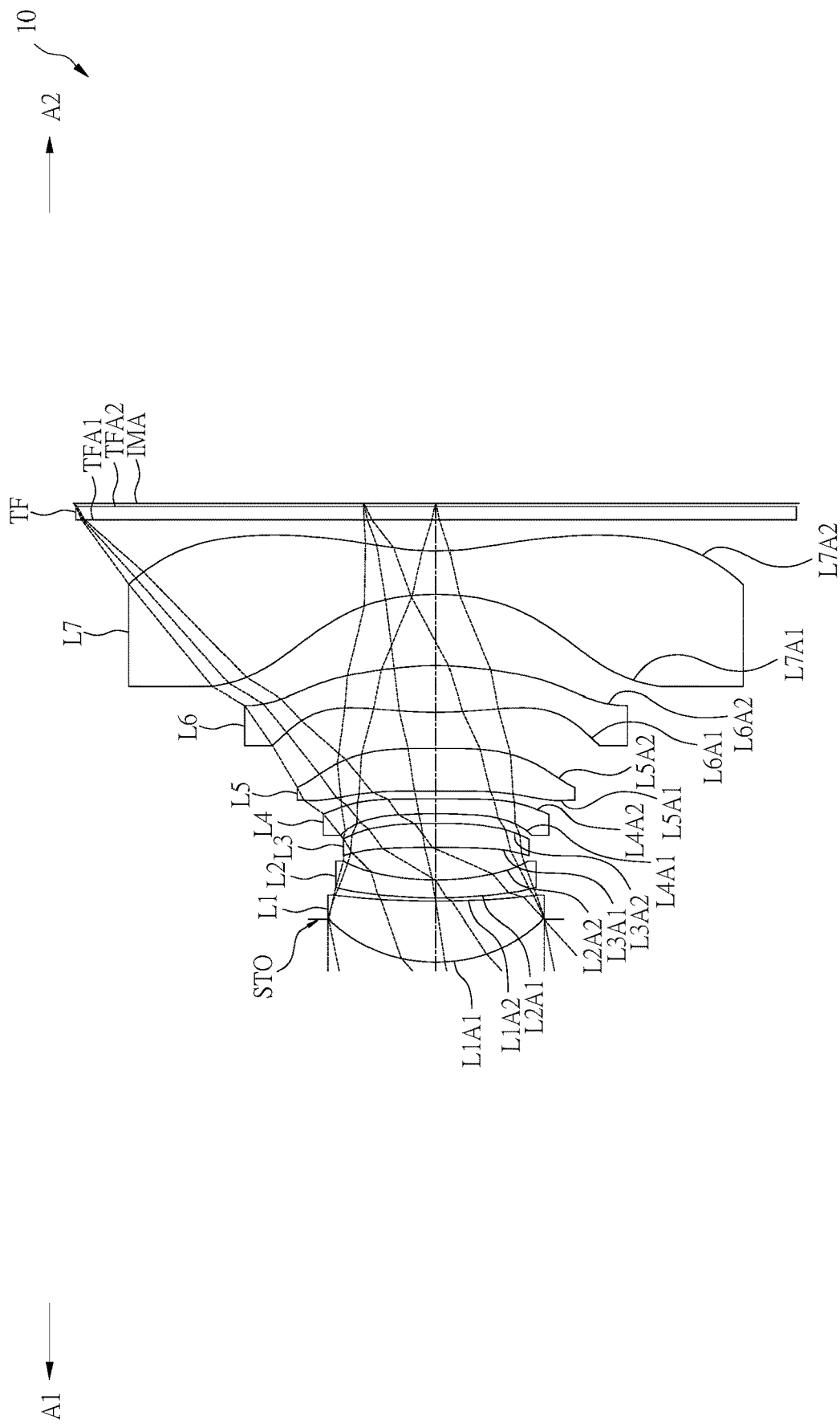
FIG. 24 depicts a cross-sectional view of a tenth embodiment of an optical imaging lens having seven lens elements according to the present disclosure.

Reference is now made to FIGS. 24, 25A-25D and Tables 19, 20. FIG. 24 illustrates an example cross-sectional view of an optical imaging lens 10 having seven lens elements of the optical imaging lens according to a tenth example embodiment. FIGS. 25A-25D show example charts of a longitudinal spherical aberration and other kinds of optical aberrations of the optical imaging lens 10 according to the tenth embodiment. Table 19 shows an example table of optical data of each lens element of the optical imaging lens 10 according to the tenth example embodiment. Table 20 shows an example table of aspherical data of the optical imaging lens 10 according to the tenth example embodiment.

As shown in FIG. 24, the optical imaging lens 10 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6 and a seventh lens element L7.

The differences between the tenth embodiment and the first embodiment may include the radius of curvature and thickness of each lens element, the value of each air gap, aspherical data and related optical parameters, such as back focal length; but the configuration of the concave/convex shape of surfaces comprising the object-side surfaces L1A1, L2A1, L3A1, L4A1, L5A1, L6A1 and L7A1 facing to the object side A1 and the image-side surfaces L1A2, L2A2, L3A2, L4A2, L5A2, L6A2 and L7A2 facing to the image side A2, and positive or negative configuration of the refracting power of each lens element may be similar to those in the first embodiment. Please refer to Table 19 for the optical characteristics of each lens elements in the optical imaging lens 10 of the present embodiment, and please refer to Table 24 for the values of V5, TL/Fno, (T1+G12+T2)/T5, TTL/T1, (T6+G67)/T7, EFL/BFL, (T2+G23+T3)/T4, (G23+G45)/G34, (EFL+BFL)/T5, ALT/(G56+T6+G67), EFL/AAG, HFOV/ImgH, (T1+T4+T5)/T3, (T3+T6)/T2, G56/G45, AAG/BFL, G67/(G23+G34), ALT/BFL and TTL/(G12+T7) of the present embodiment.

TABLE 19

Embodiment 10
EFL = 5.711 mm; HFOV = 42.035 degrees; TTL = 7.343 mm
Fno = 1.650; Image Height = 5.800 mm

| Surface # | | Radius of curvature (mm) | Thickness/ air gap (mm) | Refractive index | Abbe number | Focal length (mm) | Material |
|---|---|---|---|---|---|---|---|
| OBJ | Object | INFINITY | INFINITY | | | | |
| STO | Aperture stop | INFINITY | −0.681 | | | | |
| L1A1 | 1st lens element | 2.583 | 0.970 | 1.545 | 55.987 | 5.887 | Plastic |
| L1A2 | | 11.396 | 0.050 | | | | |
| L2A1 | 2nd lens element | 6.314 | 0.289 | 1.661 | 20.373 | −16.924 | Plastic |
| L2A2 | | 3.975 | 0.524 | | | | |
| L3A1 | 3rd lens element | −40.555 | 0.390 | 1.545 | 55.987 | 17.533 | Plastic |
| L3A2 | | −7.774 | 0.152 | | | | |
| L4A1 | 4th lens element | −7.565 | 0.236 | 1.661 | 20.373 | −15.026 | Plastic |
| L4A2 | | −31.225 | 0.125 | | | | |
| L5A1 | 5th lens element | 48.256 | 0.686 | 1.567 | 37.533 | 51.390 | Plastic |
| L5A2 | | −74.087 | 0.581 | | | | |
| L6A1 | 6th lens element | 7.846 | 0.739 | 1.545 | 55.987 | 5.723 | Plastic |
| L6A2 | | −5.024 | 1.143 | | | | |
| L7A1 | 7th lens element | −4.454 | 0.699 | 1.545 | 55.987 | −3.720 | Plastic |
| L7A2 | | 3.944 | 0.500 | | | | |
| TFA1 | Filtering unit | INFINITY | 0.210 | 1.517 | 64.167 | | |
| TFA2 | | INFINITY | 0.050 | | | | |
| IMA | Image plane | INFINITY | | | | | |

The values of each aspherical parameter are shown in Table 20.

TABLE 20

Embodiment 10
Aspherical Parameters

| Surface # | K | a2 | a4 | a6 |
|---|---|---|---|---|
| L1A1 | 0.000000E+00 | 0.000000E+00 | 1.492513E−03 | 1.747207E−03 |
| L1A2 | 0.000000E+00 | 0.000000E+00 | −2.583203E−02 | 3.151628E−02 |
| L2A1 | 0.000000E+00 | 0.000000E+00 | −3.706482E−02 | 3.602969E−02 |
| L2A2 | −1.184984E+00 | 0.000000E+00 | −1.042652E−02 | 1.217897E−02 |
| L3A1 | 0.000000E+00 | 0.000000E+00 | −1.652535E−02 | −8.268532E−03 |
| L3A2 | 0.000000E+00 | 0.000000E+00 | 1.353835E−02 | −6.545786E−02 |
| L4A1 | 0.000000E+00 | 0.000000E+00 | 6.738178E−02 | −1.556859E−01 |
| L4A2 | 0.000000E+00 | 0.000000E+00 | 4.999648E−02 | −1.152037E−01 |
| L5A1 | 0.000000E+00 | 0.000000E+00 | −3.044749E−02 | −7.505986E−03 |
| L5A2 | 0.000000E+00 | 0.000000E+00 | −5.119425E−02 | 1.122577E−02 |
| L6A1 | 0.000000E+00 | 0.000000E+00 | −1.093786E−02 | 4.576572E−05 |
| L6A2 | −2.866749E+00 | 0.000000E+00 | 1.456264E−02 | −2.470737E−03 |
| L7A1 | 0.000000E+00 | 0.000000E+00 | −2.779928E−02 | 8.392511E−03 |
| L7A2 | −1.177113E+01 | 0.000000E+00 | −1.318219E−02 | 2.486832E−03 |

| Surface # | a8 | a10 | a12 | a14 |
|---|---|---|---|---|
| L1A1 | −1.855475E−03 | 1.547925E−03 | −6.692717E−04 | 1.528302E−04 |
| L1A2 | −2.249788E−02 | 1.089220E−02 | −3.502308E−03 | 6.691236E−04 |
| L2A1 | −2.310688E−02 | 1.078282E−02 | −3.507162E−03 | 7.323179E−04 |
| L2A2 | −5.629643E−03 | 2.687011E−03 | −9.382738E−04 | 2.102458E−04 |
| L3A1 | 1.032285E−02 | −9.730204E−03 | 5.128232E−03 | −1.424746E−03 |
| L3A2 | 6.232109E−02 | −3.774558E−02 | 1.382263E−02 | −2.745380E−03 |
| L4A1 | 1.464500E−01 | −1.010443E−01 | 5.100293E−02 | −1.929545E−02 |
| L4A2 | 1.060099E−01 | −6.774267E−02 | 3.037524E−02 | −9.392024E−03 |
| L5A1 | 1.328479E−02 | −8.214182E−03 | 3.381119E−03 | −8.795537E−04 |
| L5A2 | −5.779223E−03 | 3.154766E−03 | −1.264539E−03 | 3.731572E−04 |
| L6A1 | −1.881373E−03 | 7.641318E−04 | −2.680197E−04 | 8.118005E−05 |
| L6A2 | −1.606465E−04 | −3.469556E−04 | 1.807257E−04 | −3.373690E−05 |
| L7A1 | −2.289984E−03 | 4.820410E−04 | −6.077247E−05 | 4.558402E−06 |
| L7A2 | −3.798758E−04 | 4.272809E−05 | −3.360803E−06 | 1.764581E−07 |

| Surface # | a16 | a18 | a20 |
|---|---|---|---|
| L1A1 | −1.449753E−05 | | |
| L1A2 | −5.645958E−05 | | |
| L2A1 | −6.895245E−05 | | |
| L2A2 | −2.717623E−06 | | |
| L3A1 | 1.800011E−04 | | |

TABLE 20-continued

Embodiment 10
Aspherical Parameters

| L3A2 | 2.238871E−04 | | |
|---|---|---|---|
| L4A1 | 5.265683E−03 | −9.144192E−04 | 7.341791E−05 |
| L4A2 | 1.927980E−03 | −2.371301E−04 | 1.325043E−05 |
| L5A1 | 1.357631E−04 | −1.123911E−05 | 3.780331E−07 |
| L5A2 | −7.577252E−05 | 9.218943E−06 | −4.881564E−07 |
| L6A1 | −1.536760E−05 | 1.519545E−06 | −5.973267E−08 |
| L6A2 | 3.131433E−06 | −1.468718E−07 | 2.790844E−09 |
| L7A1 | −2.015946E−07 | 4.867946E−09 | −4.950300E−11 |
| L7A2 | −5.889937E−09 | 1.132010E−10 | −9.530000E−13 |

Figure 25A:
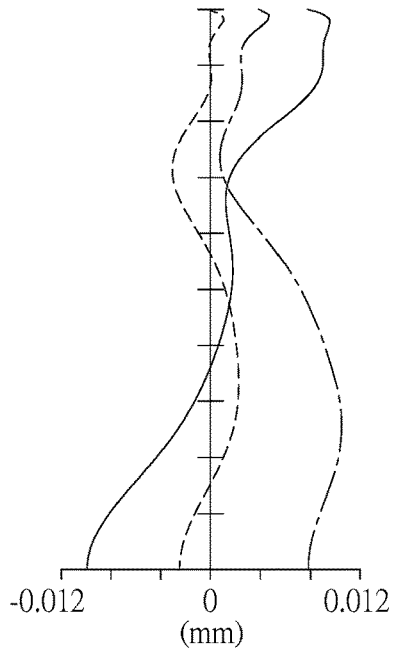
FIGS. 25A-25D depict charts of a longitudinal spherical aberration and other kinds of optical aberrations of a tenth embodiment of the optical imaging lens according to the present disclosure.
Figure 25B:
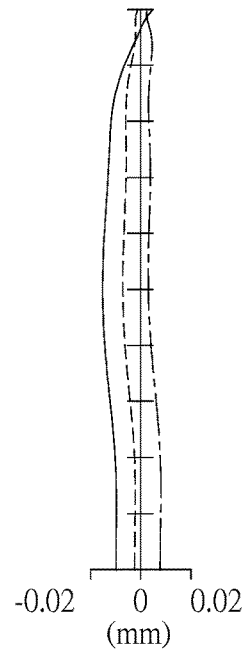
Figure 25C:
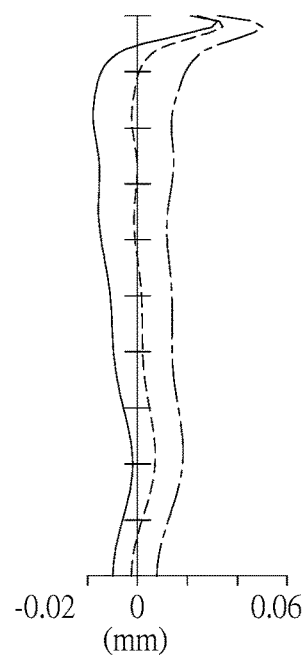
Figure 25D:
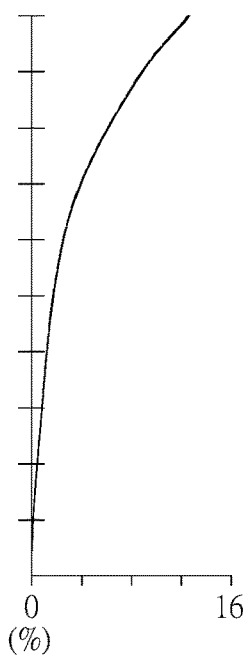

As the longitudinal spherical aberration shown in FIG. 25A, the offset of the off-axis light relative to the image point may be within −0.012~0.012 mm. As the field curvature aberration in the sagittal direction shown in FIG. 25B, the focus variation with regard to the three wavelengths in the whole field may fall within −0.02~0.02 mm. As the field curvature aberration in the tangential direction shown in FIG. 25C, the focus variation with regard to the three wavelengths in the whole field may fall within −0.02~0.06 mm. As shown in FIG. 25D, the variation of the distortion aberration may be within 0~14%. Compared with the first embodiment, the longitudinal spherical aberration and the distortion aberration may be smaller in the present embodiment.

According to the values of the aberrations, it is shown that the optical imaging lens 10 of the present embodiment, with system length as short as 7.343 mm, HFOV as great as 42.035 degrees, Fno as small as 1.650 and image height as great as 5.800 mm, may be capable of providing good imaging quality.

Figure 26:
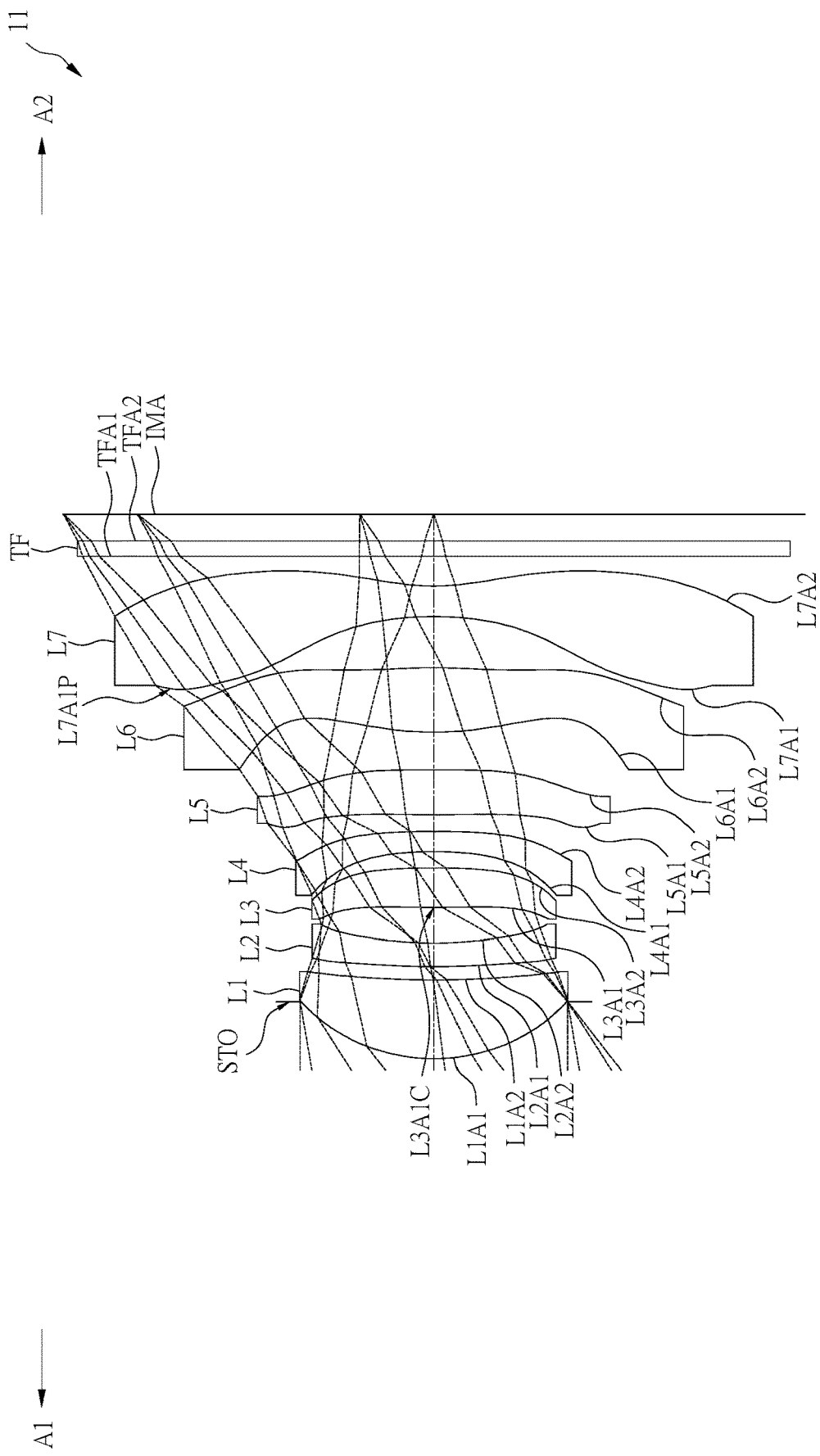
FIG. 26 depicts a cross-sectional view of an eleventh embodiment of an optical imaging lens having seven lens elements according to the present disclosure.

Reference is now made to FIGS. 26, 27A-27D and Tables 21, 22. FIG. 26 illustrates an example cross-sectional view of an optical imaging lens 11 having seven lens elements of the optical imaging lens according to an eleventh example embodiment. FIGS. 27A-27D show example charts of a longitudinal spherical aberration and other kinds of optical aberrations of the optical imaging lens 11 according to the eleventh embodiment. Table 21 shows an example table of optical data of each lens element of the optical imaging lens 11 according to the eleventh example embodiment. Table 22 shows an example table of aspherical data of the optical imaging lens 11 according to the eleventh example embodiment.

As shown in FIG. 26, the optical imaging lens 11 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6 and a seventh lens element L7.

The differences between the eleventh embodiment and the first embodiment may include the radius of curvature and thickness of each lens element, the value of each air gap, aspherical data, related optical parameters, such as back focal length, and the configuration of the concave/convex shape of the object-side surfaces L3A1, L7A1; but the configuration of the concave/convex shape of surfaces comprising the object-side surfaces L1A1, L2A1, L4A1, L5A1 and L6A1 facing to the object side A1 and the image-side surfaces L1A2, L2A2, L3A2, L4A2, L5A2, L6A2 and L7A2 facing to the image side A2, and positive or negative configuration of the refracting power of each lens element may be similar to those in the first embodiment. Specifically, an optical axis region L3A1C of the object-side surface L3A1 of the third lens element L3 may be convex, and a periphery region L7A1P of the object-side surface L7A1 of the seventh lens element L7 may be convex. Please refer to Table 21 for the optical characteristics of each lens elements in the optical imaging lens 11 of the present embodiment, and please refer to Table 24 FIG. 54B for the values of V5, TL/Fno, (T1+G12+T2)/T5, TTL/T1, (T6+G67)/T7, EFL/BFL, (T2+G23+T3)/T4, (G23+G45)/G34, (EFL+BFL)/T5, ALT/(G56+T6+G67), EFL/AAG, HFOV/ImgH, (T1+T4+T5)/T3, (T3+T6)/T2, G56/G45, AAG/BFL, G67/(G23+G34), ALT/BFL and TTL/(G12+T7) of the present embodiment.

TABLE 21

Embodiment 11

| Surface # | | Radius of curvature (mm) | Thickness/ air gap (mm) | Refractive index | Abbe number | Focal length (mm) | Material |
|---|---|---|---|---|---|---|---|
| ONJ | Object | INFINITY | INFINITY | | | | |
| STO | Aperture stop | INFINITY | −0.769 | | | | |
| L1A1 | 1st lens element | 2.553 | 1.064 | 1.545 | 55.987 | 5.741 | Plastic |
| L1A2 | | 11.712 | 0.182 | | | | |
| L2A1 | 2nd lens element | 9.195 | 0.314 | 1.671 | 19.243 | −15.281 | Plastic |
| L2A2 | | 4.803 | 0.479 | | | | |
| L3A1 | 3rd lens element | 21.250 | 0.534 | 1.545 | 55.987 | 14.620 | Plastic |
| L3A2 | | −12.682 | 0.222 | | | | |
| L4A1 | 4th lens element | −5.231 | 0.270 | 1.671 | 19.243 | −10.790 | Plastic |
| L4A2 | | −18.771 | 0.228 | | | | |
| L5A1 | 5th lens element | 17.326 | 0.613 | 1.642 | 22.409 | 25.875 | Plastic |
| L5A2 | | −495.700 | 0.508 | | | | |
| L6A1 | 6th lens element | 4.283 | 0.865 | 1.535 | 55.690 | 5.125 | Plastic |
| L6A2 | | −7.161 | 0.692 | | | | |

TABLE 21-continued

Embodiment 11

| Surface # | | Radius of curvature (mm) | Thickness/ air gap (mm) | Refractive index | Abbe number | Focal length (mm) | Material |
|---|---|---|---|---|---|---|---|
| L7A1 | 7th lens element | −4.780 | 0.416 | 1.535 | 55.690 | −3.450 | Plastic |
| L7A2 | | 3.117 | 0.400 | | | | |
| TFA1 | Filtering unit | INFINITY | 0.210 | 1.517 | 64.167 | | |
| TFA2 | | INFINITY | 0.360 | | | | |
| IMA | Image plane | INFINITY | | | | | |

EFL = 5.817 mm;
HFOV = 38.046 degrees;
TTL = 7.357 mm
Fno = 1.610;
Image Height = 5.000 mm The values of each aspherical parameter are shown in Table 22.

Figure 27A:
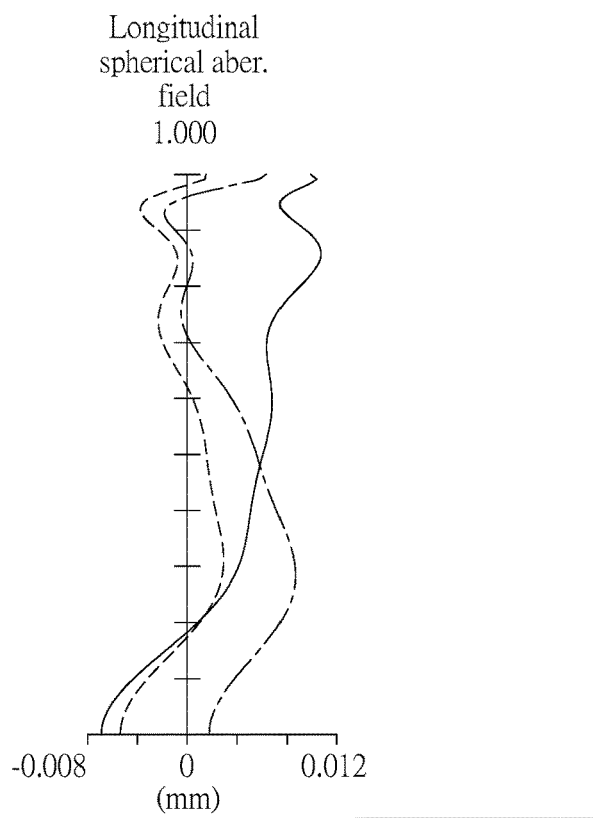
FIGS. 27A-27D depict charts of a longitudinal spherical aberration and other kinds of optical aberrations of an eleventh embodiment of the optical imaging lens according to the present disclosure.
Figure 27B:
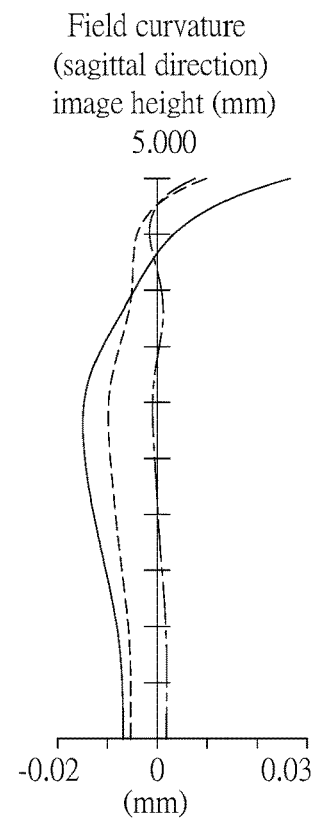
Figure 27C:
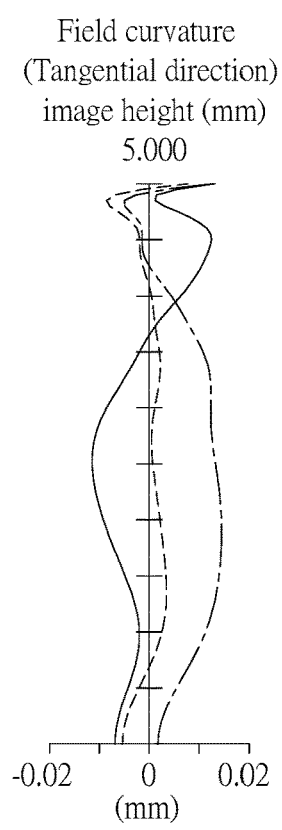

As the longitudinal spherical aberration shown in FIG. 27A, the offset of the off-axis light relative to the image

TABLE 22

Embodiment 11
Aspherical Parameters

| Surface# | K | a2 | a4 | a6 |
|---|---|---|---|---|
| L1A1 | 0.000000E+00 | 0.000000E+00 | 9.239268E−04 | 1.484388E−03 |
| L1A2 | 0.000000E+00 | 0.000000E+00 | −8.718889E−03 | 5.647779E−03 |
| L2A1 | 0.000000E+00 | 0.000000E+00 | −2.965934E−02 | 1.685115E−02 |
| L2A2 | −1.413942E+01 | 0.000000E+00 | −7.506254E−03 | 8.394286E−03 |
| L3A1 | 0.000000E+00 | 0.000000E+00 | −2.474899E−02 | −2.998670E−03 |
| L3A2 | 0.000000E+00 | 0.000000E+00 | −2.820593E−02 | −2.773180E−03 |
| L4A1 | 0.000000E+00 | 0.000000E+00 | −3.778987E−02 | 2.091358E−02 |
| L4A2 | 0.000000E+00 | 0.000000E+00 | −4.206542E−02 | 3.538523E−02 |
| L5A1 | 0.000000E+00 | 0.000000E+00 | −4.399063E−02 | 2.969983E−02 |
| L5A2 | 0.000000E+00 | 0.000000E+00 | −5.014790E−02 | 1.568732E−02 |
| L6A1 | 0.000000E+00 | 0.000000E+00 | −1.136505E−02 | −3.797007E−03 |
| L6A2 | 2.387902E+00 | 0.000000E+00 | 5.318939E−02 | −1.798957E−02 |
| L7A1 | 0.000000E+00 | 0.000000E+00 | −1.522541E−02 | −2.752788E−03 |
| L7A2 | −8.932326E+00 | 0.000000E+00 | −2.631162E−02 | 5.703366E−03 |

| Surface# | a8 | a10 | a12 | a14 |
|---|---|---|---|---|
| L1A1 | −1.569498E−03 | 1.314436E−03 | −5.655513E−04 | 1.263453E−04 |
| L1A2 | −1.367784E−03 | −1.162213E−05 | 6.418409E−06 | 3.061264E−05 |
| L2A1 | −4.866412E−03 | 9.324197E−04 | −2.927793E−04 | 1.602820E−04 |
| L2A2 | 1.147875E−03 | −3.865477E−03 | 2.772530E−03 | −9.288824E−04 |
| L3A1 | −3.331186E−03 | 2.745868E−03 | −1.981175E−03 | 7.634769E−04 |
| L3A2 | −8.714155E−03 | 6.634193E−03 | −2.543744E−03 | 6.168891E−04 |
| L4A1 | −4.342067E−02 | 4.157017E−02 | −2.594081E−02 | 1.136807E−02 |
| L4A2 | −4.201233E−02 | 3.033928E−02 | −1.456461E−02 | 4.793518E−03 |
| L5A1 | −1.862504E−02 | 7.858809E−03 | −2.538041E−03 | 6.651101E−04 |
| L5A2 | −4.916739E−03 | 1.927961E−03 | −8.965231E−04 | 3.076798E−04 |
| L6A1 | 1.071725E−03 | −5.080696E−04 | 1.374554E−04 | −2.845712E−05 |
| L6A2 | 3.842852E−03 | −7.468398E−04 | 1.176626E−04 | −1.222754E−05 |
| L7A1 | 2.484646E−03 | −4.986804E−04 | 5.220663E−05 | −3.237085E−06 |
| L7A2 | −1.005077E−03 | 1.436116E−04 | −1.498618E−05 | 1.039042E−06 |

Figure 27D:
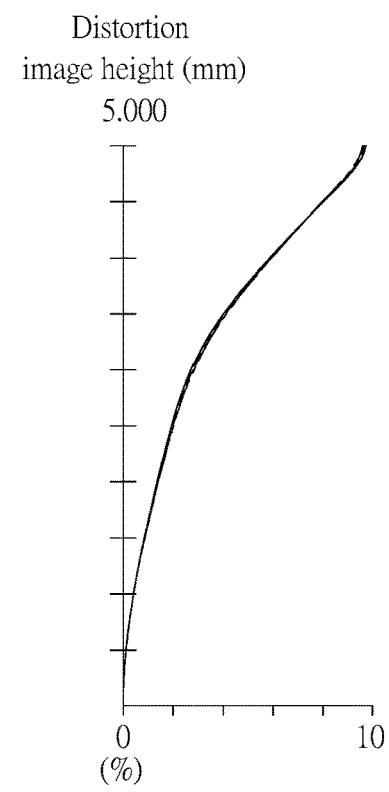

| Surface## | a16 | a18 | a20 |
|---|---|---|---|
| L1A1 | −1.144778E−05 | | |
| L1A2 | −6.630712E−06 | | |
| L2A1 | −2.787197E−05 | | |
| L2A2 | 1.489564E−04 | | |
| L3A1 | −9.777372E−05 | | |
| L3A2 | −7.770617E−05 | | |
| L4A1 | −3.309824E−03 | 5.398656E−04 | −3.464797E−05 |
| L4A2 | −1.059058E−03 | 1.417574E−04 | −8.450904E−06 |
| L5A1 | −1.199258E−04 | 1.217552E−05 | −5.150381E−07 |
| L5A2 | −5.876586E−05 | 5.626111E−06 | −2.126575E−07 |
| L6A1 | 4.561361E−06 | −4.390651E−07 | 1.796254E−08 |
| L6A2 | 7.576381E−07 | −2.526577E−08 | 3.482970E−10 |
| L7A1 | 1.194017E−07 | −2.405493E−09 | 2.002400E−11 |
| L7A2 | −4.471084E−08 | 1.080206E−09 | −1.122800E−11 | point may be within −0.008~0.012 mm. As the field curvature aberration in the sagittal direction shown in FIG. 27B, the focus variation with regard to the three wavelengths in the whole field may fall within −0.015~0.03 mm. As the field curvature aberration in the tangential direction shown in FIG. 27C, the focus variation with regard to the three wavelengths in the whole field may fall within −0.02~0.015 mm. As shown in FIG. 27D, the variation of the distortion aberration may be within 0~10%. Compared with the first embodiment, the longitudinal spherical aberration, the field curvature aberration in the tangential direction and the distortion aberration may be smaller in the present embodiment.

According to the values of the aberrations, it is shown that the optical imaging lens 11 of the present embodiment, with system length as short as 7.357 mm, HFOV as great as 38.046 degrees, Fno as small as 1.610 and image height as great as 5.000 mm, may be capable of providing good imaging quality.

Please refer to Tables 23, 24 for the values of V5, TL/Fno, (T1+G12+T2)/T5, TTL/T1, (T6+G67)/T7, EFL/BFL, (T2+G23+T3)/T4, (G23+G45)/G34, (EFL+BFL)/T5, ALT/(G56+T6+G67), EFL/AAG, HFOV/ImgH, (T1+T4+T5)/T3, (T3+T6)/T2, G56/G45, AAG/BFL, G67/(G23+G34), ALT/BFL and TTL/(G12+T7) of all eleven embodiments, and the optical imaging lens of the present disclosure may satisfy Inequalities (1), (2) and/or at least one of Inequalities (3)~(19). Further, any range of which the upper and lower limits defined by the values disclosed in all of the embodiments herein may be implemented in the present embodiments.

According to above illustration, the longitudinal spherical aberration, field curvature aberration in both the sagittal direction and tangential direction and distortion aberration in all embodiments may meet the user requirement of a related product in the market. The off-axis light with regard to three different wavelengths may be focused around an image point and the offset of the off-axis light relative to the image point may be well controlled with suppression for the longitudinal spherical aberration, field curvature aberration both in the sagittal direction and tangential direction and distortion aberration. The curves of different wavelengths may be close to each other, and this represents that the focusing for light having different wavelengths may be good to suppress chromatic dispersion. In summary, lens elements are designed and matched for achieving good imaging quality.

TABLE 23

| Embodiment | 1st | 2nd | 3rd | 4th | 5th | 6th |
|---|---|---|---|---|---|---|
| V5 | 37.533 | 37.533 | 37.533 | 37.533 | 37.533 | 37.533 |
| TL/Fno | 3.315 | 4.181 | 3.891 | 3.904 | 4.089 | 3.749 |
| (T1 + G12 + T2)/T5 | 1.431 | 2.899 | 1.261 | 2.650 | 1.454 | 1.315 |
| TTL/T1 | 9.996 | 6.324 | 8.739 | 7.450 | 6.751 | 9.999 |
| (T6 + G67)/T7 | 7.715 | 3.980 | 8.060 | 7.910 | 2.401 | 3.140 |
| EFL/BFL | 4.642 | 6.576 | 3.435 | 6.766 | 4.993 | 7.477 |
| (T2 + G23 + T3)/T4 | 4.604 | 7.305 | 5.213 | 4.355 | 4.718 | 5.215 |
| (G23 + G45)/G34 | 4.056 | 3.251 | 1.571 | 4.015 | 6.868 | 4.226 |
| (EFL + BFL)/T5 | 8.605 | 11.627 | 6.408 | 13.149 | 6.940 | 7.942 |
| ALT/(G56 + T6 + G67) | 1.385 | 1.945 | 1.907 | 1.285 | 2.795 | 1.373 |
| EFL/AAG | 2.068 | 3.297 | 2.258 | 2.189 | 3.299 | 1.922 |
| HFOV/ImgH | 7.534 | 6.456 | 7.165 | 7.002 | 6.706 | 8.395 |
| (T1 + T4 + T5)/T3 | 4.435 | 3.542 | 2.936 | 4.714 | 4.292 | 3.726 |
| (T3 + T6)/T2 | 3.901 | 4.455 | 7.588 | 5.309 | 3.901 | 5.798 |
| G56/G45 | 5.813 | 6.696 | 7.862 | 8.947 | 2.737 | 5.300 |
| AAG/BFL | 2.245 | 1.994 | 1.521 | 3.091 | 1.513 | 3.889 |
| G67/(G23 + G34) | 1.307 | 0.901 | 0.901 | 1.629 | 0.903 | 2.350 |
| ALT/BFL | 3.004 | 5.463 | 3.015 | 4.567 | 3.821 | 5.391 |
| TTL/(G12 + T7) | 26.051 | 14.163 | 25.005 | 22.146 | 12.828 | 9.974 |

TABLE 24

| Embodiment | 7th | 8th | 9th | 10th | 11th |
|---|---|---|---|---|---|
| V5 | 37.533 | 37.533 | 37.533 | 37.533 | 22.409 |
| TL/Fno | 3.784 | 3.513 | 4.097 | 3.990 | 3.967 |
| (T1 + G12 + T2)/T5 | 1.338 | 1.408 | 1.707 | 1.908 | 2.543 |
| TTL/T1 | 8.939 | 9.999 | 6.370 | 7.574 | 6.914 |
| (T6 + G67)/T7 | 9.346 | 8.255 | 10.712 | 2.692 | 3.747 |
| EFL/BFL | 4.140 | 2.999 | 7.586 | 7.514 | 5.994 |
| (T2 + G23 + T3)/T4 | 4.336 | 2.948 | 6.857 | 5.090 | 4.917 |
| (G23 + G45)/G34 | 4.372 | 2.569 | 10.533 | 4.267 | 3.188 |
| (EFL + BFL)/T5 | 7.965 | 6.817 | 7.602 | 9.435 | 11.065 |

TABLE 24-continued

| Embodiment | 7th | 8th | 9th | 10th | 11th |
|---|---|---|---|---|---|
| ALT/(G56 + T6 + G67) | 1.737 | 1.745 | 1.557 | 1.628 | 1.974 |
| EFL/AAG | 2.758 | 1.998 | 1.986 | 2.218 | 2.518 |
| HFOV/ImgH | 7.286 | 7.451 | 6.593 | 7.247 | 7.609 |
| (T1 + T4 + T5)/T3 | 4.158 | 3.652 | 5.089 | 4.850 | 3.650 |
| (T3 + T6)/T2 | 5.502 | 7.984 | 5.059 | 3.901 | 4.452 |
| G56/G45 | 5.851 | 5.938 | 1.027 | 4.650 | 2.226 |
| AAG/BFL | 1.501 | 1.501 | 3.820 | 3.388 | 2.381 |
| G67/(G23 + G34) | 1.116 | 0.901 | 1.759 | 1.691 | 0.987 |
| ALT/BFL | 3.001 | 3.001 | 5.076 | 5.275 | 4.200 |
| TTL/(G12 + T7) | 30.526 | 20.132 | 30.083 | 9.806 | 12.318 |

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, comprising a first lens element, a second lens element, a third lens element, a fourth lens element, a fifth lens element, a sixth lens element and a seventh lens element sequentially from an object side to an image side along an optical axis, each of the first, second, third, fourth, fifth, sixth and seventh lens element having an object-side surface facing toward the object side and allowing imaging rays to pass through and an image-side surface facing toward the image side and allowing the imaging rays to pass through, wherein:
   a periphery region of the object-side surface of the third lens element is concave;
   a periphery region of the image-side surface of the third lens element is convex;
   an optical axis region of the image-side surface of the fourth lens element is convex;
   an optical axis region of the image-side surface of the fifth lens element is convex, and the fifth lens element has positive refracting power;
   an optical axis region of the image-side surface of the sixth lens element is convex, and the sixth lens element has positive refracting power;
   lens elements included by the optical imaging lens are only the seven lens elements described above; and
   an abbe number of the fifth lens element is represented by V5, a distance from the object-side surface of the first lens element to the image-side surface of the seventh lens element along the optical axis is represented by TL, a f-number of the optical imaging lens is represented by Fno, and the optical imaging lens satisfies the inequalities:

$$V5 \leq 40.000, \text{ and } TL/Fno \geq 3.300 \text{ mm}.$$

2. The optical imaging lens according to claim 1, wherein a thickness of the first lens element along the optical axis is represented by T1, a distance from the image-side surface of the first lens element to the object-side surface of the second lens element along the optical axis is represented by G12, a thickness of the second lens element along the optical axis is represented by T2, a thickness of the fifth lens element along the optical axis is represented by T5, and T1, G12, T2 and T5 satisfy the inequality:

$$(T1 + G12 + T2)/T5 \leq 2.900.$$

3. The optical imaging lens according to claim 1, wherein a distance from the object-side surface of the first lens element to an image plane along the optical axis is represented by TTL, a thickness of the first lens element along the optical axis is represented by T1, and TTL and T1 satisfy the inequality:

$$TTL/T1 \leq 10.000.$$

4. The optical imaging lens according to claim 1, wherein a thickness of the sixth lens element along the optical axis is represented by T6, a distance from the image-side surface of the sixth lens element to the object-side surface of the seventh lens element along the optical axis is represented by G67, a thickness of the seventh lens element along the optical axis is represented by T7, and T6, G67 and T7 satisfy the inequality:

$$(T6 + G67)/T7 \geq 2.400.$$

5. The optical imaging lens according to claim 1, wherein an effective focal length of the optical imaging lens is represented by EFL, a distance from the image-side surface of the seventh lens element to an image plane along the optical axis is represented by BFL, and EFL and BFL satisfy the inequality:

$$EFL/BFL \geq 2.900.$$

6. The optical imaging lens according to claim 1, wherein a thickness of the second lens element along the optical axis is represented by T2, a distance from the image-side surface of the second lens element to the object-side surface of the third lens element along the optical axis is represented by G23, a thickness of the third lens element along the optical axis is represented by T3, a thickness of the fourth lens element along the optical axis is represented by T4, and T2, G23, T3 and T4 satisfy the inequality:

$$(T2 + G23 + T3)/T4 \geq 2.800.$$

7. The optical imaging lens according to claim 1, wherein a distance from the image-side surface of the second lens element to the object-side surface of the third lens element along the optical axis is represented by G23, a distance from the image-side surface of the fourth lens element to the object-side surface of the fifth lens element along the optical axis is represented by G45, a distance from the image-side surface of the third lens element to the object-side surface of the fourth lens element along the optical axis is represented by G34, and G23, G45 and G34 satisfy the inequality:

$$(G23 + G45)/G34 \geq 1.500.$$

8. An optical imaging lens, comprising a first lens element, a second lens element, a third lens element, a fourth lens element, a fifth lens element, a sixth lens element and a seventh lens element sequentially from an object side to an image side along an optical axis, each of the first, second, third, fourth, fifth, sixth and seventh lens element having an object-side surface facing toward the object side and allowing imaging rays to pass through and an image-side surface facing toward the image side and allowing the imaging rays to pass through, wherein:
  a periphery region of the object-side surface of the third lens element is concave;
  a periphery region of the image-side surface of the third lens element is convex;
  an optical axis region of the image-side surface of the fourth lens element is convex;
  an optical axis region of the object-side surface of the fifth lens element is convex, an optical axis region of the image-side surface of the fifth lens element is convex, and the fifth lens element has positive refractive power;
  an optical axis region of the image-side surface of the sixth lens element is convex, and the sixth lens element has positive refracting power;
  lens elements included by the optical imaging lens are only the seven lens elements described above; and
  an abbe number of the fifth lens element is represented by V5, a distance from the object-side surface of the first lens element to the image-side surface of the seventh lens element along the optical axis is represented by TL, a f-number of the optical imaging lens is represented by Fno, and the optical imaging lens satisfies the inequalities:

$$V5 \leq 40.000, \text{ and } TL/Fno \geq 3.300 \text{ mm.}$$

9. The optical imaging lens according to claim 1, wherein an effective focal length of the optical imaging lens is represented by EFL, a distance from the image-side surface of the seventh lens element to an image plane along the optical axis is represented by BFL, a thickness of the fifth lens element along the optical axis is represented by T5, and EFL, BFL and T5 satisfy the inequality:

$$(EFL + BFL)/T5 \leq 13.500.$$

10. The optical imaging lens according to claim 1, wherein a sum of the thicknesses of all seven lens elements along the optical axis is represented by ALT, a distance from the image-side surface of the fifth lens element to the object-side surface of the sixth lens element along the optical axis is represented by G56, a thickness of the sixth lens element along the optical axis is represented by T6, a distance from the image-side surface of the sixth lens element to the object-side surface of the seventh lens element along the optical axis is represented by G67, and ALT, G56, T6 and G67 satisfy the inequality:

$$ALT/(G56 + T6 + G67) \leq 2.800.$$

11. The optical imaging lens according to claim 1, wherein an effective focal length of the optical imaging lens is represented by EFL, a sum of six air gaps from the first lens element to the seventh lens element along the optical axis is represented by AAG, and EFL and AAG satisfy the inequality:

$$EFL/AAG \leq 3.300.$$

12. The optical imaging lens according to claim 1, wherein a half field of view of the optical imaging lens is represented by HFOV, an image height of the optical imaging lens is represented by ImgH, and HFOV and ImgH satisfy the inequality:

$$HFOV/ImgH \leq 10.000 \text{ degree/mm.}$$

13. The optical imaging lens according to claim 1, wherein a thickness of the first lens element along the optical axis is represented by T1, a thickness of the fourth lens element along the optical axis is represented by T4, a thickness of the fifth lens element along the optical axis is represented by T5, a thickness of the third lens element along the optical axis is represented by T3, and T1, T4, T5 and T3 satisfy the inequality:

$(T1+T4+T5)/T3 \geq 2.900$.

14. The optical imaging lens according to claim 1, wherein a thickness of the third lens element along the optical axis is represented by T3, a thickness of the sixth lens element along the optical axis is represented by T6, a thickness of the second lens element along the optical axis is represented by T2, and T3, T6 and T2 satisfy the inequality:

$(T3+T6)/T2 \geq 3.900$.

15. An optical imaging lens, comprising a first lens element, a second lens element, a third lens element, a fourth lens element, a fifth lens element, a sixth lens element and a seventh lens element sequentially from an object side to an image side along an optical axis, each of the first, second, third, fourth, fifth, sixth and seventh lens element having an object-side surface facing toward the object side and allowing imaging rays to pass through and an image-side surface facing toward the image side and allowing the imaging rays to pass through, wherein:
- a periphery region of the object-side surface of the third lens element is concave;
- a periphery region of the image-side surface of the third lens element is convex;
- an optical axis region of the image-side surface of the fourth lens element is convex, and the fourth lens element has negative refracting power;
- an optical axis region of the image-side surface of the fifth lens element is convex, and the fifth lens element has positive refracting power;
- an optical axis region of the image-side surface of the sixth lens element is convex, and the sixth lens element has positive refracting power;
- lens elements included by the optical imaging lens are only the seven lens elements described above; and
- an abbe number of the fifth lens element is represented by V5, a distance from the object-side surface of the first lens element to the image-side surface of the seventh lens element along the optical axis is represented by TL, a f-number of the optical imaging lens is represented by Fno, and the optical imaging lens satisfies the inequalities:

$V5 \leq 40.000$, and $TL/Fno \geq 3.300$ mm.

16. The optical imaging lens according to claim 1, wherein a distance from the image-side surface of the fifth lens element to the object-side surface of the sixth lens element along the optical axis is represented by G56, a distance from the image-side surface of the fourth lens element to the object-side surface of the fifth lens element along the optical axis is represented by G45, and G56 and G45 satisfy the inequality:

$G56/G45 \geq 1.000$.

17. The optical imaging lens according to claim 1, wherein a sum of six air gaps from the first lens element to the seventh lens element along the optical axis is represented by AAG, a distance from the image-side surface of the seventh lens element to an image plane along the optical axis is represented by BFL, and AAG and BFL satisfy the inequality:

$AAG/BFL \geq 1.500$.

18. The optical imaging lens according to claim 1, wherein a distance from the image-side surface of the sixth lens element to the object-side surface of the seventh lens element along the optical axis is represented by G67, a distance from the image-side surface of the second lens element to the object-side surface of the third lens element along the optical axis is represented by G23, a distance from the image-side surface of the third lens element to the object-side surface of the fourth lens element along the optical axis is represented by G34, and G67, G23 and G34 satisfy the inequality:

$G67/(G23+G34) \geq 0.900$.

19. The optical imaging lens according to claim 1, wherein a sum of the thicknesses of all seven lens elements from the first lens element to the seventh lens element along the optical axis is represented by ALT, a distance from the image-side surface of the seventh lens element to an image plane along the optical axis is represented by BFL, and ALT and BFL satisfy the inequality:

$ALT/BFL \geq 3.000$.

20. The optical imaging lens according to claim 1, wherein a distance from the object-side surface of the first lens element to an image plane along the optical axis is represented by TTL, a distance from the image-side surface of the first lens element to the object-side surface of the second lens element along the optical axis is represented by G12, a thickness of the seventh lens element along the optical axis is represented by T7, and TTL, G12 and T7 satisfy the inequality:

$TTL/(G12+T7) \geq 9.800$.

* * * * *